United States Patent [19]
Olnowich et al.

[11] Patent Number: 5,404,461
[45] Date of Patent: Apr. 4, 1995

[54] BROADCAST/SWITCHING APPARATUS FOR EXECUTING BROADCAST/MULTI-CAST TRANSFERS OVER UNBUFFERED ASYNCHRONOUS SWITCHING NETWORKS

[75] Inventors: Howard T. Olnowich, Endwell; Robert F. Lusch, Vestal; John D. Jabusch, Endwell, all of N.Y.

[73] Assignee: International Business Machines Corp., Armonk, N.Y.

[21] Appl. No.: 748,316

[22] Filed: Aug. 21, 1991

Related U.S. Application Data

[63] Continuation-in-part of Ser. No. 677,543, Mar. 29, 1991.

[51] Int. Cl.⁶ .......................... G06F 13/00
[52] U.S. Cl. .................. 395/325; 364/238.1; 364/238.2; 364/229; 364/284.2; 364/DIG. 1
[58] Field of Search .................. 395/325, 800; 340/825.14; 370/94.1

[56] References Cited

U.S. PATENT DOCUMENTS

| | | | |
|---|---|---|---|
| 3,246,298 | 4/1966 | Schramel et al. | 340/825.04 |
| 3,268,866 | 8/1966 | Van't Slot et al. | 340/825.04 |
| 4,237,447 | 12/1980 | Clark | 340/825.02 |
| 4,251,879 | 2/1981 | Clark | 370/60 |
| 4,307,378 | 12/1981 | Clark | 340/825.01 |
| 4,307,446 | 12/1981 | Barton et al. | 395/325 |
| 4,314,233 | 2/1982 | Clark | 340/825.02 |
| 4,475,188 | 10/1984 | Wilson et al. | 370/60 |
| 4,481,623 | 11/1984 | Clark | 370/60 |
| 4,482,996 | 11/1984 | Wilson et al. | 370/60 |
| 4,484,325 | 11/1984 | Wilson et al. | 370/60 |
| 4,518,960 | 5/1985 | Clark | 340/825.02 |
| 4,623,996 | 11/1986 | McMillen | 370/60 |
| 4,701,906 | 10/1987 | Ransom et al. | 370/60 |
| 4,706,080 | 11/1987 | Sincoskie | 340/825.02 |
| 4,754,395 | 6/1988 | Weisshaar et al. | 395/650 |
| 4,766,592 | 8/1988 | Baral et al. | 370/62 |
| 4,815,105 | 3/1989 | Bottoms et al. | 375/37 |
| 4,818,984 | 4/1989 | Chang et al. | 340/825.54 |
| 4,835,674 | 5/1989 | Collins et al. | 395/275 |

(List continued on next page.)

OTHER PUBLICATIONS

IBM Technical Disclosure Bulletin vol. 34, No. 8, Jan., 1992, pp. 16–20, "XNL Switch And Its Control", published anonymously.

(List continued on next page.)

*Primary Examiner*—Eric Coleman
*Attorney, Agent, or Firm*—Eugene I. Shkurko; Lynn L. Augspurger

[57] ABSTRACT

A broadcast/switching apparatus makes input port to output port connections on a requested basis quickly and dynamically in a standard mode from any one of the input ports to any one of the output ports, in a multi-cast mode from any one of the input ports to a fixed number of subsets of multiple output ports simultaneously, or in a broadcast mode from any one of the input ports to all output ports simultaneously, using a new asynchronous approach to resolve either broadcast or multi-cast contention among input ports. The normal mode of the broadcast/switch apparatus requires absolutely no synchronization among any of the input and output ports which interface to the apparatus. The broadcast/switch apparatus also incorporates a new accept protocol that enables a positive feedback indication to be returned to the sender of a multi-cast or broadcast operation to inform it that the multi-cast or broadcast transmission was correctly received by all elements involved in the multi-cast or broadcast. The broadcast/switch is completely void of centrally controlled clocking and data buffering. Data which traverses the switch encounters only three gate delays—on-chip receiver, mux, and off-chip driver. Contention is detected and resolved on chip. Each broadcast/switch port interface requires several parallel data lines plus four control lines.

19 Claims, 41 Drawing Sheets

U.S. PATENT DOCUMENTS

| | | | |
|---|---|---|---|
| 4,855,899 | 8/1989 | Presant | 395/275 |
| 4,897,834 | 1/1990 | Peterson et al. | 370/85.1 |
| 4,926,375 | 5/1990 | Mercer et al. | 395/325 |
| 4,935,866 | 6/1990 | Sauvajol et al. | 395/325 |
| 4,941,084 | 7/1990 | Terada et al. | 395/650 |
| 4,952,930 | 8/1990 | Franaszek et al. | 340/825.8 |
| 4,956,772 | 9/1990 | Neches | 395/650 |
| 4,965,788 | 10/1990 | Newman | 370/60 |
| 5,124,978 | 6/1992 | Chao | 370/60 |
| 5,210,743 | 5/1993 | Eilenberger | 370/60 |

OTHER PUBLICATIONS

The 6th International Conference On Distributed Computing Systems, May, 1986, pp. 321–328, "Distributed Resource Scheduling For A Large Scale Network Of Processor: HCSN", by Tripathi et al.

Proceedings of the 7th Annual Joint Conference of the IEEE Computer and Communication Societies, Mar., 1988, pp. 1–8, "The Architecture of a Multicast Broadband Packet Switch", by Boorstyn et al.

6th Annual International Phoenix Conference On Computers And Communications, Conference Proceedings 25, Feb., 1987, pp. 8–13, "Flow-Controlled Multicast In Multiprocessor Systems", by Katseff.

IBM TDB vol. 33, No. 5, Oct., 1990, "Asynchronous Digital Video Switching System", by Farrell et al, pp. 227–233.

IBM TDB vol. 30, No. 1, Jun. 1987 pp. 72–78, Pol Actuated Multiple Access Technique for Broadgathering Systems.

IBM TDB vol. 22, No. 12, May 1980 pp. 5450–5452, Distributed Star Network with Unrooted Tree Topology.

IEEE Trans. Computers C-32, 175–189 (Feb. 1983), NYU Ultracomputer.

IBM Research Parallel Processor Prototype "Proceedings of 1985 International Conference on Parallel Processing", pp. 764–769.

FIRST STAGE OF
BROADCAST/SWITCHES

SECOND STAGE OF
BROADCAST/SWITCHES

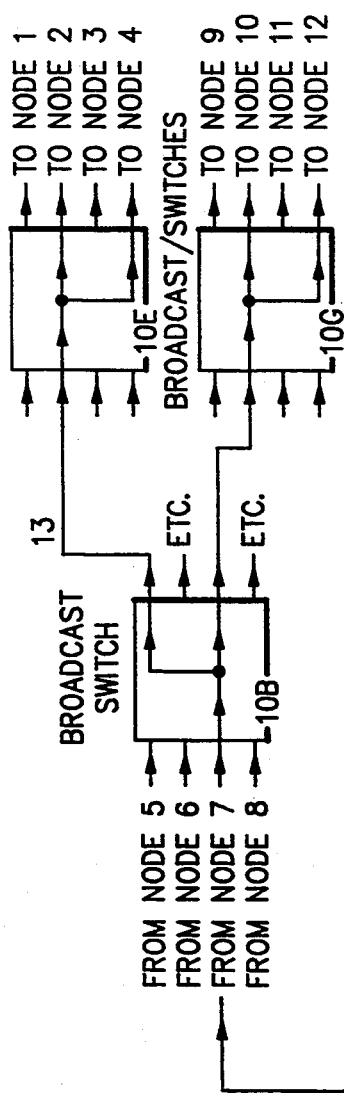
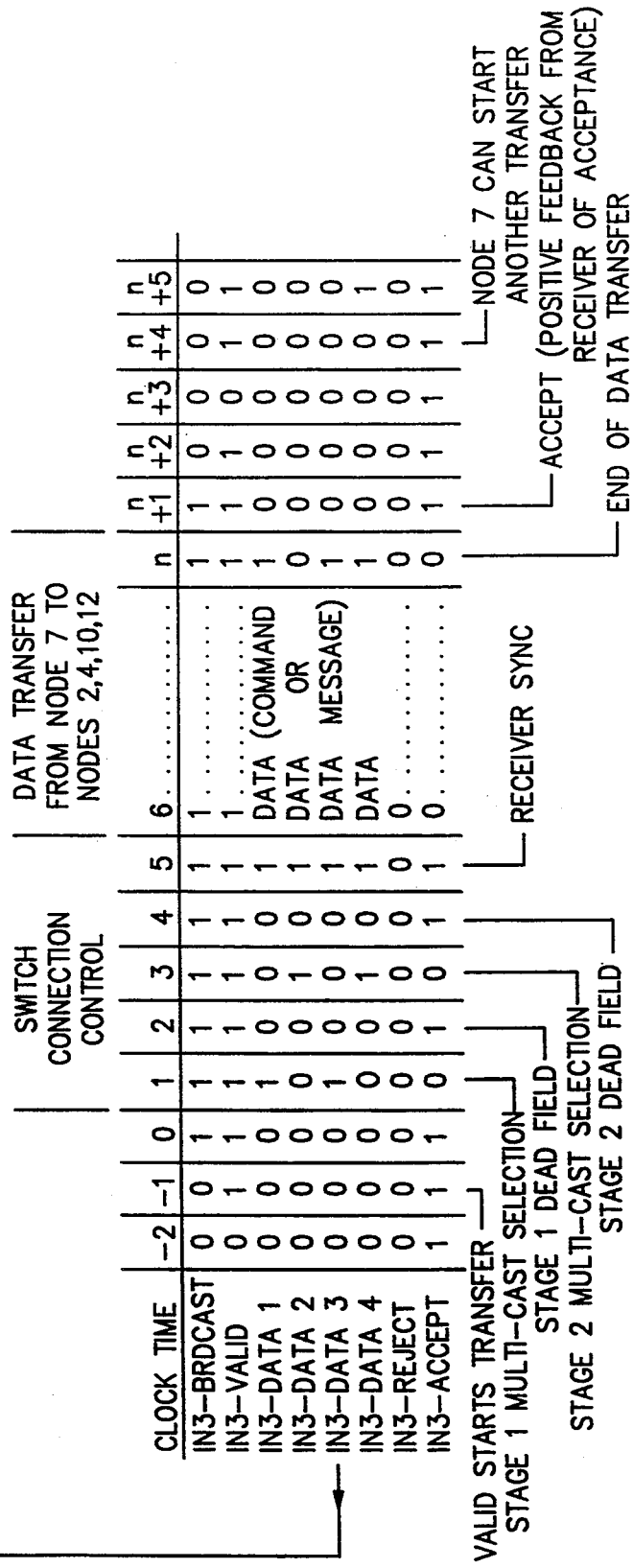
FIG.9

WAVE FORMS AT BROADCAST/SWITCH INPUT PORT INTERFACE 33

40 MHZ CLOCK ⎍⎍⎍⎍⎍⎍⎍⎍⎍⎍

IN3-BRDCAST ⎍‾‾‾‾‾‾‾‾‾‾‾⎍

IN3-VALID ⎍‾‾‾‾‾‾‾‾‾‾‾⎍

IN3-DATA 1 ⎍⎍⎍

IN3-DATA 2 ⎍⎍⎍

IN3-DATA 3 ⎍⎍⎍

IN3-DATA 4 ⎍⎍⎍

REJECTION RIPPLES BACK TO FIRST
IN3-REJECT ⎍‾‾‾⎍ STAGE AND SENDING NODE
83

IN3-ACCEPT ⎍⎍

OUT1-REJECT ⎍‾‾⎍
81

↳ SECOND BROADCAST/SWITCH
STAGE REJECTS BROADCAST

↳ FIRST BROADCAST/SWITCH
STAGE ACCEPTS BROADCAST

FIG.12

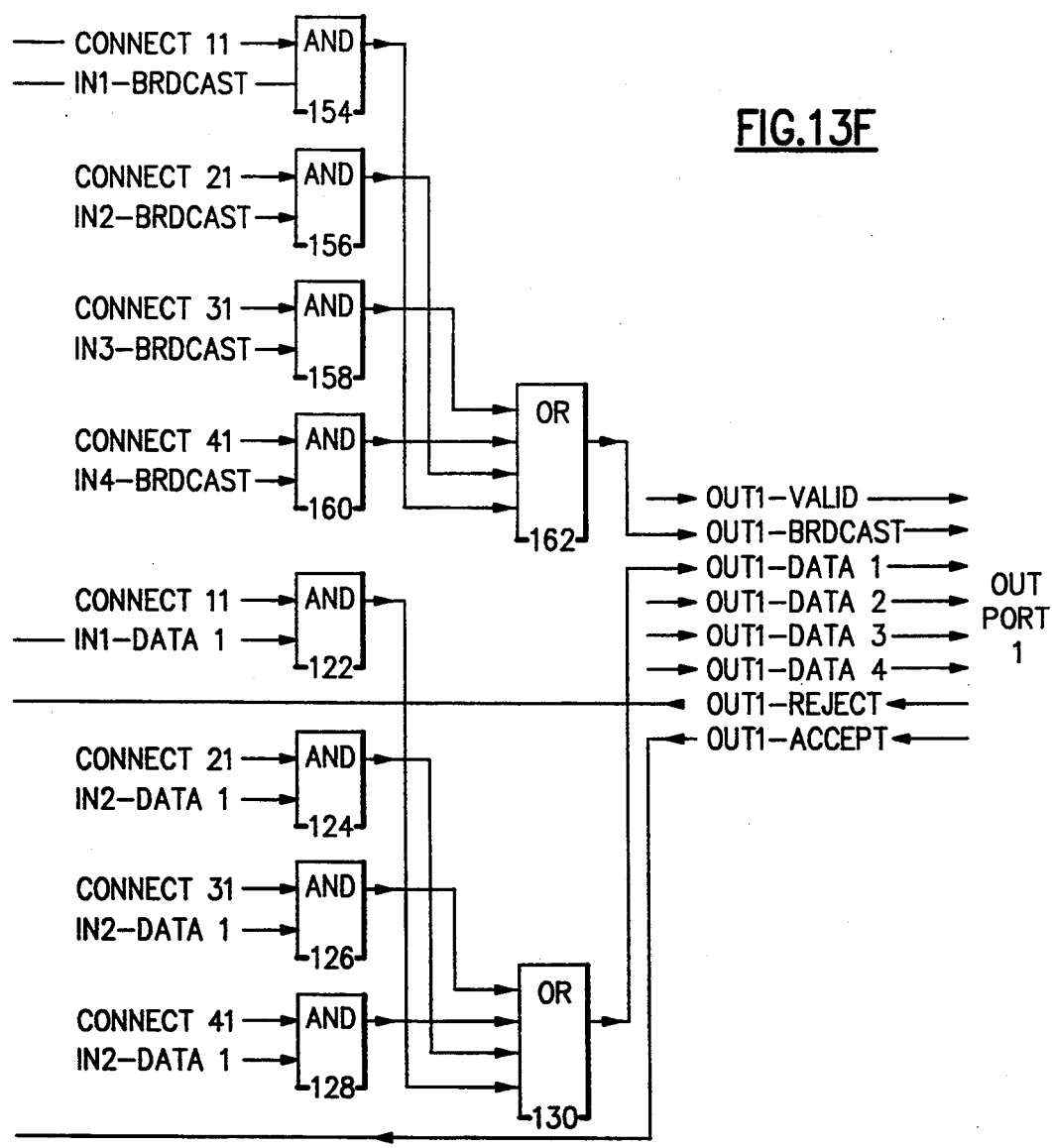

FIG.13F

NOTE: THE DFF LATCH SHOWN ABOVE HAS THE FOLLOWING CHARACTERISTICS:

THE TOP OUTPUT OF THE LATCH (Q) IS SET EQUAL TO THE VALUE ON THE D INPUT LINE ON THE RISING EDGE OF THE C INPUT LINE PROVIDING BOTH THE S AND R INPUTS ARE NOT ACTIVE (UP).

THIS MAKES THE DFF LATCH A STORAGE DEVICE WHICH IS POSITIVE EDGE TRIGGERED.

THE BOTTOM OUTPUT OF THE LATCH (−Q) IS THE LOGICAL INVERSE OF THE TOP OUTPUT (Q).

THE SET (S) AND RESET (R) INPUTS ARE NEGATIVE ACTIVE WITH RESET HAVING PRECEDENCE OVER SET, AND BOTH HAVING PRECEDENCE OVER C AND D INPUTS.

| FIG. 14A | FIG. 14B | FIG. 14C |
| --- | --- | --- |
| FIG. 14D | FIG. 14E | FIG. 14F |

| FIG. 15A | FIG. 15B | FIG. 15C |
|---|---|---|
| FIG. 15D | FIG. 15E | FIG. 15F |

BROADCAST/SWITCHING APPARATUS FOR EXECUTING BROADCAST/MULTI-CAST TRANSFERS OVER UNBUFFERED ASYNCHRONOUS SWITCHING NETWORKS

RELATED APPLICATIONS

The present United States patent application claims priority and is related to the following application of which it is a continuation-in-part: U.S. Ser. No. 07/677,543, Filed Mar. 29, 1991, entitled "ALLNODE SWITCH—AN UNCLOCKED, UNBUFFERED, ASYNCHRONOUS, SWITCHING APPARATUS" Lusch et al.

The present United States patent application is also related to the following United States patent and patent applications filed concurrently herewith.

U.S. Ser. No. 07/748,302, Filed Aug. 21, 1991 entitled "MULTI-SENDER/SWITCHING APPARATUS FOR STATUS REPORTING OVER UNBUFFERED ASYNCHRONOUS MULTI-STAGE NETWORKS"; Olnowich et al.

U.S. Ser. No. 07/748,303, Filed Aug. 21, 1991 entitled "SYNC-NET—A BARRIER SYNCHRONIZATION APPARATUS FOR MULTI-STAGE NETWORKS"; Olnowich et al.

U.S. Pat. No. 5,250,943 entitled "GVT-NET—A GLOBAL VIRTUAL TIME CALCULATION APPARATUS FOR MULTI-STAGE NETWORKS"; Olnowich et al.

These applications and the present application are owned by one and the same assignee, namely, International Business Machines Corporation of Armonk, N.Y.

The descriptions set forth in the previous application and the concurrently filed applications are hereby incorporated herein by reference.

FIELD OF THE INVENTIONS

This invention relates to unbuffered asynchronous switching networks, and particularly to byte-wide parallel hardware using parallel crossbar switches for a, byte parallel multi-sized interface switch for broadcasting and multi-casting over multi-staged switching networks.

Definition of Terms

The following definitions may be useful to some readers.

ARBITRATION—The act of selecting one winner at a time from a set of multiple contenders.

ARBITRATION SWITCH—A switching apparatus capable of resolving contention among several or multiple contenders.

BROADCAST—A specific connection pattern internal to an interconnection network that allows one transmitting element to send and be connected to all receiving elements attached to the network.

BROADCAST COMMANDS OR MESSAGES—Commands or messages that are sent via an interconnection network from one transmitting element to all receiving elements.

BROADCAST/SWITCHING APPARATUS—A switching apparatus that has the inherent means required to establish BROADCAST connections.

CLOCK TIME—the time interval measured by periodic signals for synchronization of data and control characters.

DEAD FIELD—the transmission of zeroes on all eight data lines to the interconnection network for a specific length of time (usually one clock time) by the transmitting element.

INPUT PORT—The connection channel or set of twelve communication signal lines required to connect a transmitting element to an interconnection network or to connect the the previous stage of a cascaded switching apparatus to the present stage.

MULTI-CAST—A specific connection pattern internal to an interconnection network that allows one transmitting element to send and be connected to a subset of receiving elements attached to the network.

MULTI-CAST COMMANDS OR MESSAGES—Commands or messages that are sent via an interconnection network from one transmitting element to a subset of receiving elements.

MULTI-DROP—A multiple (element). A multi-drop bus has one or more multi-drop nodes. A Multi-drop network is a configuration in which there are one or more intermediate nodes on the path (bus) between a central node and an endpoint node.

NETWORK—A multiplicity of switching apparatus devices interconnected in a fixed pattern for the purpose of interconnecting multiple system elements and permitting the elements to exchange communication commands and messages.

NODE—A device or system element attached to an interconnection network. Used interchangeably with system element.

OUTPUT PORT—The connection channel or set of twelve communication signal lines required to connect an interconnection network to a receiving element or to connect the next stage of a cascaded switching apparatus to the present stage.

PATH SELECTION—The act of programming the switching apparatus to select a specific path or route through the interconnection network for the purpose of interconnecting two or more system elements via the network.

POINT to POINT—a connection having one and only one transmitter and one and only one receiver.

RECEIVING ELEMENT or RECEIVING NODE—A system element attached as a node to an interconnection network that has the capability of receiving commands or messages from the said network.

STANDARD OPERATION—A connection through the network for the purpose of connecting one and only one transmitting element to one and only one receiving element.

SWITCHING APPARATUS—The circuit element comprising an interconnection network that provides programmable connection links allowing the network to instantaneously make and break a variety of interconnection patterns without having to physically change any interconnection wires.

TRANSMITTING ELEMENT or TRANSMITTING NODE—A system element attached as a node to an interconnection network that has the capability of sending commands or messages to the network. A element which is capable both transmitting and receiving will be referred to as a transmitting element when in the act of sending to the network and will be referred to as a receiving element when it is in act of receiving from the network.

BACKGROUND OF THE INVENTIONS

In the patent literature, there are many patents which deal with broadcast mechanisms. Some broadcast mechanisms are not implemented by hardware. For instance, U.S. Pat. No. 4,818,984 to S. J. Chang et al. issued on Apr. 4, 1989, describes a broadcast mechanism implemented in software.

Switching networks are different from busses and local area networks (LANs). For instance, it would be recognized that U.S. Pat. No. 4,926,375 to F. L. Mercer et al. issued on May 15, 1990, relates to a broadcast mechanism implemented over a multi-drop bus. U.S. Pat. No. 4,706,080 to W. D. Sincoskie issued on Nov. 10, 1987, describes a broadcast mechanism implemented over several multi-drop busses; as does U.S. Pat. No. 4,855,899 to S. D. Presant issued on Aug. 8, 1989; as also does the publication by IBM in the TECHNICAL DISCLOSURE BULLETIN; IBM TDB Vol. 30, No. 1, 6/87 pg 72–78, POLL ACTUATED MULTIPLE ACCESS TECHNIQUE FOR BROADGATHERING SYSTEMS.

There are several patents which describe broadcast mechanisms for LANs. U.S. Pat. No. 4,754,395 to B. P. Weisshaar et al. issued on Jun. 28, 1988, describes a broadcast mechanism implemented over a serial, loop-connected LAN. U.S. Pat. No. 4,835,674 to R. M. Collins et al. issued on May 30, 1989, describes a broadcast mechanism implemented over multi-drop busses tied to LANs and broadcasting over the entire set-up.

Some broadcast mechanisms are designed for synchronized, multiplexed time slot, bit oriented networks, as represented by U.S. Pat. No. 4,897,834 to J. R. Peterson et al. issued on Jan. 30, 1990, and others such as U.S. Pat. No. 4,766,592 to E. Baral et al. issued on Aug. 23, 1988, describe a broadcast mechanism implemented over a synchronized, multiplexed time slot, telephone line hook-up. IBM TDB Vol. 22, No. 12, 5/80 pg 5450–52, DISTRIBUTED STAR NETWORK WITH UNROOTED TREE TOPOLOGY describes a broadcast mechanism implemented over an unrooted tree network which uses synchronous transmissions and packet switching.

Other mechanisms are designed for transmission lines. U.S. Pat. No. 4,935,866 to R. Sauvajol et al. issued on Jun. 19, 1990, describes a broadcast mechanism implemented over a synchronous, transmission line, communication link. U.S. Pat. No. 4,941,084 to M. Terada et al. issued on Jul. 10, 1990, describes a broadcast mechanism implemented over a transmission line, loop interconnect arrangement. U.S. Pat. No. 4,815,105 to S. Bottoms et al. issued on Mar. 21, 1989, describes a broadcast mechanism implemented over a transmission line, telephone line type interconnect arrangement. While telephone switches have employed crossbar switches, generally they do not use parallel connect crossbar switches.

There is a need for improved switching network approaches using parallel connect crossbar switches (a non-loop or transmission line approach) for circuit switching networks for asynchronous, dedicated path (not time slotted), byte-wide parallel direct connect switching. The present broadcast mechanism relates to multi-stage networks.

Some prior multi-stage switching networks have been developed. U.S. Pat. No. 4,956,772 to P.M. Neches issued on Sep. 11, 1990, provided a buffered packet synchronous switch. This complex single serial interface line switch requires data recovery capabilities. It needs a complex priority determination built into each switch stage and brings the broadcast command bits into the switch serially. Another packet switch which relates to a multi-stage switching network is U.S. Pat. No. 4,701,906 to M. N. Ransom et al. issued on Oct. 20, 1987. It also is a buffered synchronous packet switch and provides for a handshaking interface. It brings the broadcast command bits into the switch serially, and the complex switch also requires data recovery capabilities. It is a single serial interface and appears not to have considered the need for an asynchronous byte-wide parallel interface for broadcast applications.

Broadcasting a message from one device to N devices through a multi-stage network composed of BUFFERED switching devices is a relatively simple task. At each switch the message is fanned-out to all the switch outputs by inserting it into a queue (ordered buffer) associated with each output. The transmitter of the broadcast message does not have to concern itself with contention at each switch output (i.e., the output being busy transmitting previously initiated messages). If the output is busy, the broadcast message merely goes into a queue of messages waiting to use the output and eventually will get its turn and the broadcast message will propagate slowly through the network. However, there are three drawbacks to using buffered networks. They are usually relatively slow; there is the problem of not knowing when the broadcast will arrive, and certainly it will arrive at vastly different times at the various receiving devices; and buffered networks usually require synchronization across all transmitting and receiving devices as well as the network switches themselves. Synchronous systems are finding it more and more difficult to meet the ever-increasing communication demands of modern parallel processing systems; they are just not fast enough to keep pace with the rapidly increasing computer clock rates, and thus they are becoming a high risk problem.

On the other hand, UNBUFFERED asynchronous networks can provide greatly improved speed at a much lower complexity, risk, and cost. However, one of the problems usually inherent with unbuffered networks is that they cannot BROADCAST messages (i.e. send messages over the switching network from one device to all the devices attached to the network).

In addition, there is arising a new need in the parallel processing field to send a multi-cast message from one device to a specific set of devices attached to the network but not to all the devices as broadcast does. In general multi-cast is an even harder function to implement through an unbuffered switching network than is broadcast.

SUMMARY OF THE INVENTION

The present invention provides a solution applicable to performing both broadcast and multi-cast transfers over switching networks, in addition to the point-to-point transfers normally supported by the networks. In particular, the disclosure applies to byte-wide parallel hardware using parallel crossbar switches for a byte parallel multi-sized interface switch for communicating over multi-staged switching networks. This solution not only makes the broadcast and multi-cast operations easy to do in unbuffered asynchronous networks but also gives a far superior broadcast capability in comparison to buffered networks in that the broadcast message propagates quickly and arrives simultaneously at all receiving devices. This means that for the first time, time synchronization information and operation synchronization transfers can occur in a parallel processor system via a broadcast message.

The broadcast method described in this invention is predicated on the unbuffered asynchronous switch described in U.S. Ser. No. 07/677,543, filed Mar. 29, 1991, (the parent application) entitled "ALL-NODE Switch—an Unclocked, Unbuffered, Asynchronous, Switching Apparatus", which performs the basic point-to-point transfers over the network. According to the objects of this invention, functions, interface lines, and hardware are added to the ALL-NODE Switch to enhance it to additionally perform broadcast and multi-cast functions from any element connected to the network.

In accordance with the invention the broadcast/switching apparatus provides an unbuffered multi-stage network for interconnecting several or many system elements. The invention apparatus provides a means for broadcasting or multi-casting commands or messages among these elements. Commands are usually shod transfers of several bytes which communicate control information such as reset, set timer, halt, etc. Messages can be of any length and are used to transfer data and commands requiring supporting data to the elements of the system. These elements include processors, I/O devices, and other system components which use the network as a means for communication among themselves. Within this environment the present invention provides, characteristically, that the network can operate in a broadcast mode to send commands simultaneously from any one element to all other elements or in a multi-cast mode to send commands simultaneously from any one element to a specific subset of all the elements.

It is a feature of our inventions that we provide a unique interface line to and from each element to define the activation of broadcast or multi-cast mode. The system has the ability to process one broadcast or multi-cast operation at a time, in that it will reject other subsequent attempts to broadcast or multi-cast and will hold them pending to be retried when the present broadcast or multi-cast completes.

In accordance with our inventions, we provide a hardware circuit for a common broadcast/multi-cast design function which works equally well at any stage whatsoever of the network.

The broadcast/switching apparatus has the ability to delay the transmission of a broadcast or multi-cast command or message until all required network paths become available to pass the command or message. In addition, the invention apparatus has the capability of providing a positive feedback acknowledgment that it has made connections to all the commanded paths. This is provided uniquely for each stage of the network.

Also, we have included a further acknowledgment means to provide to each sending element with a positive verification and feedback that a broadcast or multi-cast transmission has been completed successfully.

These features and other improvements are described in the following description. For a better understanding of the inventions, together with related features, reference may be made to the previous ALL-NODE switch application for background. Further, specifically as to the improvements described herein, reference should be made to the following description and the associated drawings.

BRIEF DESCRIPTION OF THE DRAWINGS

FIG. 9 illustrates the method of selecting and establishing a transmission path through a network comprised of the invention broadcast/switching apparatus for the purpose of sending simultaneous multi-cast data from one node to several other nodes.

FIG. 12 shows a typical timing diagram for the interface signals arriving at one input port of the invention broadcast/switching apparatus, illustrating the signal sequences for the rejection of an attempt to issue a broadcast or multi-cast message because the invention apparatus is processing a previously initiated broadcast or multi-cast message.

FIG. 13 is a key to reconstruction of FIGS. 13A–13F.

FIGS. 13A, 13B, 13C, 13D, 13E, and 13F illustrate the detailed logic implementation for a portion of the invention broadcast/switching apparatus, the portion enabling the switch to establish a single data transfer, broadcast, or multi-cast connection between input port 1 and output port 1 of the preferred 4×4 broadcast/switching apparatus embodiment.

DETAILED DESCRIPTION OF THE PREFERRED EMBODIMENTS

Figure 1:
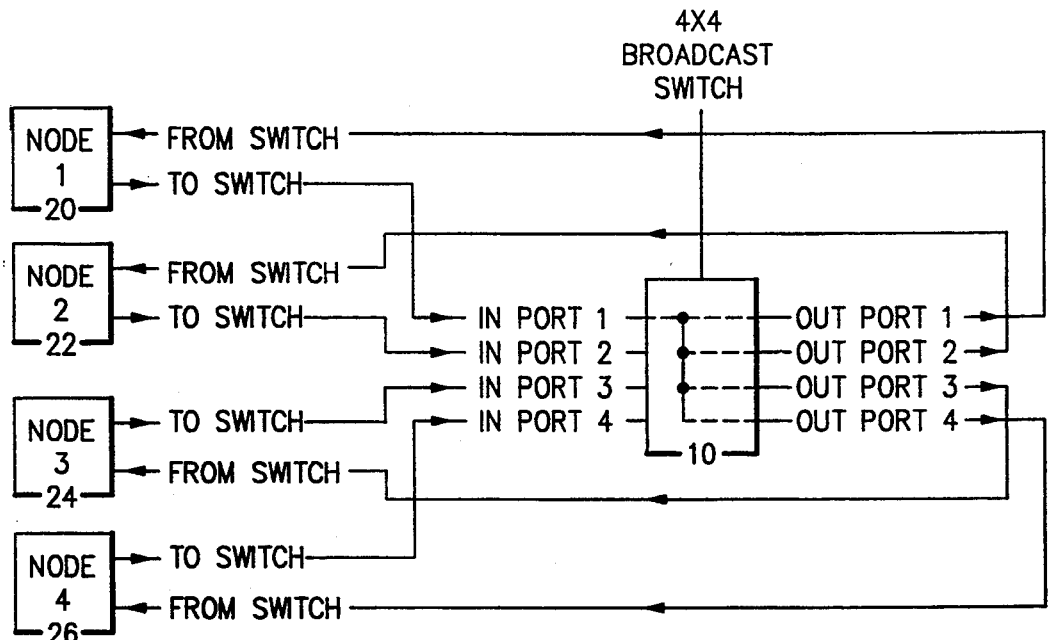
FIG. 1 illustrates generally our preferred embodiment of the present invention as a 4-input to 4-output crossbar broadcast/switching apparatus.

The preferred embodiment is a 4×4 crossbar broadcast/switching apparatus that can function in any of three modes of operation: a switching mode for connecting any of four input ports on a mutually exclusive basis to any one of four output ports; a broadcast mode for connecting any of four input ports on a mutually exclusive basis to all of the four output ports; and a multi-cast mode for connecting any of four input ports on a mutually exclusive basis to two or three of the four output ports. Referring to FIG. 1, the invention broadcast/switching apparatus 10 is unidirectional, which means that data flows in only one direction across the broadcast/switching apparatus 10, that being from input to output. Although the broadcast/switching apparatus 10 is unidirectional, it supports bidirectional communication among four nodes (20, 22, 24, and 26) by connecting the 4×4 broadcast/switching apparatus 10 as shown in FIG. 1. Each node 20, 22, 24, and 26 has two sets of unidirectional interconnecting wires, one going to the present invention 10 and one coming from the present invention 10. The internal dashed lines shown on the broadcast/switching apparatus 10 indicate that the function of the apparatus is to connect an input port such as IN PORT 1 to one of four possible output ports or to a combination of the four output ports simultaneously. The broadcast/switching apparatus 10 provides exactly the same function for each input port allowing it to be connected to any unused output port or set of unused output ports.

Figure 2:
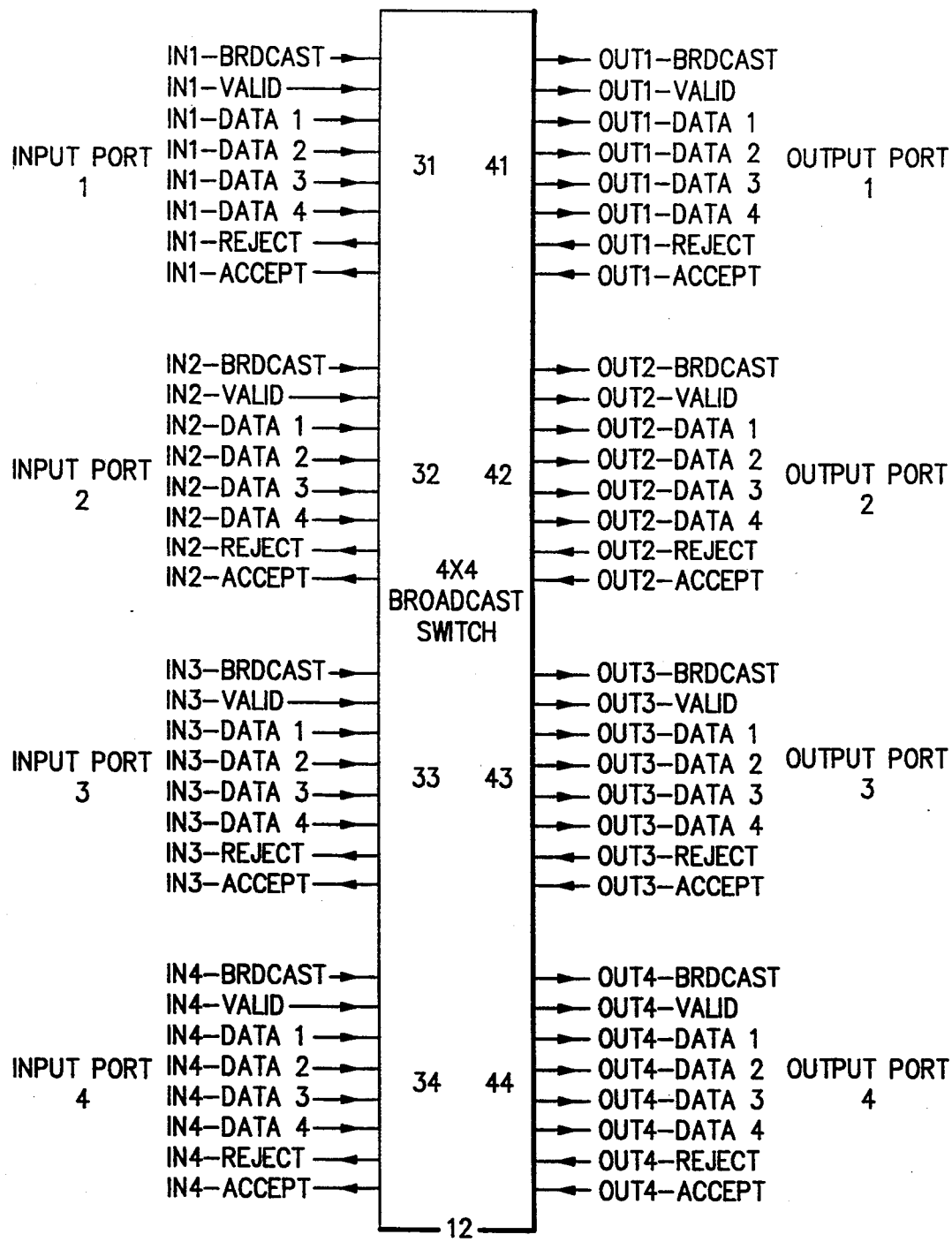
FIG. 2 illustrates a more detailed schematic of the 4×4 crossbar broadcast/switching apparatus that defines its interface connections.

Referring to FIG. 2, block 12 shows an expanded drawing of broadcast/switching apparatus 10 and defines in detail the interface lines connecting to broadcast/switching apparatus 10. The sets of lines 31, 32, 33, and 34 at each input port to the broadcast/switching apparatus 12 are identical in number and function to the sets of lines 41, 42, 43, and 44 at each output port. The sets of interface lines to each input and output port contain eight unique signals: four data lines and four control lines (BRDCAST, VALID, REJECT, and ACCEPT) which are differentiated by a prefix of INx- or OUTx-, indicating the direction and number of the port (x) with which they are associated. The four DATA, one BRDCAST, and one VALID lines have a signal flow in the direction going from input to output across broadcast/switching apparatus 12 while the REJECT and ACCEPT control lines have a signal flow in the opposite direction.

The sets of input port interface lines 31, 32, 33, and 34 transfer control information to broadcast/switching apparatus 12 for the purpose of commanding and establishing input port to output port connections internally to the broadcast/switching apparatus. In addition, the port interface lines also carry data information to be transferred from input port to output port across the broadcast/switching apparatus 12. The four data interface lines contained in interfaces 31, 32, 33, and 34 do not restrict the transfer of data across broadcast/switching apparatus 12 to only four bits of information, but rather the four data lines can each contain a string of serial data making the transmission of any size data possible.

Figure 3:
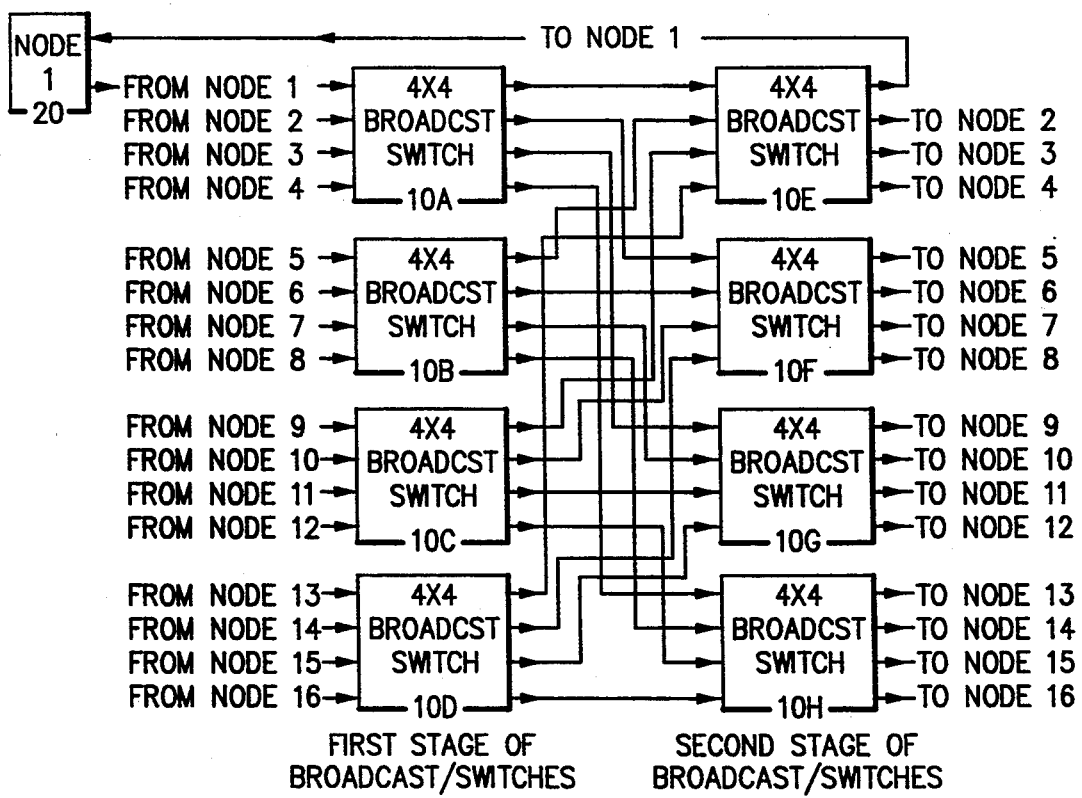
FIG. 3 shows a typical method for cascading the preferred 4×4 embodiment of the invention broadcast/switching apparatus to accommodate systems having more than four nodes.

Referring to FIG. 3, a method is illustrated for increasing the number of nodes in a system by cascading eight broadcast/switching apparatus 10 blocks. The eight cascaded switches are denoted as 10A through 10H to indicate that they are identical copies of broadcast/switching apparatus 10, varying only with regard to the wiring of their input and output ports. From FIG. 3 it can be noted that any of sixteen nodes can communicate to any other node over a connection that passes through exactly two of the broadcast/switching apparatus 10 blocks. For instance, Node 5 can send messages to Node 15 by traversing apparatus 10B and apparatus 10H. Since all connections are made through two broadcast/switching apparatus 10 blocks, the network comprised of the eight broadcast/switching apparatus 10 blocks is referred to as a two-stage network. Other multi-stage networks can be configured from broadcast/switching apparatus 10 blocks by using three stages, four stages, or more in a similar manner.

Figure 4:
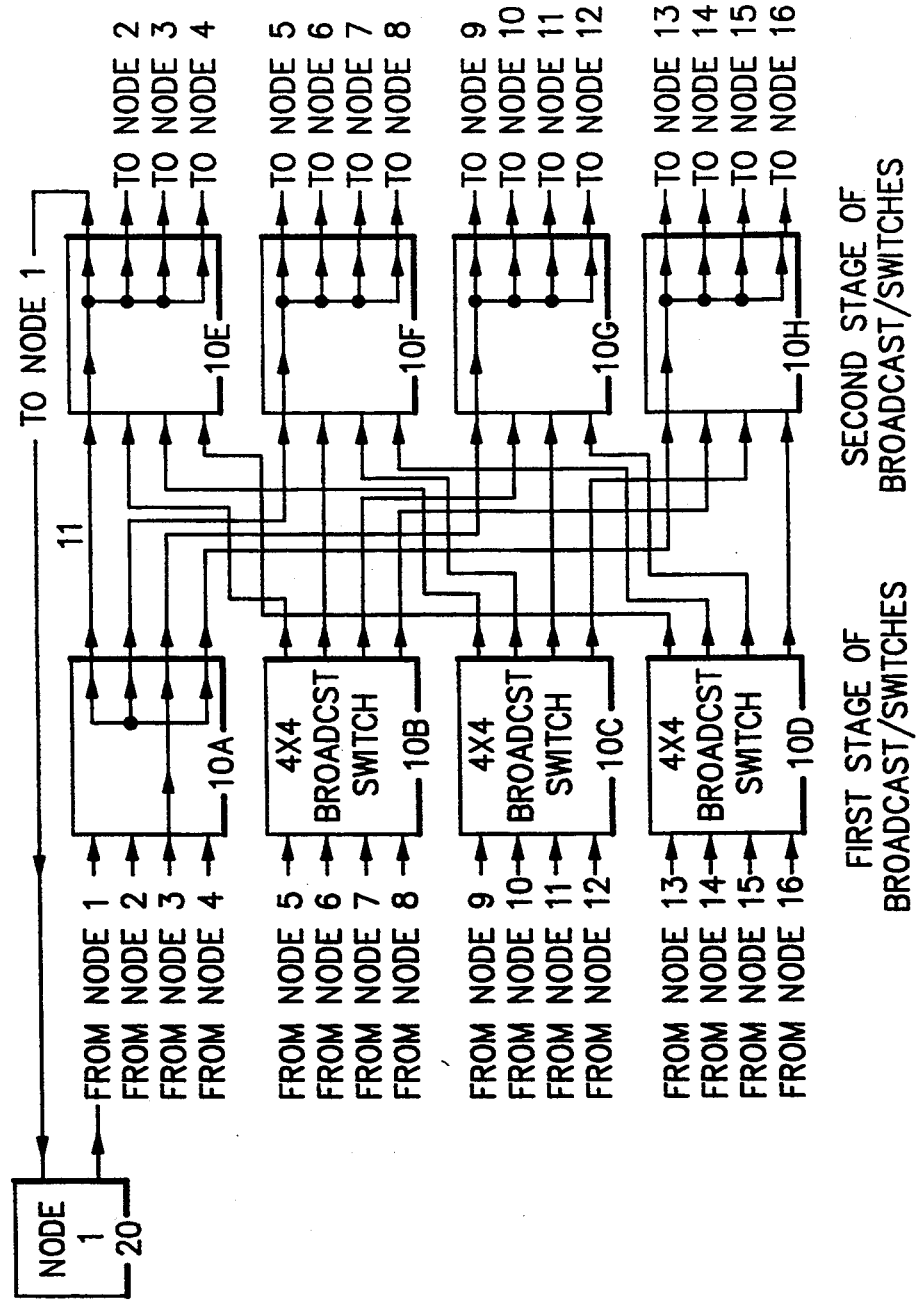
FIG. 4 illustrates a typical broadcast example showing how node 3 broadcasts simultaneously to all sixteen nodes through two stages of broadcast/switching apparatuses.

Referring to FIG. 4, an example is shown of the broadcast/switching apparatus 10 supporting a broadcast command or message from node 3 to all sixteen nodes. Broadcast/switching apparatus 10A in the first stage of the network forms a connection from its input port attached to node 3 to all four of its output ports. Fixed (non-switchable) wiring provides connection paths between the broadcast/switching apparatuses 10 of the first and second stages of the network. Broadcast/switching apparatuses 10E, 10F, 10G, and 10H in the second stage of the network each connect their input port 1 to all four of their output ports. Thus, the broadcast connection from node 3 to all nodes is achieved. Likewise, any input node to the first stage of the network could be connected to broadcast to all nodes. The broadcast/switching apparatus 10 services broadcast connections one at a time.

Figure 5:
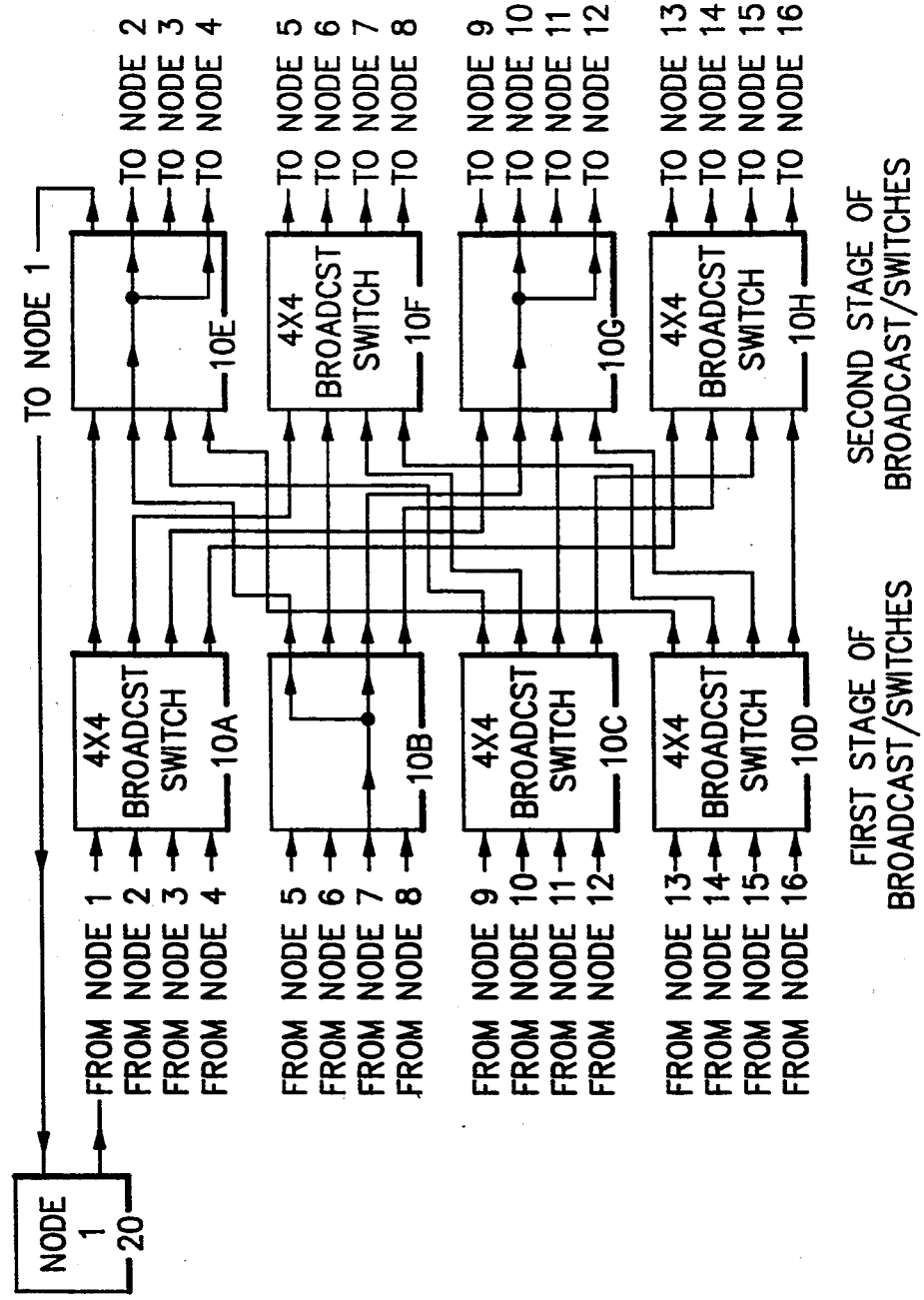
FIG. 5 illustrates a typical multi-cast example showing how node 7 multi-casts simultaneously to nodes 2, 4, 10, and 12 through two stages of broadcast/switching apparatuses.

Referring to FIG. 5, an example is shown of the broadcast/switching apparatus 10 supporting a multi-cast command or message from node 7 to nodes 2, 4, 10, and 12 simultaneously. Broadcast/switching apparatus 10B in the first stage of the network forms a connection from its input port attached to node 7 to its first and third output ports. Fixed (non-switchable) wiring provides connection paths between the broadcast/switching apparatuses 10 of the first and second stages of the network. Broadcast/switching apparatuses 10E and 10G in the second stage of the network each connect their input port 2 to their second and fourth output ports. Thus, the desired multi-cast connection is accomplished. Likewise, any input node to the first stage of the network could be connected to perform a multi-cast operation. The broadcast/switching apparatus 10 services multi-cast connections one at a time.

The broadcast/switching apparatus 10 limits the number and combinations of outputs that form an allowable multi-cast subset. The limit is such that the connection pattern in each stage of the network must be identical for all broadcast/switching apparatuses 10 utilized in that same stage. For instance, the connection shown in FIG. 5 is an allowable connection because all active broadcast/switching apparatuses 10 in the second stage (10E and 10G) use identical output connection patterns; i.e., connections are made in both apparatuses to output ports 2 and 4. However, a multi-cast connection to nodes 2, 4, 11, and 12 would not be an allowable multi-cast operation because apparatuses 10E and 10G would no longer have identical output connection patterns, as 10E would have to connect to its output ports 2 and 4 while 10G would have to connect to its output ports 3 and 4. This multi-cast limitation occurs because of the simple scheme employed to set up broadcast/switching apparatus connections, which is described in detail below.

Figure 6:
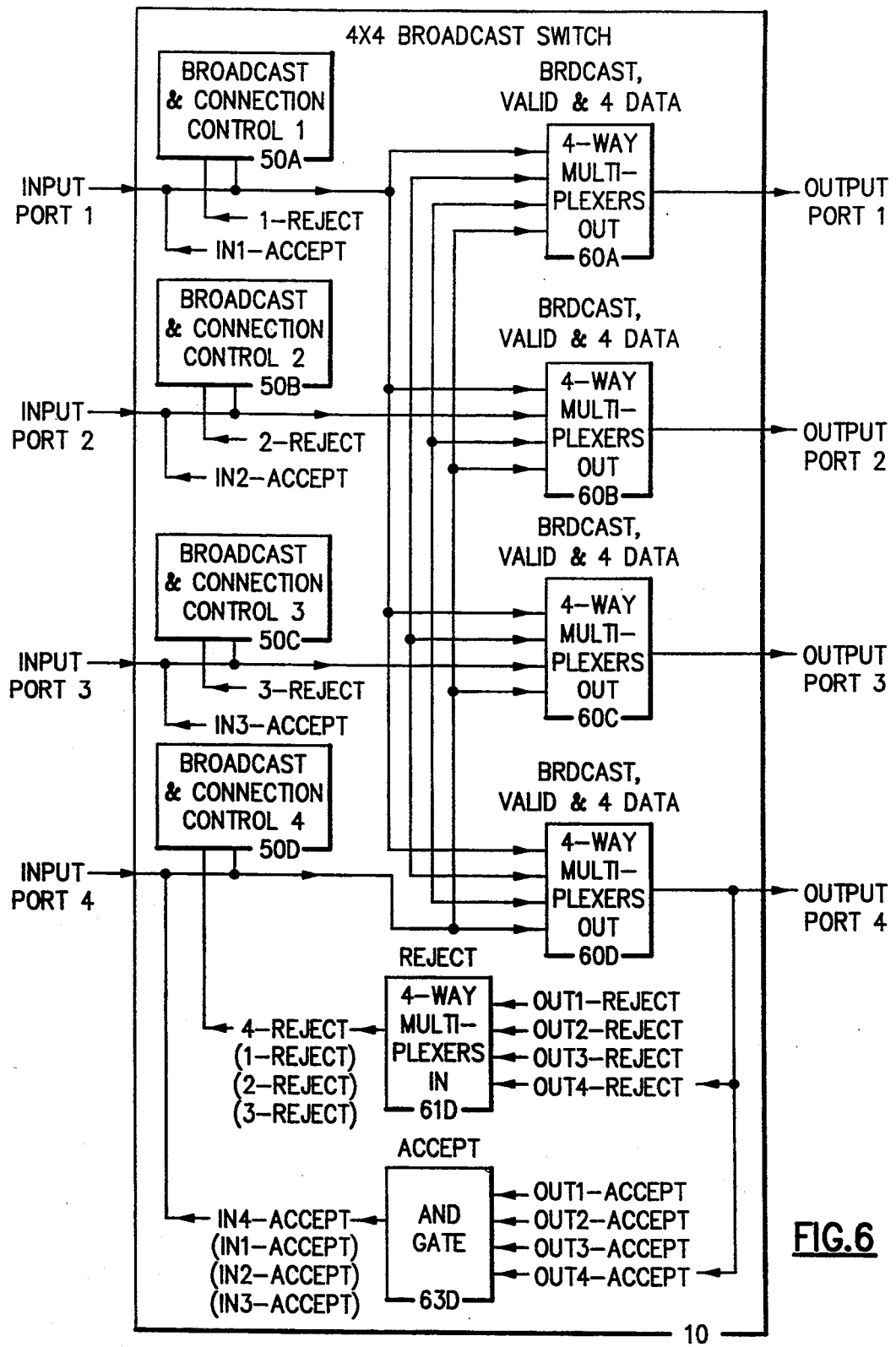
FIG. 6 shows a schematic block diagram of the simple data flow and control path implementations of the invention broadcast/switching apparatus.

Referring to FIG. 6, a functional diagram of the simple data flow across broadcast/switching apparatus 10 is illustrated. The BRDCAST, VALID and four data lines at each input port, inside the broadcast/switch, and at each output port are represented by a single line in FIG. 6 for simplicity. For instance, the BRDCAST, VALID, and four data lines entering broadcast/switch 10 at IN PORT 1 go to five internal functional blocks of broadcast/switching apparatus 10; these are blocks 50A, 60A, 60B, 60C, and 60D. Block 50A makes the decision as to which of the four possible output ports are to be connected to input port 1. The BRDCAST, VALID, and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the BRDCAST, VALID, and data signals across the broadcast/switch 10 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to broadcast/switch 10 of actions taken either by subsequent broadcast/switch 10 stages in a cascaded network or by the device receiving and interpreting the BRDCAST, VALID, and four data signals. A command or message being transmitted through broadcast/switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 7:
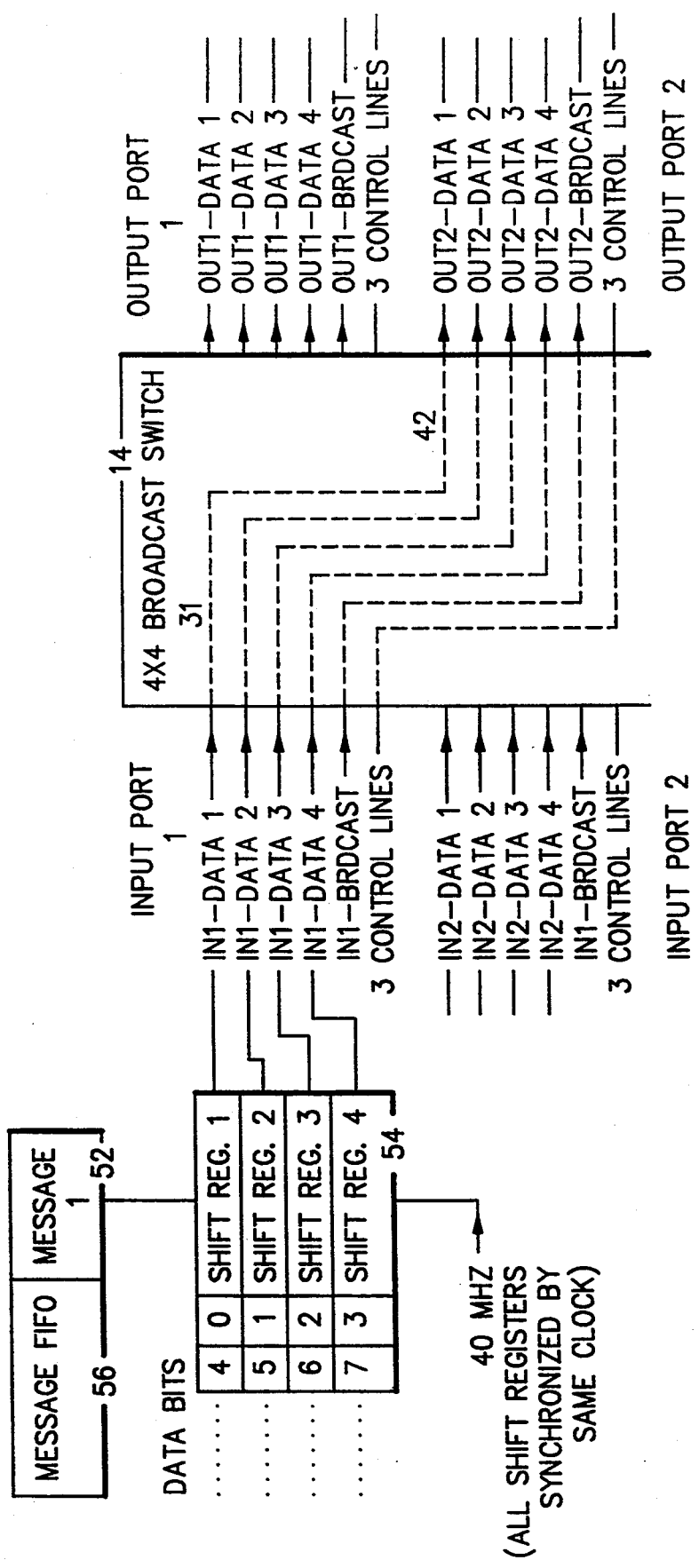
FIG. 7 illustrates a typical method for generating serial control and data information to be sent to the present invention over four synchronous data lines.

The four input ports to broadcast/switching apparatus 10 each originate at a unique source or node (20, 22, 24, and 26) as shown in FIG. 1. Referring to FIG. 7, blocks 52, 54, and 56 illustrate a typical method for generating serial data in the form of a command or message which can be transmitted to and across the broadcast/switching apparatus 14 which is a partial drawing of the broadcast/switching apparatus 10. Similar serial data generation logic as provided by 52, 54, and 56 can be used at each of the other input ports to broadcast/switching apparatus 10. Each set of input data lines provides serial data to a given input port which is synchronized to the same clock by the four shift registers 54 which create serial data by shifting four synchronized lines of data 31 as controlled by the same identical clocking signal (40 MHz in FIG. 7). However, the four different input port sources to broadcast/switching apparatus 14 (31, 32, 33, and 34 in FIG. 2) can be asynchronous to each other, being based on different, non-synchronized, 40 MHz clocking signals.

The process for sending serial messages through broadcast/switching apparatus 14 involves FIFO 56, which accumulates commands or data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, and so on. Shift registers 54 then begin sending serial data to broadcast/switching apparatus 14 over the four synchronized data lines, in such a manner that the serial data flows continuously until the entire message has been transmitted. The broadcast/switching apparatus 14 uses the first 8 bits transmitted (in the first two clock cycles of serial data over interface 31 from serial registers 54 to switching apparatus 14) to select and establish a connection path through the broadcast/switching apparatus 14. The example in FIG. 7 illustrates via dashed lines, the broadcast/switching apparatus establishing a temporary connection between input port 1 (31) and output port 2 (42), such that each of the eight individual lines in interface 31 is uniquely and directly connected to each of the corresponding lines in interface 42.

The convention for indicating to an input port over an interface (such as 31) that there is no transfer in progress is to issue continuous IDLE commands, which are denoted by the four data lines, the BRDCAST control line and the VALID control line being held at logical 0s. The detection of a logical 1 on any of the input lines will signify the departure from the IDLE state and indicate to the broadcast/switching apparatus 10 that a selection and transfer is beginning. Likewise, the output lines from the broadcast/switching apparatus 10 will be held in the IDLE state (at all 0s), when there is no active transfer available.

The broadcast/switching apparatus 10 receives information, over the four data lines coming into each input, port as to which connection or connections (from input port to output port) are to be established. This path selection information must be transferred prior to any command or message that is to be delivered across the network. The broadcast/switching apparatus 10 connections are established first and then the command or message can flow to the selected destination(s). The selection information need NOT identify an input port number (1 to 4) because it is arriving at the broadcast/switching apparatus 10 over a specific input and the apparatus already knows on what input number it is receiving data. Therefore, the selection information need ONLY specify the number (1 to 4) of the output port of broadcast/switching apparatus 10 to which to connect. The method of path selection used is a direct correlation between the four input data lines and the output port to be selected. In addition, there must be a return to zero (called a DEAD FIELD) of the data lines after each path selection is made at each stage of the network.

Figure 8:
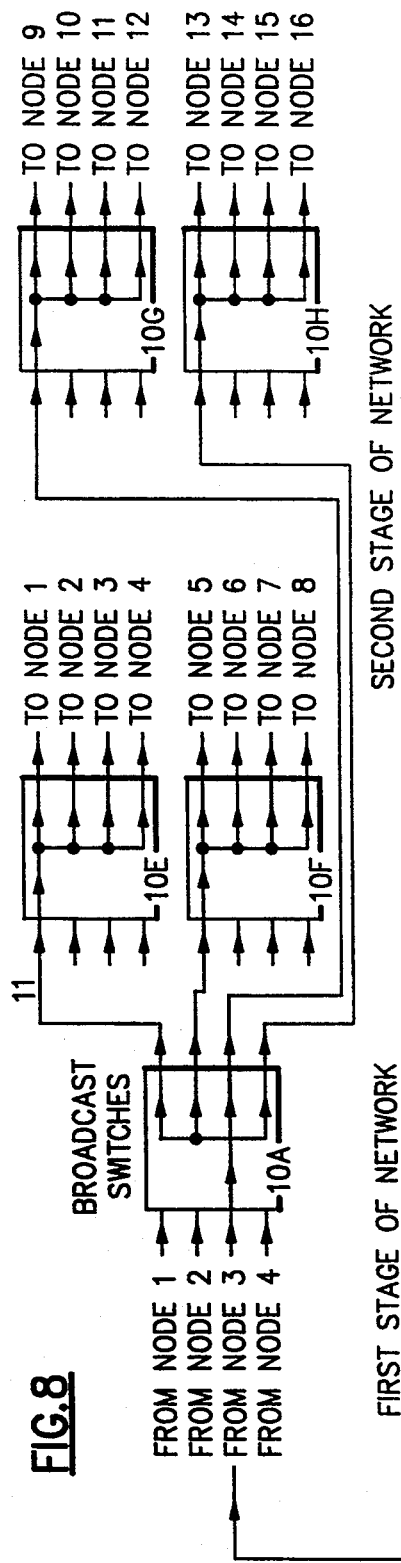
FIG. 8 illustrates the method of selecting and establishing a transmission path through a network comprised of the invention broadcast/switching apparatus for the purpose of broadcasting data simultaneously from one node to all nodes.

Referring to FIG. 8, a typical broadcast example and the exact serial bit patterns and control signal activation are shown for sending control and data information to broadcast/switching apparatus 10. The example references the cascaded, two-stage network shown in FIG. 3 and involves sending data across the network from node 3 through broadcast/switching apparatuses 10A, 10E, 10F, 10G, and 10H to all nodes as shown in FIG. 4. To make this connection, input port 3 must be connected to all the output ports in the first stage broadcast/switching apparatus 10A, and each input port 1 must be connected to all the associated output ports in the second stage broadcast/switching apparatuses 10E, 10F, 10G, and 10H. The signal sequence that is sent to input port 3 to cause the desired connections in broadcast/switching apparatuses 10A, 10E, 10F, 10G, and 10H is shown in FIG. 8. In the signal sequence of 1s and 0s, time advances from left to right so that the values seen at clock time $-2$ arrive at broadcast/switch 10A first, and the values at clock time $-1$ arrive second, etc. Initially, the values of the IN3-DATA, IN3-BRDCAST, and IN3-VALID lines are all zeroes and cause nothing to happen at broadcast/switch 10A during clock time $-2$, because they indicate IDLE. At clock time $-1$, the IN3-VALID line goes to a logical 1. This prepares broadcast/switch 10A by enabling input port 3 to receive subsequent control information, but no connection or action takes place at broadcast/switch 10A at this time. At clock time 0, the IN3-BRDCAST line goes to a logical 1. This further prepares broadcast/switch 10A by enabling input port 3 to receive a broadcast or multi-cast, but no connection or action takes place at broadcast/switch 10A at this time. Finally, at clock time 1, broadcast/switch 10A receives control information as to what output port or ports to connect to; this information is received entirely during clock time 1.

This process is referred to as a path selection operation and takes place completely internally to broadcast/switch 10A. The path selection approach implemented by the present broadcast/switch invention is to let each of the four IN3-DATA lines define a unique output of broadcast/switch 10A to be selected. For instance, the IN3-DATA 1 signal going to a logical 1 at clock time 1 tells broadcast/switch 10A to connect to output port 1, IN3-DATA2 controls connection to output port 2, etc. In our current example, since all four IN3-DATA lines go to logical 1s during clock time 1, broadcast/switch 10A is thereby instructed to connect simultaneously to all four output ports. Note that at least 1 bit of selection information is required to be a logical 1 so that the broadcast/switch 10A will be able to recognize the start of a transmission without requiring any additional bits to signify that a transfer is commencing. The broadcast/switch 10A makes the desired connection by removing the four bits from the data lines and storing them in a selection register in control block 50C of FIG. 6. The bits transmitted during clock time 1 are not passed through broadcast/switch 10A to the subsequent network stage; instead broadcast/switch 10A begins passing the very next four bits of data corresponding to clock time 2 to the next stage on all four of its output ports. However, the information bits following a selection sequence (those transmitted by the four data lines at clock time 2 in our example) must always be all zeroes (a DEAD FIELD) as shown in FIG. 8. The purpose of this will be explained subsequently.

At clock time 2, the connection of broadcast/switch. 10A input port 3 to all four output ports is established and causes the signal sequence at clock time 2 to be transmitted across broadcast/switch 10A and the interconnecting wires 11 to input port 1 of each of the broadcast/switches 10E, 10F, 10G, and 10H, respectively. From this time on, broadcast/switch 10A merely transmits all subsequent input port 3 data immediately and simultaneously to the four second stage broadcast/switches; it never examines or takes any action on any other data patterns presented to broadcast/switch 10A over its input port 3 interface. Thus, at clock time 2, assuming zero delay across broadcast/switch 10A and its associated wiring, input port 1 at all four second stage switches see the BRDCAST and VALID signals rise and the all-zeroes DEAD FIELD on the four data lines coming from the interconnecting wires 11. At clock time 3, all four second stage broadcast/switches simultaneously receive the second stage path selection information being transmitted from node 3. The data pattern present on the IN-DATA lines during clock time 3 instructs the second stage broadcast/switches each to connect their input port 1 to all four of their output ports. These connections are made during clock time 3 in an identical manner to the way broadcast/switch 10A did previously at clock time 1.

Each of the second stage broadcast/switches, in making the desired broadcast connections, removes the four data bits at clock time 3 from the IN-DATA lines and stores them in the selection register which is part of control block 50A of FIG. 6. The bits transmitted during clock time 3 are not passed through the second stage broadcast/switches; instead broadcast/switches 10E, 10F, 10G, and 10H simultaneously begin passing the very next four bits of data corresponding to clock time 4 to all sixteen nodes in a broadcast fashion. However, the information bits following a selection sequence (those transmitted by the four data lines at clock time 4 in our example) must always be all zeroes (a DEAD FIELD) as shown in FIG. 8. Thus, by clock time 4, broadcast/switches 10A, 10E, 10F, 10G and 10H have established a connection path for transferring data directly from Node 3 to all sixteen nodes. Up until clock time 5, the sixteen receiving nodes see nothing but IDLE commands. At clock time 4, the sixteen receiving nodes see their respective BRDCAST and VALID lines coming from the second stage broadcast/switches go active and are thereby enabled to start receiving data at clock time 5. From then on, all sixteen receiving nodes can receive data from Node 3 over their four corresponding IN-DATA lines coming from the second stage broadcast/switches. The protocol of the actual command or message being transmitted can be any of the normal formats such as Manchester-encoded, 8/10 bit encoding with preamble, etc. However, the preferred embodiment, as shown in FIG. 8, is an all-ones synchronization field at clock time 5, followed by the NRZ command or message data. The data message can specify the bit count length of the transfer plus any error detection mechanisms required, such as parity or CRC. The purpose of the synchronization field of all-ones as a prefix to the actual data message is to enable the receiving nodes to synchronize to the sending node 3 in one clock time. This assumes that the nodes involved in the data transfer have clocking systems that are asynchronous to each other but are operating at the same frequency within a specified tolerance.

The preferred embodiment is to transmit the length of the message first during clock time 6 and clock time 7. The receiving nodes then decrement the length count starting at clock time 8 and every subsequent clock time, until the length count goes to zero, indicating the end of the command or message (at clock time n in the example). At some clock time after the start but before the end of the command or message, each receiving node must. drive its ACCEPT interface line to a logical 0 state in preparation for the following error checking sequence. At the end of the message, the receiving nodes can check the message for accuracy using the selected error detection method (parity, CRC, etc.). If the message has been received correctly, each receiving node responds by activating its ACCEPT signal back to the second stage broadcast/switches at clock times n+1 and n+2. The second stage broadcast/switches pass the ACCEPT indication back to broadcast/switch 10A, which in turn returns it immediately to Node 3. Each broadcast/switch 10 logically "ANDs" all the ACCEPT signals it receives from its four output ports as shown by AND gate 63D of FIG. 6. This ANDing of the ACCEPT signals requires that an active ACCEPT signal is sent from all receiving nodes attached to the output ports of each broadcast/switch before an ACCEPT signal is forwarded to the previous broadcast/switch stage or to Node 3. When Node 3 sees the ACCEPT signal go active, it gets a positive feedback indication that the transfer completed successfully to all sixteen nodes. Node 3 then resets its IN3-BRDCAST, IN3-VALID, and four IN3-DATA lines to broadcast/switch 10A to zeroes, thus completing the broadcast and returning its interface to the IDLE state. The IN3-BRDCAST and IN3-VALID input lines going to a zero at clock time n+3 causes broadcast/switch 10A input port 3 to break its connection to all four output ports, returning them to the IDLE state. Immediately, broadcast/switches 10E, 10F, 10G, and 10H see their respective IN1-BRDCAST and IN1-VALID input lines go to zero, breaking their connections to all their four output ports and returning them to the IDLE state. Thus, the connections can be broken and the broadcast/switches returned to IDLE in as little as one clock time. If Node 3 has another broadcast or non-broadcast message to transmit, it can load the next message into buffer 52 and shift registers 54 (FIG. 7) and begin transmission as soon as clock time n+4. The only restriction is that the VALID signal generated by Node 3 must return to zero for a minimum of one clock time (time n+3) to signify the end of one transfer before beginning another.

Node 3 has the capability of terminating a data transfer at any time by resetting its IN3-BRDCAST, IN3-VALID, and four data lines to broadcast/switch 10A to zeroes, indicating a return to the IDLE state. This will immediately break all associated network connections in both stages and signify to all participating nodes that the transfer has been terminated by a return to the IDLE state.

If any node finds an error in the command or message it has received after the length count has gone to zero at clock time n, it responds by not activating its ACCEPT interface line back to the corresponding second stage broadcast/switch 10E, 10F, 10G, or 10H; i.e., it continues to drive its ACCEPT line to a logical 0 rather than to a logical 1. This forces the ACCEPT signal, generated in that second stage broadcast/switch by AND gate 63D (FIG. 6), to propagate a logical 0 back to broadcast/switch 10A in the first stage. Likewise, AND gate 63D in broadcast/switch 10A passes a logical 0 back on its IN3-ACCEPT line to node 3. Node 3 or any transmitting node allows a shod time period for all the nodes to respond with an ACCEPT to the broadcast transmission. If it has not received an ACCEPT indication back from the broadcast after that shod time period, Node 3 then notes that the transfer was not ACCEPTed by all nodes, and returns to the IDLE state by resetting its IN3-BRDCAST and IN3-VALID lines to zeroes. Some receiving nodes will have received the broadcast correctly and others may not have. The nodes that received it correctly can process the command or message while those that did not must return a message to node 3 indicating their node number and that they did not get the broadcast correctly. Node 3 may then retry the transmission individually to each node that did not get the broadcast correctly. If the same node continues not to ACCEPT the command or message, such that a specified number of retries is surpassed, an error reporting mechanism may be invoked.

Referring to FIG. 9, a typical multi-cast example and the exact serial bit patterns and control signal activation are shown for sending control and data information to broadcast/switching apparatus 10. The example involves sending data across the two stage network shown in FIG. 5 from node 7 through broadcast/switching apparatuses 10B, 10E, and 10G to nodes 2, 4, 10, and 12. To make this connection, the third input port (attached to node 7) must be connected to output ports 1 and 3 in the first stage broadcast/switching apparatus 10A, and input port 2 must be connected to output ports 2 and 4 in the second stage broadcast/switching apparatuses 10E and 10G. The signal sequence that is sent to input port 3 of broadcast/switch 10B to cause the desired connections in broadcast/switching apparatuses 10B, 10E, and 10G is shown in FIG. 9. In the signal sequence of 1s and 0's, time advances from left to right, so that the values seen at clock time −2 arrive at broadcast/switch 10B first, and the values at clock time −1 arrive second, etc. Initially, the values of the IN3-DATA, IN3-BRDCAST, and IN3-VALID lines are all zeroes and cause nothing to happen at broadcast/switch 10B during clock time −2, because they indicate IDLE. At clock time −1, the IN3-VALID line goes to a logical 1. This prepares broadcast/switch 10B by enabling input port 3 to receive subsequent control information, but no connection or action takes place at broadcast/switch 10B at this time. At clock time 0, the IN3-BRDCAST line goes to a logical 1. This further prepares broadcast/switch 10B by enabling input port 3 to receive a broadcast or multi-cast, but no connection or action takes place at broadcast/switch 10B at this time. Finally, at clock time 1, broadcast/switch 10B receives control information as to what output port or ports to connect to; this information is received entirely during clock time 1. This path selection operation is the same as that described above for the broadcast case except that the path selection pattern in this example is different. During clock time 1, the IN3-DATA1 and IN3-DATA3 signals going to a logical 1 state tells broadcast/switch 10B to connect to output port 1 and output port 3, respectively, while the IN3-DATA2 and IN3-DATA4 signals being zeroes instructs broadcast/switch 10B not to make connections to output ports 2 and 4. The broadcast/switch 10B makes the desired connections by removing the four bits from the data lines and storing them in a selection register in control block 50C of FIG. 6. The bits transmitted during clock time 1 are not passed through broadcast/switch 10B to the subsequent network stage; instead broadcast/switch 10B begins passing the very next four bits of data corresponding to clock time 2 on its output ports 1 and 3 to broadcast/switches 10E and 10G in the next stage. However, the information bits following a selection sequence (those transmitted by the four data lines at clock time 2 in our example) must always be all zeroes (a DEAD FIELD) as shown in FIG. 9. The purpose of this will be explained subsequently.

At clock time 2, the connection of broadcast/switch 10B input port 3 to output ports 1 and 3 is established as a multi-cast connection and causes the signal sequence at clock time 2 to be transmitted across broadcast/switch 10B and the interconnecting wires 13 to input port 2 of broadcast/switches 10E and 10G, respectively. From this time on, broadcast/switch 10B merely transmits all subsequent input port 3 data immediately and simultaneously to broadcast/switches 10E and 10G in a multi-cast fashion; it never examines or takes any action on any other data patterns presented to broadcast/switch 10B over its input port 3 interface. Thus, at clock time 2, assuming zero delay across broadcast/switch 10B and its associated wiring, input port 2 of broadcast/switches 10E and 10G see the BRDCAST and VALID signals rise and the all zeroes DEAD FIELD on the four data lines coming from the interconnecting wires 13. At clock time 3, broadcast/switches 10E and 10G simultaneously receive the second stage path selection information being transmitted from node 7. The data pattern present on the IN-DATA lines during clock time 3 instructs them each to connect their input port 2 to their output ports 2 and 4. Broadcast/switches 10E and 10G make these connections during clock time 3 in an identical manner to the way broadcast/switch 10B did previously at clock time 1.

Each of the second stage broadcast/switches, in making the desired multi-cast connections, removes the four data bits at clock time 3 from the IN-DATA lines and stores them in the selection register which is pad of control block 50B of FIG. 6. The bits transmitted during clock time 3 are not passed through the second stage broadcast/switches; instead, broadcast/switches 10E and 10G simultaneously begin passing the very next four bits of data corresponding to clock time 4 to Nodes 2, 4, 10, and 12 in a multi-cast fashion. Note that during a multi-cast operation, the second stage path selection information which is transmitted at clock time 3 goes simultaneously to all selected second stage broadcast/switches 10. This is true of any network stage in larger networks as well and leads to a limitation in the multi-cast operation. The output ports selected at each broadcast/switch 10 in a given network stage must receive the same path selection pattern. This means that there are only certain meaningful multi-cast patterns that are allowable. FIG. 9 shows one of these allowable patterns since the stage two broadcast/switches selected (10E and 10G) have the same internal connection pattern (input port 2 to output ports 2 and 4).

By clock time 4, broadcast/switches 10B, 10E, and 10G have established the connection path for transferring data directly from Node 7 to Nodes 2, 4, 10, and 12. The information bits following a selection sequence (those transmitted by the four data lines at clock time 4 in our example) must always be all zeroes (a DEAD FIELD) as shown in FIG. 9. Hence, up until clock time 5, the four receiving nodes see nothing but IDLE commands. At clock time 4, the four selected receiving nodes see their respective BRDCAST and VALID lines coming from the second stage broadcast/switches go active and are thereby enabled to start receiving data at clock time 5. From then on, all four selected receiving nodes can receive data from Node 7 over their four corresponding IN-DATA lines coming from the second stage broadcast/switches. The first information seen by the four selected receiving nodes, as shown in FIG. 9, is an all-ones synchronization field at clock time 5, followed by the NRZ data carrying a command or message. The data message can specify the bit count length of the transfer plus any error detection mechanisms required, such as parity or CRC. The purpose of the synchronization field of all-ones as a prefix to the actual data message is to enable the receiving nodes to synchronize to the sending node 7 in one clock time. This assumes that the nodes involved in the data transfer have clocking systems that are asynchronous to each other but are operating at the same frequency within a specified tolerance.

The preferred embodiment is to transmit the length of the message first during clock time 6 and clock time 7. The receiving nodes then decrement the length count starting at clock time 8 and every subsequent clock time, until the length count goes to zero, indicating the end of the command or message (at clock time n in the example). At some clock time after the start but before the end of the command or message, each receiving node must drive its ACCEPT interface line to a logical 0 state in preparation for the following error checking sequence. At the end of the message, the receiving nodes can check the message for accuracy using the selected error detection method (parity, CRC, etc.). If the message has been received correctly, each receiving node responds by activating its ACCEPT signal back to the second stage broadcast/switches at clock times n+1 and n+2. The second stage broadcast/switches pass the ACCEPT indication back to broadcast/switch 10B, which in turn returns it immediately to Node 7. Each broadcast/switch 10 logically "ANDS" all the ACCEPT signals it receives from its four output ports as shown by AND gate 63D of FIG. 6. This ANDing of the ACCEPT signals requires that an active ACCEPT signal be sent from all receiving nodes attached to the output ports of each broadcast/switch before an ACCEPT signal is forwarded to the previous broadcast/switch stage or to Node 7. In order for the ACCEPT function to operate accurately in multi-cast mode, the switch must cause the ACCEPT interface lines from all output ports NOT involved in the multi-cast to go to a logical 1 so they will not prevent the propagation of an accurate ACCEPT indication from the nodes that are involved. This is accomplished internally by broadcast/switch 10 and is described in more detail later. Thus, the AND gates 63D in each broadcast/switch 10 are primed to pass accurate ACCEPT feedback indications for multi-cast commands or messages. When Node 7 sees the ACCEPT signal go active, it gets a positive feedback indication that the transfer completed successfully to all selected nodes. Node 7 then resets its IN3-BRDCAST, IN3-VALID, and four IN3-DATA lines to broadcast/switch 10B to zeroes, thus completing the multi-cast and returning its interface to the IDLE state. The IN3-BRDCAST and IN3-VALID input lines going to a zero at clock time n+3 cause broadcast/switch 10B input port 3 to break its connection to output ports 1 and 3, returning them to the IDLE state. Immediately, broadcast/switches 10E and 10G see their respective IN2-BRDCAST and IN2-VALID input lines go to zero, breaking their connections to their output ports 2 and 4 and returning them to the IDLE state. If Node 7 has another multi-cast, broadcast, or other message to transmit, it can load the next message into buffer 52 and shift registers 54 (FIG. 7) and begin transmission as soon as clock time n+4.

Node 7 has the capability of terminating a data transfer at any time by resetting its IN3-BRDCAST, IN3-VALID and four data lines to broadcast/switch 10B to zeroes, indicating a return to the IDLE state. This will immediately break all associated network connections in both stages and signify to all participating nodes that the transfer has been terminated by a return to the IDLE state.

If any selected node finds an error in the command or message it has received after the length count has gone to zero at clock time n, it responds by not activating its ACCEPT interface line back to the corresponding second stage broadcast/switch 10E or 10G; i.e., it continues to drive its ACCEPT line to a logical 0 rather than to a logical 1. This forces the ACCEPT signal, generated in that second stage broadcast/switch by AND gate 63D (FIG. 6) to propagate a logical 0 back to broadcast/switch 10B in the first stage. Likewise, AND gate 63D in broadcast/switch 10B passes a logical 0 back on its IN3-ACCEPT line to Node 7. Node 7 or any transmitting node allows a short time period for all the selected nodes to respond With an ACCEPT to the multi-cast transmission. If it has not received an ACCEPT indication back from the multi-cast after that shod time period, Node 3 then notes that the transfer was not ACCEPTED by all selected nodes and returns to the IDLE state by resetting its IN3-BRDCAST and IN3-VALID lines to zeroes. Some receiving nodes will have received the multi-cast correctly and others may not have. The nodes that received it correctly can process the command or message while those that did not must return a message to node 7 indicating their node number and that they did not get the multi-cast correctly. Node 7 may then retry the transmission individually to each node that did not get the multi-cast correctly. If the same node continues not to ACCEPT the command or message, such that a specified number of retries is surpassed, an error reporting mechanism may be invoked.

Figure 10:
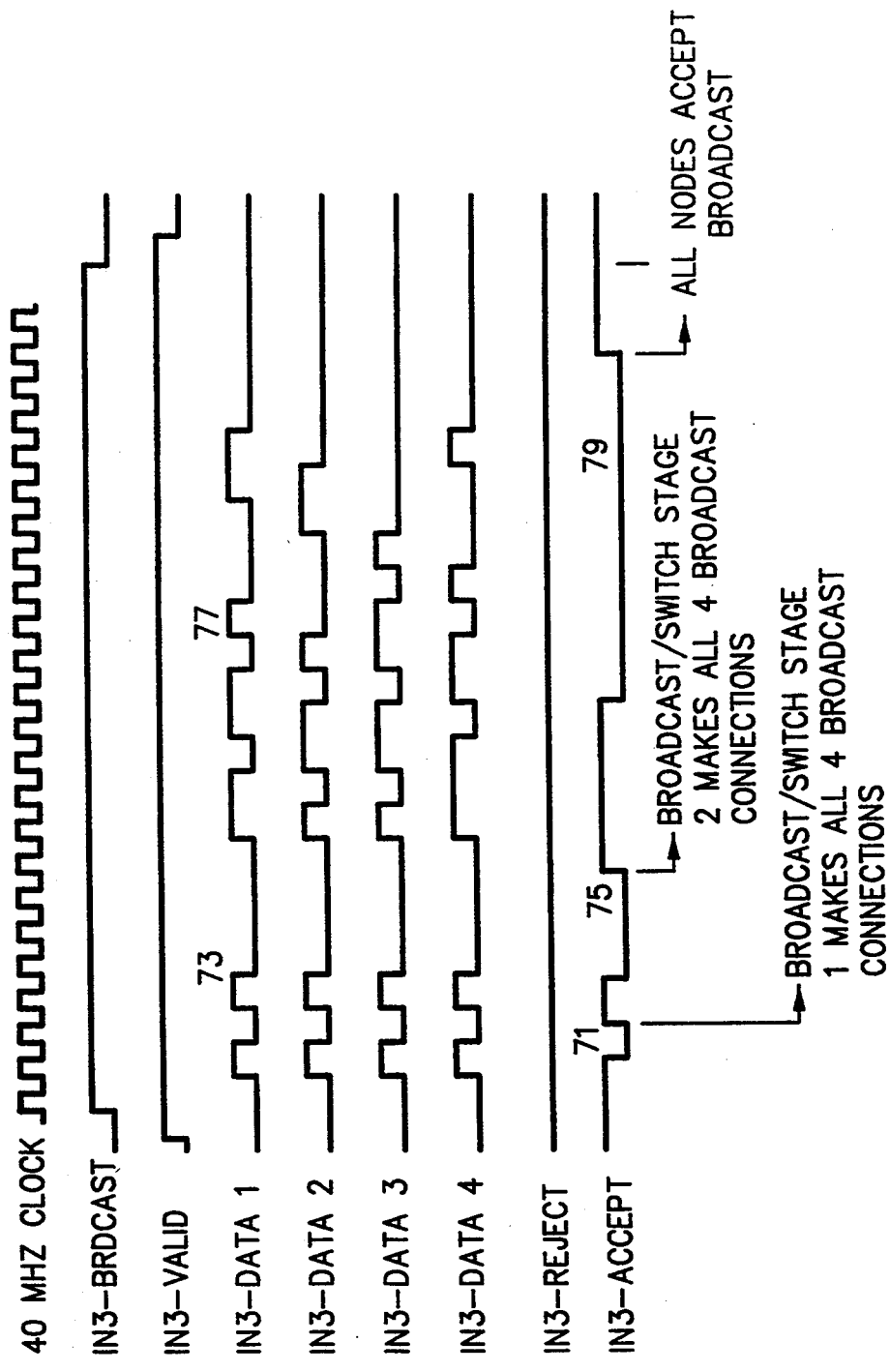
FIG. 10 shows a typical timing diagram for the interface signals arriving at one input port of the invention broadcast/switching apparatus, illustrating the signal sequences for a successfully transmitted broadcast or multi-cast message that is accepted by the entire set or subset of intended receiving elements.

Referring to FIG. 10, typical timing signals at an input port to the broadcast/switch 10 are shown for a broadcast operation. The signal timings are the same for a multi-cast operation as well. IN3-BRDCAST and IN3-VALID bracket the entire transfer. The first set of simultaneous pulses on the four IN3-DATA lines carries the path selection information for network stage 1. The second set carries the path selection information for network stage 2. The sending node does not transmit the second set of selection bits until it has received a positive feedback indication via the IN3-ACCEPT signal that the first stage connections have been made successfully. Similarly, it does not transmit the data to the receiving nodes until it receives a positive feedback via the IN3-ACCEPT signal that all the stage 2 connections have been made successfully. Path selection for broadcast or multi-cast operations is more complex than standard point to point connections in a network and requires the positive feedback to aid in the establishment of the network connections whereas the standard connections are much simpler and do not require this feedback (refer to U.S. Ser. No. 07/677,543). Broadcast and multi-cast operations require multiple connections to be made at each network stage, yet some of these connections might be busy with transfers in progress from/to other nodes. The broadcast/switch 10 will hold pending any broadcast or multi-cast connection if a path it requires is presently busy being used by a standard connection; once these previously made connections are broken, it can establish the requested broadcast or multi-cast connection. Hence, the broadcast/switch 10 responds differently to the case of busy output ports based on the state of the IN-BRDCAST signal. When the IN-BRDCAST line is a logical 1 the broadcast/switch 10 is signalled that a broadcast/multi-cast connection is in progress which will be held pending until any requested output port that is busy due to a standard connection becomes available; then it will make the requested connection. When the IN-BRDCAST line is a logical 0 at the start of a transfer, the broadcast/switch 10 is signalled that a standard connection is in progress, and it will REJECT the standard connection request if the required output port is busy.

With regard to establishing broadcast/multi-cast connections, as soon as broadcast/switch 10 receives a valid connection request with the IN-BRDCAST line set to a logical 1, it drives to a logical 0 the individual internal ACCEPT signals associated with every output port to which the broadcast/switch is attempting to connect. It also drives to a logical 1 all the internal ACCEPT signals associated with output ports to which it is not attempting to connect. This means that initially AND gate 63D, shown in FIG. 6, returns a logical 0 to the sender or the previous stage over the IN-ACCEPT signal. Then, as the broadcast/switch 10 is able to establish each individual connection based on the selection information it received, it drives that individual internal ACCEPT signal to a logical 1 indicating it has made that one connection. These individual connections will be made at different times as output ports free up asynchronously, but eventually all the requested connections internal to that broadcast/switch 10 will be established, and AND gate 63D will activate the IN-ACCEPT signal. This signifies the sender or the previous network stage that all the requested connections have been completed successfully.

Note that the default state of the IN-ACCEPT signal is a logical 1, meaning that when an input port is not in use, the IN-ACCEPT signal is driven to an up-level. This is different from all the other broadcast/switch 10 interface signals. This gives some protection against a failed receiving node preventing the full ACCEPTANCE of a broadcast/multi-cast command or message due to the case where it has been disabled. When disabled a node will output the default state of the ACCEPT and REJECT signals; this will be a logical 1 for ACCEPT and a logical 0 for REJECT. The default value on the ACCEPT interface signal enables AND gate 63D to pass all other ACCEPT signals correctly.

Referring to FIG. 10, the ACCEPT signal is shown having an IDLE state of one to perform three functions in the indicated broadcast operation. First, during the stage 1 path selection sequence, the IN3-ACCEPT signal is momentarily driven low but rises after a shod time duration (interval 71), indicating that all four output ports were immediately available and that connection to them was made successfully right away. When the sending node sees the ACCEPT line rise, it is instructed to proceed and immediately places the second stage path selection information on the IN3-DATA lines (interval 73). The IN3-ACCEPT signal immediately falls for a second time but stays low for a longer time (interval 75), indicating that all sixteen second stage connections were not immediately available. However, when they do become available and all the required connections are made, the ACCEPT signal is once again raised by each second stage broadcast/switch. The ACCEPT indication ripples back across the network to inform the sender that all requested connections have been made successfully. The sending node then broadcasts the serial data 77 to all selected nodes simultaneously. After each selected receiving node begins to receive its serial data (command or message), it drives its ACCEPT interface line to a zero; this ripples back through the network in the normal fashion, so the sending node sees the IN3-ACCEPT line go to zero for the third time. Once all of the serial data 77 has been transferred, each receiving node performs any required error checking on the data it received. If no errors are found, each individual receiving node drives its own ACCEPT interface line to a one. The network ANDs these individual ACCEPT signals and propagates the result back to the sender. Hence, providing that no receiving node detected any errors, the IN3-ACCEPT to the sending node rises at the end of interval 79, informing the sender of the successfully completed transmission. The sending node then terminates the transmission by dropping the IN3-BRDCAST and IN3-VALID signals which propagate forward through the network, resetting connections associated with that transfer, freeing up network paths and returning all receiving nodes to the IDLE state.

Figure 11:
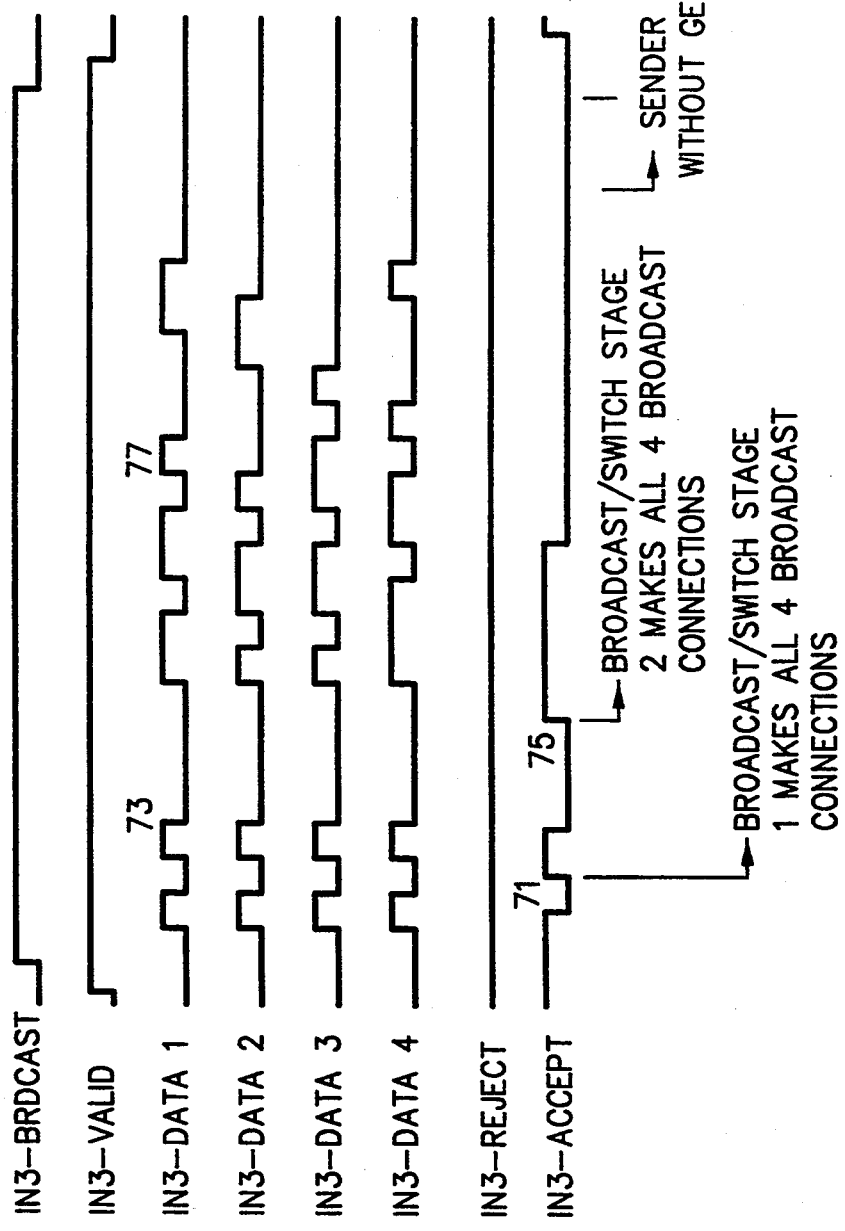
FIG. 11 shows a typical timing diagram for the interface signals arriving at one input port of the invention broadcast/switching apparatus, illustrating the signal sequences for transmitting a broadcast or multi-cast message that is not accepted by one or more of the intended receiving elements.
Figure 13A:
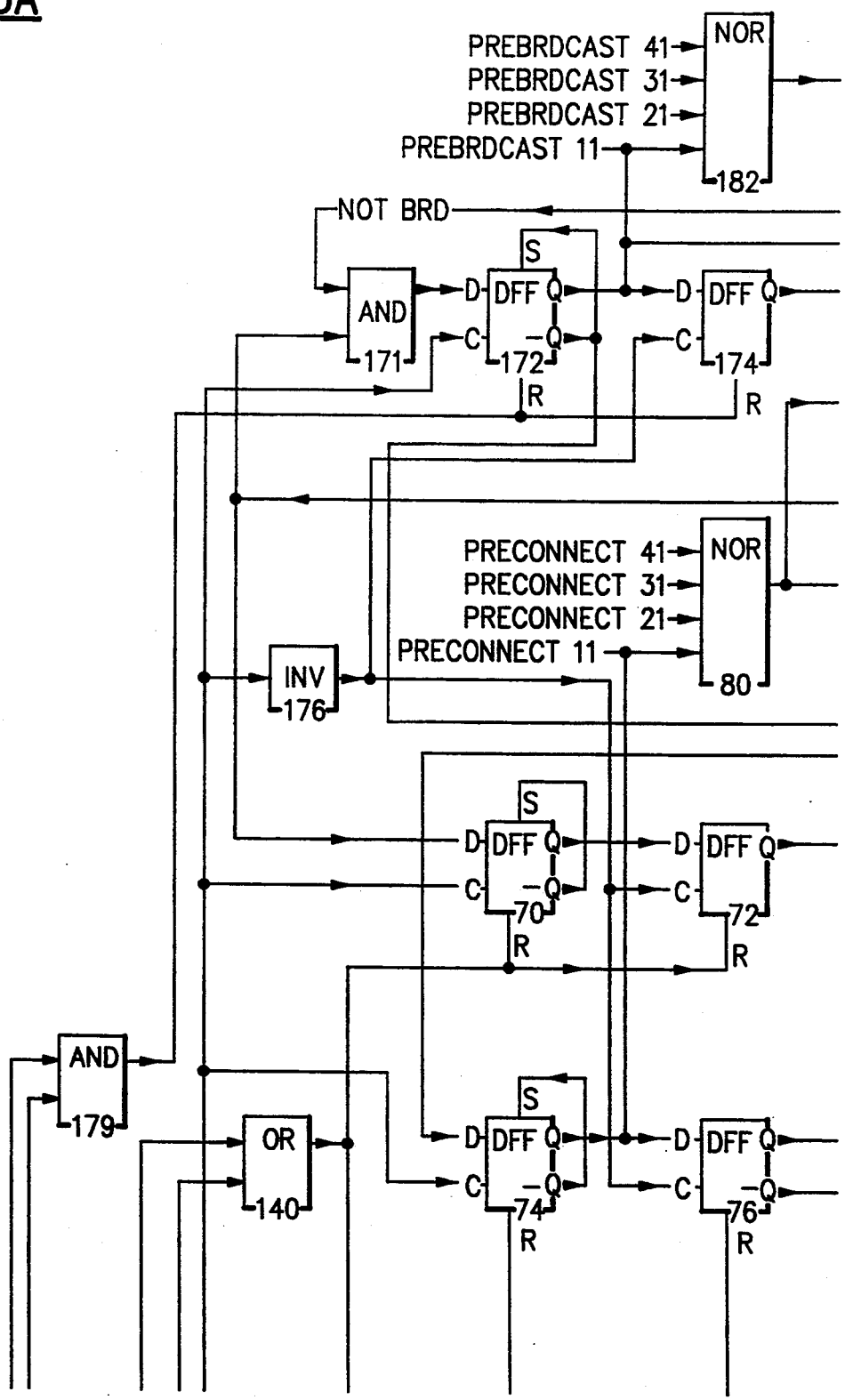
Figure 13B:
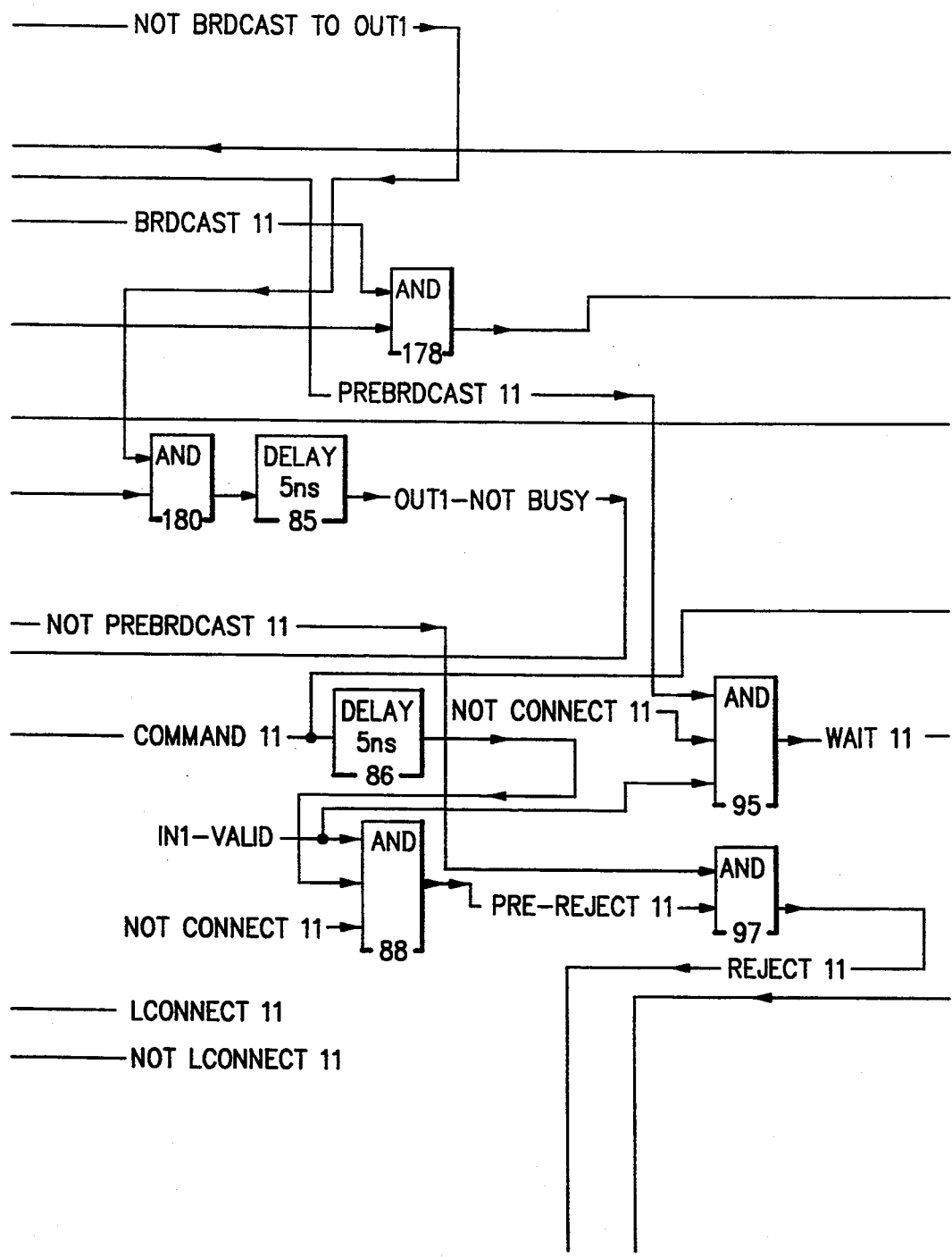
Figure 13C:
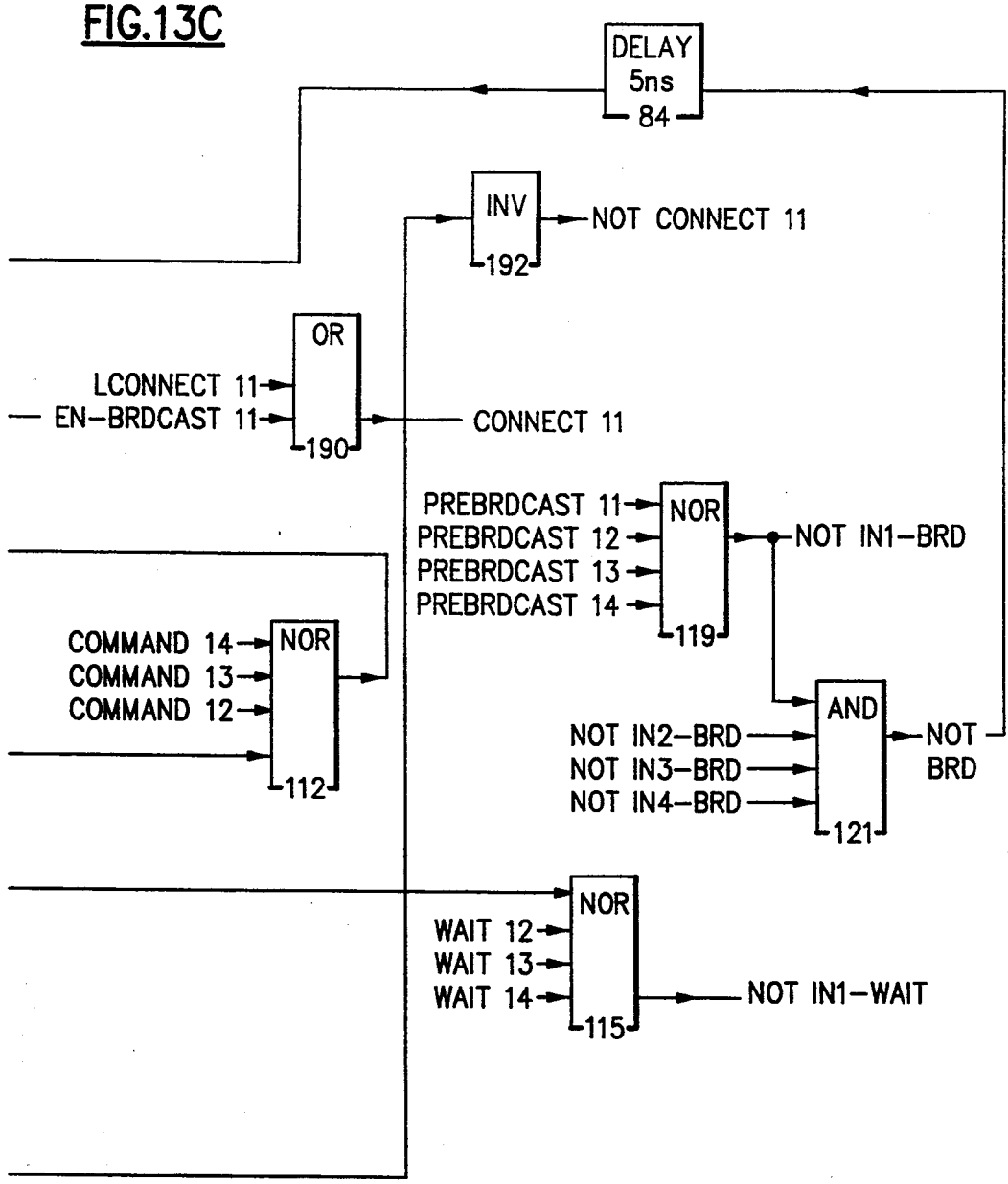
Figure 13D:
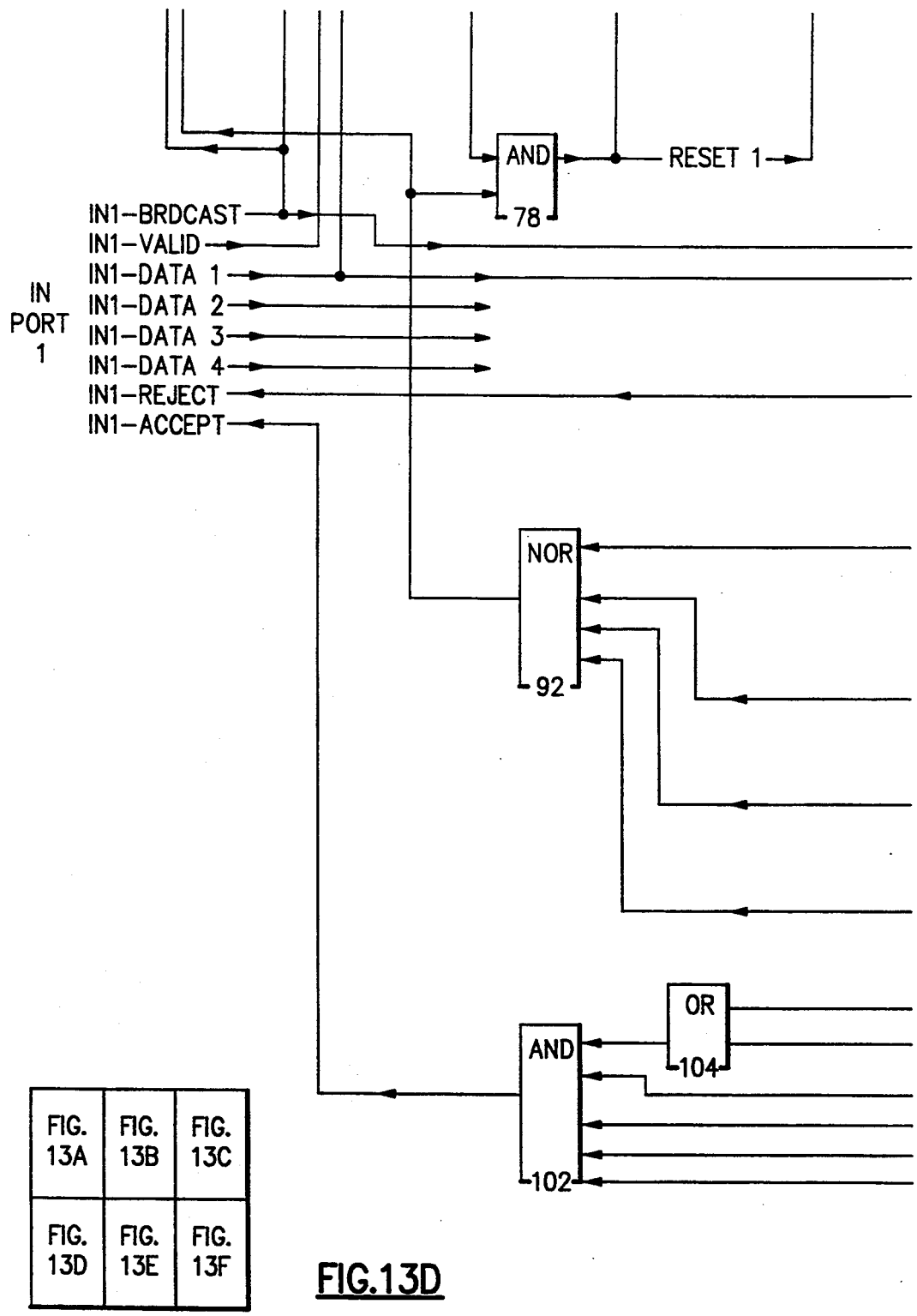
Figure 13E:
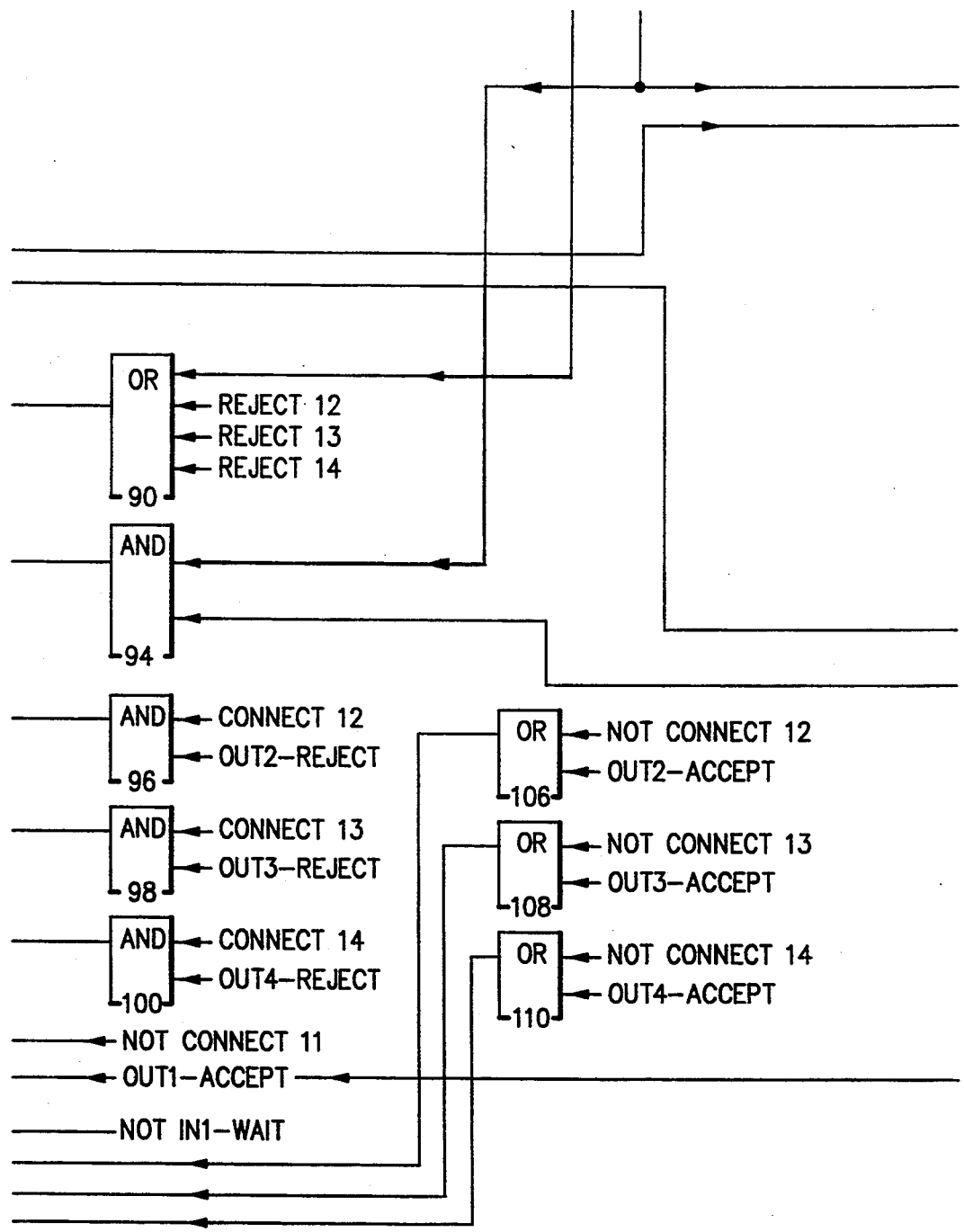

Referring to FIG. 11, the timing sequence is shown for the case where one or more receiving devices do not ACCEPT the serial data and do not raise their ACCEPT signals at the end of the command or message. In this case, the third rise of IN3-ACCEPT signal to complete the transmission is prevented because a logical 0 on one or more receiving node ACCEPT lines has blocked the AND gates 63D in the network from passing a one to the sending node. In this case, the sending node performs a shod time-out when it does not get the ACCEPT indication and then drops its IN-BRDCAST and IN-VALID signals, resetting all connections from that sending node, freeing up network paths and returning all receiving nodes to the IDLE STATE.

The discussion thus far has centered on the broadcast/switch 10 establishing its requested connections. However, it is also possible for any broadcast/switch 10 in a network to REJECT a connection. This can occur for either of two cases:

1) BROADCAST BUSY—If the broadcast/switch 10 is instructed to make a broadcast or multi-cast connection and that path is already BUSY performing a previously initiated broadcast or multi-cast, the newest broadcast request is rejected. Each broadcast/switch 10 will support only one broadcast/multi-cast. operation at any given time and will reject all subsequent concurrent attempts. The broadcast/switch 10 will signify this condition to the input port issuing the concurrent broadcast/multi-cast by activating that port's REJECT line back to the previous network stage or to the sending node. Referring to FIG. 12, the timing for rejecting a broadcast/multi-cast operation is shown. FIG. 12 shows the first stage of the network accepting a broadcast request and making the desired connections in the same manner as described previously. However, stage 2 of the network has a broadcast/switch 10 which has a previous broadcast/multi-cast operation in progress so that broadcast/switch 10 rejects the new broadcast by activating the REJECT line (interval 81) and returning to its IDLE STATE. The REJECT signal from stage 2 ripples back to stage 1, causing it to return the REJECT indication (interval 83) back to the sending node. In turn, the sending node drops its IN3-BRDCAST and IN3-VALID signals, resetting all connections in the first stage broadcast/switch and returning it to the IDLE state. The sending node must then retry the broadcast/multi-cast operation until it succeeds in establishing all of its desired connections and transmits the serial data.

2) SIMULTANEOUS BROADCAST CONTENTION—This situation occurs when two or more sending nodes try to establish broadcast/multi-cast connections to the same broadcast/switch 10 at approximately the same time. In this case, the broadcast/switch 10 resolves the contention during the DEAD FIELD time shown in FIGS. 8 and 9 by allowing one contending node to win the desired connection while the others lose and are REJECTed. The present invention resolves this contention in several steps. First, it makes the connection of all contending input ports to the same requested output port. The net effect is to electrically connect the two or more input ports to the same output port by simultaneously enabling two or more inputs to a multiplexer like 60A in FIG. 6. This will logically OR the signals coming from the multiple sources but will NOT cause an error in the network because the values present on the contending input ports-are identical. The BRDCAST and VALID lines for each are logical 1s and the data lines for each contain the DEAD FIELD (logical 0's). However, the data signals from each source will change in later clock times as different serial data arrives from each contending node so an error could be caused if the contention is not resolved before the DEAD FIELDs go away. In other words, broadcast/switch 10 has at most 1 cycle time to correct the decision it made to connect two or more inputs to the same output. Broadcast/switch 10 immediately detects the fact that more than one input is connected to a given output and makes the correction by resetting all but one of the multiple connections. The REJECT signal is then issued in the normal fashion to the input ports whose connections were reset. Broadcast/switch 10 is able to do this before the DEAD FIELD goes away. The decision as to which connection(s) to reset and which one to keep is a decision based on priority. For the preferred embodiment, a simple priority scheme is used as follows: if input port 1 is contending it gets the connection; if input port 1 is not contending and input port 2 is, input port 2 gets the connection; if input ports 1 and 2 are not contending and input port 3 is, input port 3 gets the connection; and input port 4 gets the connection only if no other input port wants it.

Thus, the purpose of the DEAD FIELD in the present invention is to allow one clock time per switch stage to resolve simultaneous contention—either for standard broadcast/switch connections (see U.S. Ser. No. 07/677,543) or for broadcast/multi-cast connections. The secondary purposes of the DEAD FIELD are to cause a falling edge on the selection bit which was active during the previous clock time and to compensate for any timing skew which might be present across the four data lines carrying serial selection data to the cascaded broadcast/switches. The rise and fall of the path selection data bits gives the unclocked broadcast/switch 10 two signal edges (rise and fall) on which it can trigger and make decisions. These are the only two decision making times available to the broadcast/switch 10.

Referring to FIG. 13, the detailed logic implementation of a portion of the invention broadcast/switch 10 is shown. The detailed portion shows the logic required to establish and hold a standard or broadcast/multi-cast connection between input port 1 and output port 1. This portion contains typical implementations of all the major functional blocks of the broadcast/switch 10; these functional blocks are merely replicated to form the entire broadcast/switch 10 capability. The details of making broadcast/multi-cast connections are described in the present disclosure. For the details of making standard point-to-point connections, see U.S. Ser. No. 07/677,543, entitled "Allnode Switch—an Unlocked, Unbuffered, Asynchronous Switching Apparatus".

The major function of control block 50A of FIG. 6, which controls the path selection operation of broadcast/switch 10, is implemented by six control DFF latches 70, 72, 74, 76, 172, and 174. The IN1-BRDCAST signal is logically ORed with the IN1-VALID signal in gate 140 to implement a reset input to latches 70, 72, 74, and 76, such that when both IN1-VALID and IN1-BRDCAST are logical 0's (indicating IDLE), these four latches are held reset (inactive). OR gate 140 is wired directly to the R (reset) input of latches 70 and 72, and indirectly (first going through AND gate 78) to the other two latches. When either or both IN1-BRDCAST or IN1-VALID goes to a logical 1, these four latches become enabled so that they are then capable of being set—but they do not get set at this time. Gate 179 logically ANDs the IN1-BRDCAST signal with the output of NOR gate 92 to implement a reset input to latches 172 and 174 such that when either or both of these signals is a logical 0, these two latches are held reset (inactive). When both IN1-BRDCAST and the output of NOR gate 92 are logical 1's, these two latches become enabled so that they are then capable of being set—but they do not get set at this time. Latches 70, 74 and 172 are set simultaneously when IN-DATA1 rises subsequent to IN1-BRDCAST, if the broadcast/switch 10 is not previously busy with a broadcast/multicast operation or making another connection to output port 1. The IN1-DATA1 line's going active is interpreted by broadcast/switching apparatus 10 as a path selection request to connect input port 1 to output port 1. IN1-DATA1 is routed directly to the C (clock) input of latches 70, 74 and 172 and causes them to set on its rising signal edge if the associated D (data) input is a logical 1. The latch 70 data input coming from NOR gate 112 will always be a logical 1 when the first data line to rise subsequent to IN1-VALID is IN1-DATA1; thus when switch 10 receives a request to connect input port 1 to output port 1, latch 70 will always set, regardless of whether BUSY or CONTENTION conditions exist for output port 1. This is not true for latch 74, which will not set if output port 1 is previously BUSY as indicated by NOR gate 80 through gate 180 and delay 85 to the data input of latch 74. It is also not true for latch 172, which will not set if a previous broadcast is active in this broadcast/switch 10 (BROADCAST BUSY) as indicated by NOR gate 119 through AND gate 121, delay block 847 and AND gate 171 to the data input of latch 172. The feedback of the −Q output signals from latches 70, 74, and 172 to their respective S (set) inputs is for the purpose of continually keeping the latches set after they have been initially set via the C and D inputs. Thus, once set, latches 70, 74, and 172 will remain set until a reset is signaled; i.e., the waveforms on the C and D inputs will have no further effect on the state of these three latches.

Gate 176 inveds the IN1-DATA1 signal and sends it to the C inputs of latches 72, 76, and 174. Since their D inputs are connected to the Q outputs of latches 70, 74, and 172, respectively, latches 72, 76, and 174 assume the values of latches 70, 74 and 172, respectively, but not until IN1-DATA1 falls (at the beginning of the subsequent DEAD FIELD). At this time latch 72 records and holds the fact that COMMAND 11 has been issued; i.e., that a request has been made to connect input port 1 to output port 1 (denoted by 11)—this latch can set either for a standard or broadcast/multi-cast operation. Latch 76 performs the actual connection of 11 (if output port 1 is NOT BUSY) by setting its Q output indicating LCONNECT 11—this latch too can set either for a standard or broadcast/multi-cast operation. If output port 1 is BUSY, latch 74 will not be set and latch 76 indicates that it cannot make the connection by activating its −Q output of NOT LCONNECT 11. Latch 174 records whether the present operation is a broadcast/multi-cast operation and if it is the first such operation to become active within the broadcast/switch. If gates 119 and 121 indicate that no broadcast/multi-cast operation is active or pending, latches 172 and 174 will both set in sequence, winning the right for input port 1 to be the one broadcast/multi-cast operation allowed within the broadcast/switch at this time. Hence, the BRDCAST 11 signal from latch 174 being set proclaims that input port 1 currently has control over the broadcast/multi-cast capability of this broadcast/switch. Latch 174's not being set means either that the present operation is not a broadcast or multi-cast or that input port 1 has encountered a BROADCAST BUSY condition and will be REJECTED. Latches 172 and 174 will become used only for broadcast/multi-cast operations. The output of latch 172, designated PREBRDCAST 11, goes to NOR gate 119 and AND gate 121 to cause the NOT BRD signal to go to a logical 0; this prevents the setting of any other latches similar to latch 172 within tile said broadcast/switch (such as latch 572 in FIG. 15) while input port 1 is controlling the broadcast or multicast.

The CONNECT 11 signal of OR gate 190, when active, is used to establish the direct connection of six interface lines between input port 1 and output port 1. The four data lines of input port 1 become connected to the four data lines of output port 1 through multiplexers 60A shown in FIG. 6. The details of a typical connection are shown by AND gate 122 and OR gate 130: CONNECT 11 going active to AND gate 122 causes the output of AND gate 122 to follow directly the values on IN1-DATA1, which is gated through OR gate 130 to OUT1-DATA1. The other AND gates 124, 126, and 128 feeding OR gate 130 will all be held to logical 0's and have no effect on gate 130; this is because normally only one CONNECT signal can be active at any given time, thus enabling a single connection to a specified output port. Therefore, if CONNECT 11 is active to gate 122, CONNECT 21, CONNECT 31, and CONNECT 41 to gates 124, 126, and 128, respectively, must all be inactive. Note that the connection (CONNECT 11), caused by the setting of latch 76 (LCONNECT 11) through OR gate 190, is made during the DEAD FIELD subsequent to the path selection information; this is what causes the path selection information not to be forwarded to output port 1. Instead, it is stripped from the serial data being passed through broadcast/switch 10, and held in latches 72, 76, and 174.

CONNECT 11 also causes two Other control signals to be connected between input port 1 and output port 1:the IN1-BRDCAST and IN1-VALID signals. A representative connection for IN1-BRDCAST is shown by gates 154 and 162, and the connection for IN1-VALID, though not shown, is similar. CONNECT 11 going active to AND gate 154 causes the output of AND gate 154 to follow directly the values on IN1-BRDCAST, which is gated through OR gate 162 to OUT1-BRDCAST. The other AND gates 156, 158, and 160 feeding OR gate 162 will all be held to logical 0's and have no effect on gate 162; this is because normally only one CONNECT signal can be active at any given time.

For a broadcast or multi-cast operation, it is possible for input port 1 to be instructed to connect to multiple output ports, such that any combination of the signals CONNECT 11, CONNECT 12 (shown in FIG. 14), CONNECT 13, and CONNECT 14 can be active simultaneously. This causes the connection of the REJECT and ACCEPT signals which have the opposite direction of flow from the data lines, to be handled differently. AND gate 94 shows CONNECT 11 selecting OUT1-REJECT as the source of an internal REJECT signal generated by NOR gate 92. In the case of broadcast or multi-cast, AND gates 96, 98, and 100 can also be active due to the multiple connections so that a REJECT coming into any active output port will be NORed together by gate 92 to produce a composite internal REJECT signal. Thus, if a broadcast/multicast operation gets REJECTed by any output port to which it has attempted connection, NOR gate 92 will go to a logical 0 and cause latches 74, 76, 172, and 174 to be reset through AND gates 78 and 179. The ACCEPT signals from all four output ports come into gates 104, 106, 108, and 110, respectively, and are ANDed together by gate 102. The individual monitoring of the four OUTx-ACCEPT signals is enabled by the inverse of their corresponding CONNECT signals, shown typically by gate 192 generating NOT CONNECT 11 going to gate 104. If any output port is not connected into the broadcast/multi-cast operation, its NOT CONNECT line is held at a logical 1 state. For instance, if input port 1 was executing a multi-cast operation which did not include output port 1, NOT CONNECT 11 would be active, forcing OR gate 104 to drive to a logical 1 into the corresponding input on gate 102 so as to effectively bypass the monitoring of OUT1-ACCEPT in the AND function provided by gate 102. This is true for all broadcast/multi-cast operations, such that only the OUTx-ACCEPT interface lines involved in a particular transfer are allowed to have an effect on AND gate 102. Any allowed OUTx-ACCEPT line going to a logical 0 will cause AND gate 102 to go to a logical 0 and pass that indication on to the IN1-ACCEPT interface signal. When all involved OUTx-ACCEPT lines go to logical 1's, a logical 1 will be generated by AND gate 102 and passed to the IN1-ACCEPT interface line.

AND gate 88 is involved in detecting the REJECT condition of input port 1, which occurs when the broadcast/switching apparatus 10 is not able to establish the desired connection to output port 1 because of a standard or BROADCAST BUSY condition. PRE-REJECT 11 is detected as the logical AND of COMMAND 11 delayed through block 86, IN1-VALID being active, and NOT CONNECT 11 being active, indicating that the connection was not made. (The delay block 86 is necessary to insure that a race condition between latches 72 and 76 changing at the same clock time does not cause gate 88 to glitch erroneously because NOT CONNECT 11 does change fast enough to the zero state.) Gate 88 sends the PRE-REJECT 11 indication to AND gates 95 and 97, one of which will be enabled depending upon the type of operation in progress. Gate 95 is activated only for broadcast/multi-cast operations that have won the honor of being the one such operation allowed within a given broadcast/switch 10 at a given time. PREBRDCAST 11 (latch 172) is set for these cases and is used to enable AND gate 95. Gate 97 is activated for standard operations and for broadcast/multi-cast operations that are to be REJECTed due to BROADCAST BUSY, as indicated by the latch's 172 not being set. Gate 97 generates the REJECT 11 signal, indicating that a commanded operation to output port 1 is to be REJECTed. Gate 90 is an OR of all the possible REJECT conditions (REJECT 11, REJECT 12, REJECT 13, and REJECT 14) for input port 1. The IN1-REJECT signal is returned to the previous switch stage or to the sending node, whichever is connected to input port 1. In response to IN1-REJECT, a sending node attached to input port 1 returns IN1-BRDCAST and IN1-VALID to zero (IDLE) to cancel the operation. This causes latches 70, 72, 74, 76, 172, and 174 to reset to the IDLE state, which makes the inputs to gate 90 go inactive and resets the REJECT condition. Whenever IN1-VALID goes to a zero, whether at the end or in the middle of a normal transfer, or because a REJECT is issued, the response of broadcast/switch 10 is always the same: latches 70, 72, 74, 76, 172, and 174 all are reset and input port 1 of broadcast/switch 10 returns to the IDLE state.

The broadcast/switching apparatus 10, upon receiving an OUTx-REJECT from a subsequent cascaded broadcast/switching apparatus or from a receiving node, propagates the REJECT condition to the associated input port and drives the BRDCAST and VALID lines to zero on the corresponding output port. In the logic shown in FIG. 13, this is accomplished as follows: OUT1-REJECT is passed through gates 94, 92, and 78 to form RESET 1, and thereby resets latches 74 and 76. Likewise, OUT1-REJECT is passed through gates 94, 92, and 179 to reset latches 172 and 174. Latches 74 and 76 being reset breaks the connection through broadcast/switch 10 between input port 1 and output port 1, which causes the OUT1-DATA, OUT1-BRDCAST, and OUT1-VALID lines to go to the all-zero IDLE state. This propagates IDLE to any subsequent cascaded broadcast/switches and to the receiving node, causing them to reset and causing the OUT1-REJECT line to go inactive. Latch's 76 being reset causes gate 88 to detect the PRE-REJECT 11 condition, and latch's 172 being reset causes gate 97 to be enabled and to propagate the REJECT 11 indication to IN1-REJECT through gate 90. This informs the previous broadcast/switch 10 stage or the sending node of the REJECT condition. Broadcast/switch 10 will continue to transmit this REJECT indication to input port 1 until it receives an IDLE command.

Gate 182 detects output port 1 BROADCAST BUSY conditions; i.e., if any of the four input ports of broadcast/switch 10 have requested broadcast or multi-cast connections to output port 1, gate 182 detects the logical NOR of these conditions and its output goes to a zero. Similarly, gate 80 detects output port 1 STANDARD BUSY conditions. Gate 180 combines these two signals to indicate all output port 1 busy conditions (standard, broadcast, or multi-cast) and is delayed by block 85 for the purpose of allowing input ports 1 to 4 to operate synchronously, if desired. In this case, if all four inputs tried to select output port 1 to be connected for standard, broadcast, or multicast operations at approximately the same time, there could be a possible logical race condition occurring between the D and C input signals to latch 74 and the other similar latches for input ports 2 to 4 (PRECONNECT 21, PRECONNECT 31, and PRECONNECT 41) that feed gate 80. The purpose of delay block 85 is to delay this effect and to eliminate this race condition. In asynchronous operation, this race condition also exists if two input ports are contending for the same output port and both issue connection requests which happen to be separated in time by approximately the value of the delay caused by block 85. In this case, it is possible for the latch 74 data input to be changing at the same time its clock input is rising, causing a possible metastable condition at latch 74. As long as this metastable condition resolves itself within one clock time (i.e., before latch 76 is clocked) and latch 74 goes to either stable state (0 or 1), the metastability will be corrected in the prescribed manner of using double latching (74 and 76). If the metastability condition does not settle out in time and causes an error, the receiving device will detect an erroneous message, issue a REJECT, and cause a retransmission. If the metastability condition causes the switch to hang in an unusual state which does not lead to a REJECT, the transmitting device will time out, issue the IDLE command, and then retransmit the message. This is one of two possible occurrences of metastability in the present invention; it is an unusual condition which is not normally encountered in the broadcast/switch operation, and it can be corrected on the mere chance that it does occur.

NOR gate 112 detects any active standard, broadcast, or multi-cast operation originating from input port 1. It detects the very first path selection request issued after IN1-VALID goes active and then prevents the other associated latches (COMMAND 11, COMMAND 12, COMMAND 13, or COMMAND 14) from setting by causing the data input to latch 70 and similar latches associated with input port 1 (like latch 470 in FIG. 15) to go to a logical 0. Thus, only the first connection request will be recognized from any input port, and the following data passing through the broadcast/switch 10 will not affect the broadcast/switch in any way.

Gate 119 detects input port 1 BROADCAST BUSY conditions; i.e., if input port 1 of broadcast/switch 10 has requested either a broadcast or multi-cast operation to any of the four output ports, gate 119 detects the logical NOR of these conditions and its output goes to a zero. Gate 121 combines this signal with similar signals from the other input ports to indicate, by going to a logical 0 state, all broadcast or multi-cast busy conditions within this broadcast/switch 10. The output of gate 121 is delayed by block 84 for the purpose of allowing input ports 1 to 4 to operate synchronously, if desired. In this case, if all four input ports tried to initiate a broadcast or multi-cast operation at approximately the same time, there could be a possible logical race condition occurring between the D and C input signals to latch 172 and to the similar PREBRDCAST latches for input ports 2 to 4. The purpose of delay block 84 is to delay this effect and to eliminate this race condition. In asynchronous operation, this race condition also exists and results in the second of the two possible occurrences of metastability in the present invention. This metastability is handled in an identical fashion to that described previously.

Hence, the main function of gate 121 through delay 84 is to go to gate 171 and all similar gates and prevent latch 172 and other similar PREBRDCAST latches from being set if the broadcast/switch 10 is busy performing a prior broadcast or multi-cast operation (where prior means that the previous broadcast or multi-cast occurred at a point in time that was sooner than the sum of the circuit delays through gates 119, 121, and 84). If two broadcasts or multi-casts occur that are not separated in time by more than the delay provide by gates 119, 121, and 84, the NOT BRD signal will not make it to gate 171 and all similar gates in time to block the setting of latch 172 or similar latches associated with the other input ports (such as latch 572 in FIG. 15). This leads to the broadcast/multi-cast contention condition between two or more input ports and results in multiple PREBRDCAST latches (like 172) from different input ports getting set at about the same time. This contention condition is handled by gates like gate 599 in FIG. 15, gate 799 in FIG. 16, and gate 999 in FIG. 17, which implement a simple priority scheme to resolve the contention. Note that input port 1 (FIG. 13) does not require any priority gate similar to gates 599, 799, and 999; that is because the priority scheme used assigns highest priority to input port 1, such that if input port 1 has issued a broadcast or multi-cast operation, it will dominate over any similar operation issued by any other input port. Therefore, input port 1 wins the broadcast honors whenever there is contention between it and any other input port. Similarly, input port 2 is given the second highest priority so that it will win the broadcast honors when attempting to perform a broadcast or multicast as long as input port 1 is not contending. This is accomplished, for example, by gate 599 in FIG. 15, which basically gates off the effect of latch 574 when it has been set at the same time as latch 174 of FIG. 13. The third highest priority is assigned to input port 3, which wins the broadcast honors whenever it attempts a broadcast or multi-cast operation and both input ports 1 and 2 are not contending. Gate 799 in FIG. 16 gives an example of how this is done—it gates off the effect of latch 774 if it has been set at the same time as latch 174 of FIG. 13 or latch 574 of FIG. 15. Finally, input port 4 wins the broadcast honors only if no other input port is contending with it, as implemented for example by gate 999 which blocks the effect of latch 974 if any PREBRDCAST latches from other input ports are set at the same time. The input port that wins the broadcast honors makes its broadcast or multi-cast connections and performs the operation as usual. Those input ports that lose in a broadcast contention competition issue a REJECT to the previous network stage or the sending node, whichever is attached to the input port. This is accomplished for example through gate 593 in FIG. 15, whose output is forced to a logical 1 by the NOT IN1-BRD signal being a zero. Gate 593, in turn, enables gate 497 and causes REJECT 21 to be returned in the normal fashion. In FIG. 13, the setting of latch 174 (BRDCAST 11) means that input port 1 has won the broadcast honors to output port 1, and will inhibit all other input ports from winning that honor. It will not REJECT the broadcast or multi-cast request, since gate 97 will be disabled by the NOT PREBRDCAST 11 input going to a zero. Instead, with PREBRDCAST 11 (the output of latch 172) being a one, gate 95 will generate and reroute any conditions which otherwise might have issued a REJECT, such as the LCONNECT 11 latch not getting set to a logical 1 when input port 1 initiates the broadcast or multi-cast operation. Actually, there are two conditions that can occur when a broadcast or multi-cast is initiated and wins the honors. For either case, the latches 70, 72, 172 and 174 always get set. However, the third set of latches 74 and 76 may or may not get set, depending on the state of the broadcast/switch at the time. Latches 74 and 76 will get set if no other input port has established a connection for a STANDARD operation to output port 1 when the broadcast is initiated. Note that it is impossible for any previous broadcast or multi-cast operation to be connected to output port 1 at this time—if that were the case, input port 1 would not have won the honors and set latch 174. However, it is possible for output port 1 to be connected to some other input port for the purpose of performing a standard operation. In this case, latches 74 and 76 will not get set, but latch 174 will set and hold the broadcast or multi-cast operation pending until output port 1 becomes available. In this case of a pending broadcast, this broadcast/switch 10 drives the corresponding ACCEPT signal to a zero until the output ports become free, as shown in interval 75 of FIG. 10. This is accomplished for input port 1 through gates 95, 115, and 102. Gate 95 detects that LCONNECT 11 (latch 76) was not set because the OUT1-NOT BUSY signal, generated by NOR gate 80 through AND gate 180 and block 85, inhibited the setting of latch 74, because output port 1 was busy with a standard connection from another input port. Gate 80 being a zero also blocks gate 178 so that both the LCONNECT 11 and EN-BRDCAST 11 inputs to gate 190 are zeroes, which prevents the connection to output port 1 at this time. It also causes gate 192 to go to a logical 1, which propagates through gate 95 since IN1-VALID and latch 172 are both ones and causes the WAIT 11 signal to be activated. This signal, which tells input port 1 to WAIT because the connection to output port 1 is not presently available, is passed through gate 115 where it is combined with similar indications for input port 1 trying to connect to output ports 2, 3, or 4 also. Thus, any requested broadcast or multi-cast connection from input port 1 to an output which is presently unavailable will cause gate 115 to go to a logical 0. This in turn will be propagated through gate 102 to IN1-ACCEPT, holding it at a zero for the duration of the busy condition.

When the input port that had been using output port 1 finishes its transfer, its PRECONNECT signal (generated by a latch like latch 74) will go to a zero and gate 80 will go to a one to indicate that the previously busy output port is now available. This now starts the execution of the broadcast or multi-cast operation that had been held pending or WAITing at broadcast/switch 10. Gate 178 becomes enabled by gate 80 and passes the EN-BRDCAST 11 signal to gate 190, which causes CONNECT 11 to be activated, making the desired broadcast or multi-cast connection between input port 1 and output port 1 through gates 154 and 162, 122 and 130, and the like. At the same time, gate 192 (NOT CONNECT 11) is driven to zero and revokes the WAIT 11 condition through gate 95. Similarly, when all the other possible WAIT conditions for other output ports have been revoked, the output of gate 115 goes to a logical 1 and causes IN1-ACCEPT to rise, thus informing the attached sending node or previous broadcast/switch stage that all the requested broadcast or multi-cast connections in this particular broadcast/-switch 10 have been made successfully.

The other possible condition that can occur when a broadcast or multi-cast is initiated and wins the honors is that there is not a previous standard connection active to output port 1; hence latch 76 gets set to a one during initiation. In this case, the IN1-ACCEPT signal will also pulse to zero (see interval 71 in FIG. 10 as an example), even though no WAIT condition exists for any output port. This is due to the fact that latch 172 sets one cycle time prior to latch 76, causing the WAIT 11 signal to be active for one cycle until latch 76 sets to cause gate 192 to go to a zero through gate 190. This one cycle pulse informs the sending node or previous broadcast/switch stage that all the requested broadcast or multi-cast connections in this particular broadcast/-switch 10 have been made successfully.

Figure 14A:
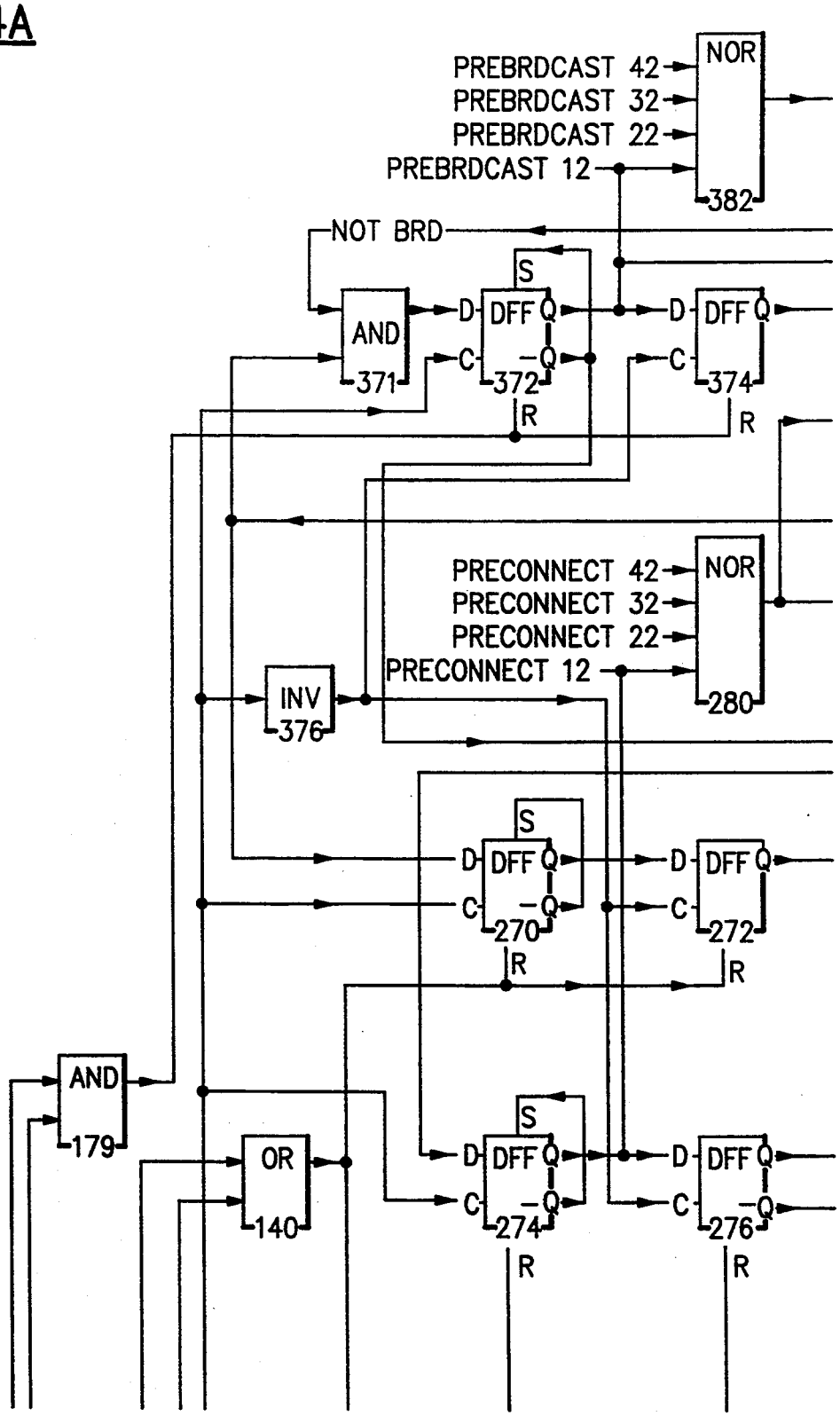
FIGS. 14A, 14B, 14C, 14D, 14E, and 14F illustrate the detailed logic implementation for a portion of the invention broadcast/switching apparatus, the portion enabling the switch to establish a single data transfer, broadcast, or multi-cast connection between input port 1 and output port 2 of the preferred 4×4 broadcast/switching apparatus embodiment.
Figure 14B:
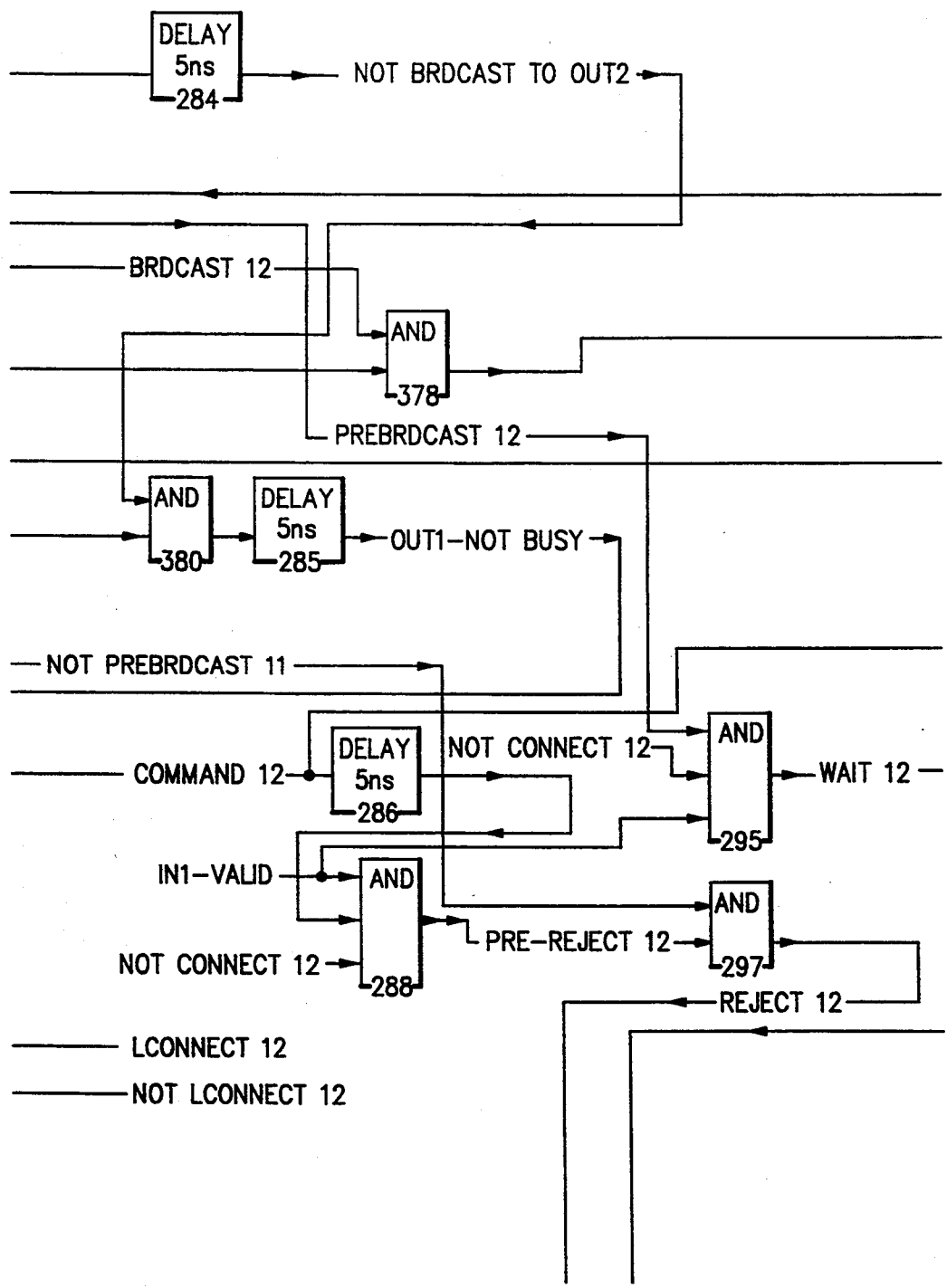
Figure 14C:
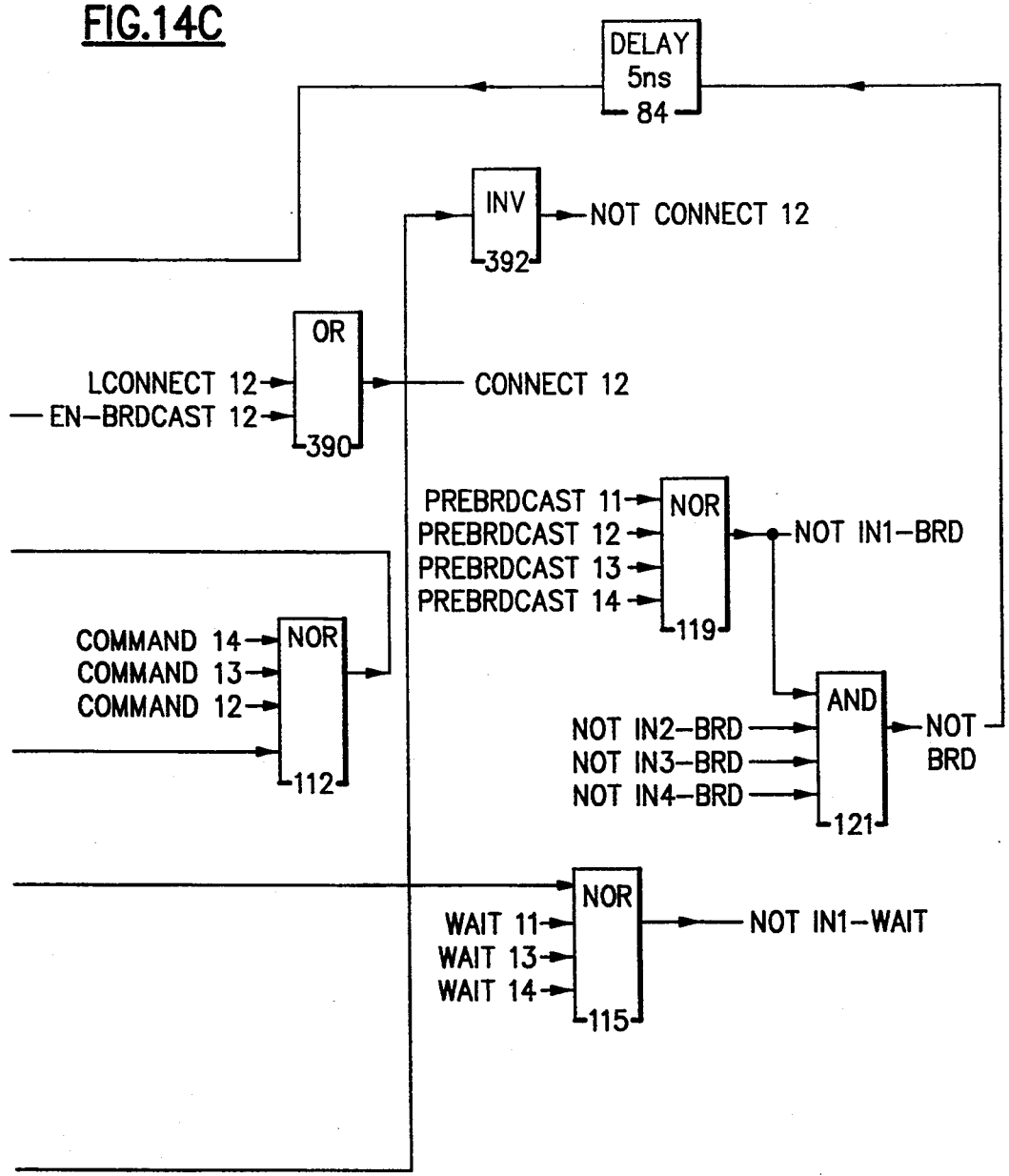
Figure 14D:
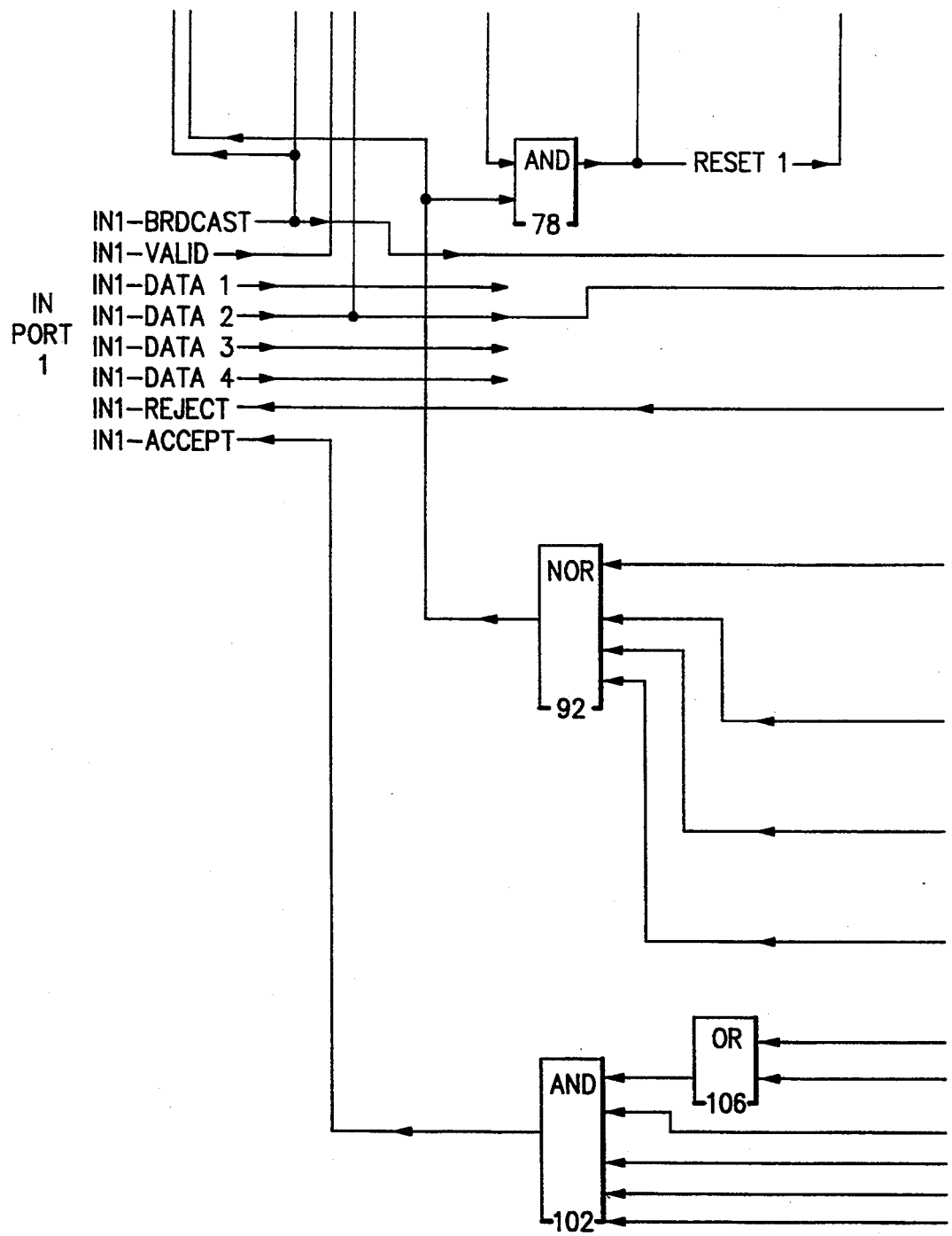
Figure 14E:
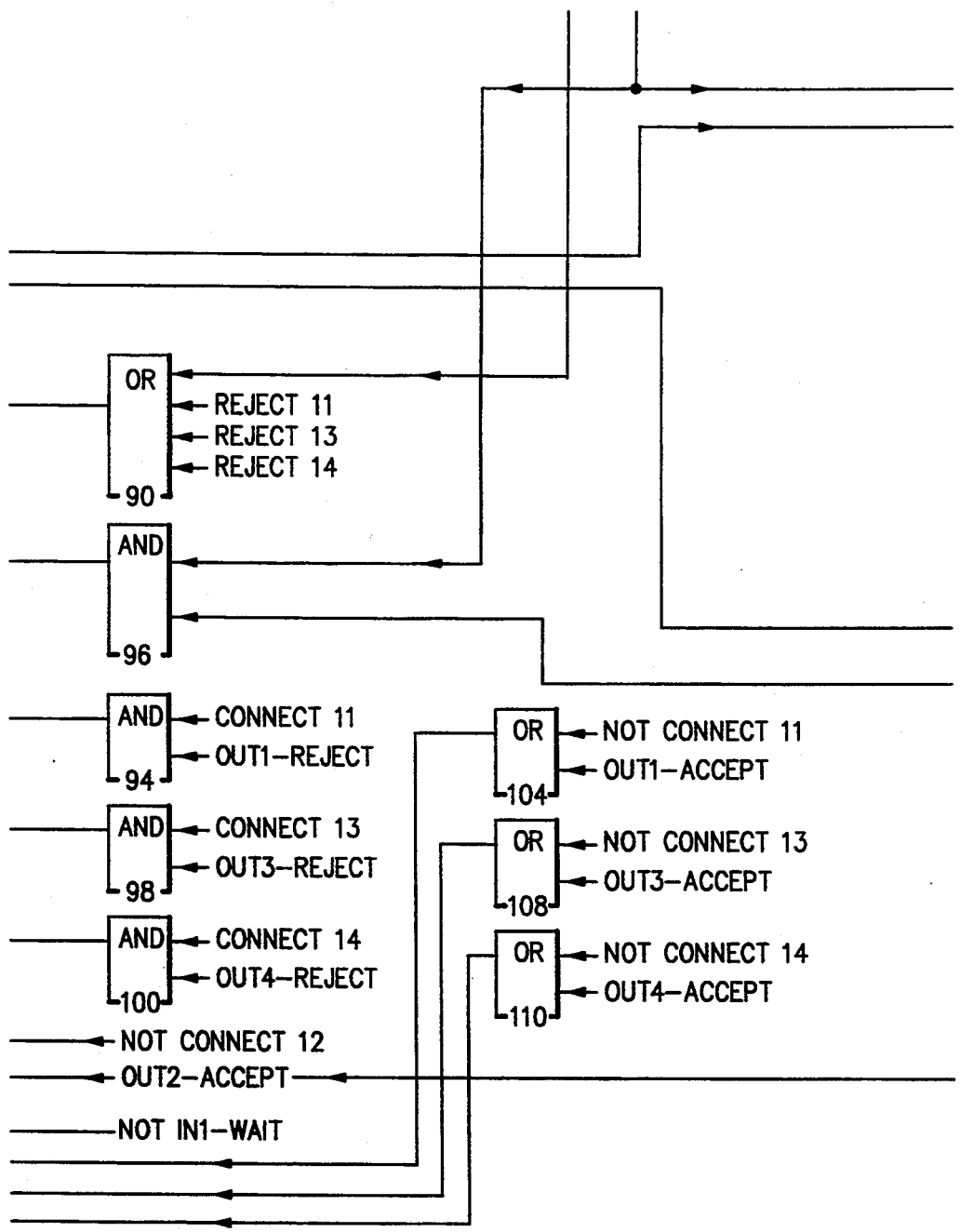
Figures 14, 14F:
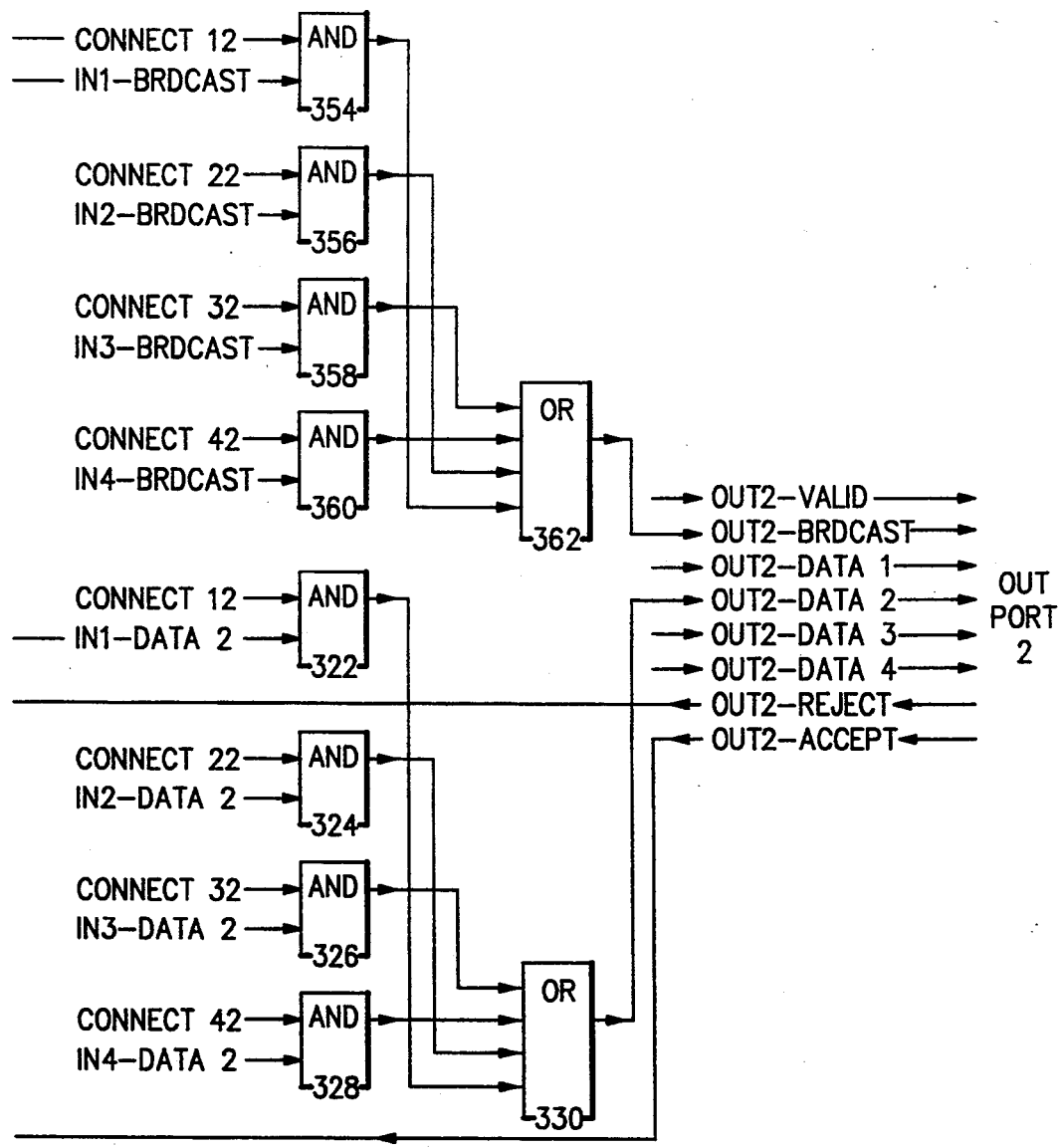
FIG. 14 is a key to reconstruction of FIGS. 14A–14F.

Referring to FIG. 14, similar logic to FIG. 13 is shown, but this logic controls the connection of input port 1 to output port 2. All the gates have exactly the same functions as they did in FIG. 13 except that they apply to output port 2 instead of output port 1. Some of the gates in FIG. 13 can be reused in FIG. 14 without being duplicated; these gates retain the same numbers that they had in FIG. 13. Some the gates in FIG. 14 perform functions identical to the functions performed in FIG. 13, but relate to output port 2 instead of output port 1; these gates must be unique for output port 2 and therefore are assigned new numbers to indicate their uniqueness as compared to the gates in FIG. 13.

Figure 15A:
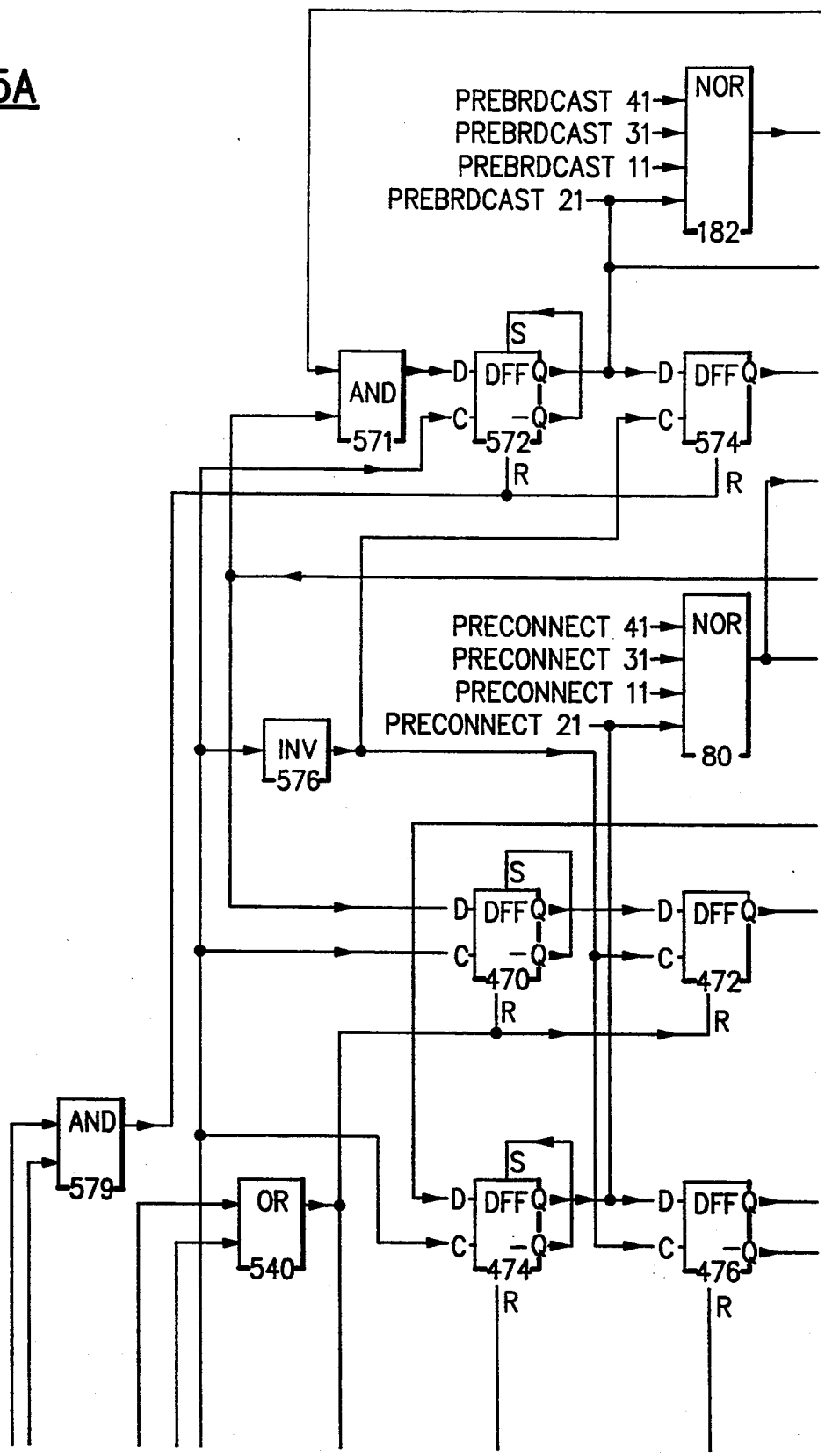
FIGS. 15A, 15B, 15C, 15D, 15E and 15F illustrate the detailed logic implementation for a portion of the invention broadcast/switching apparatus, the portion enabling the switch to establish a single data transfer, broadcast, or multi-cast connection between input port 2 and output port 1 of the preferred 4×4 broadcast/switching apparatus embodiment.
Figure 15B:
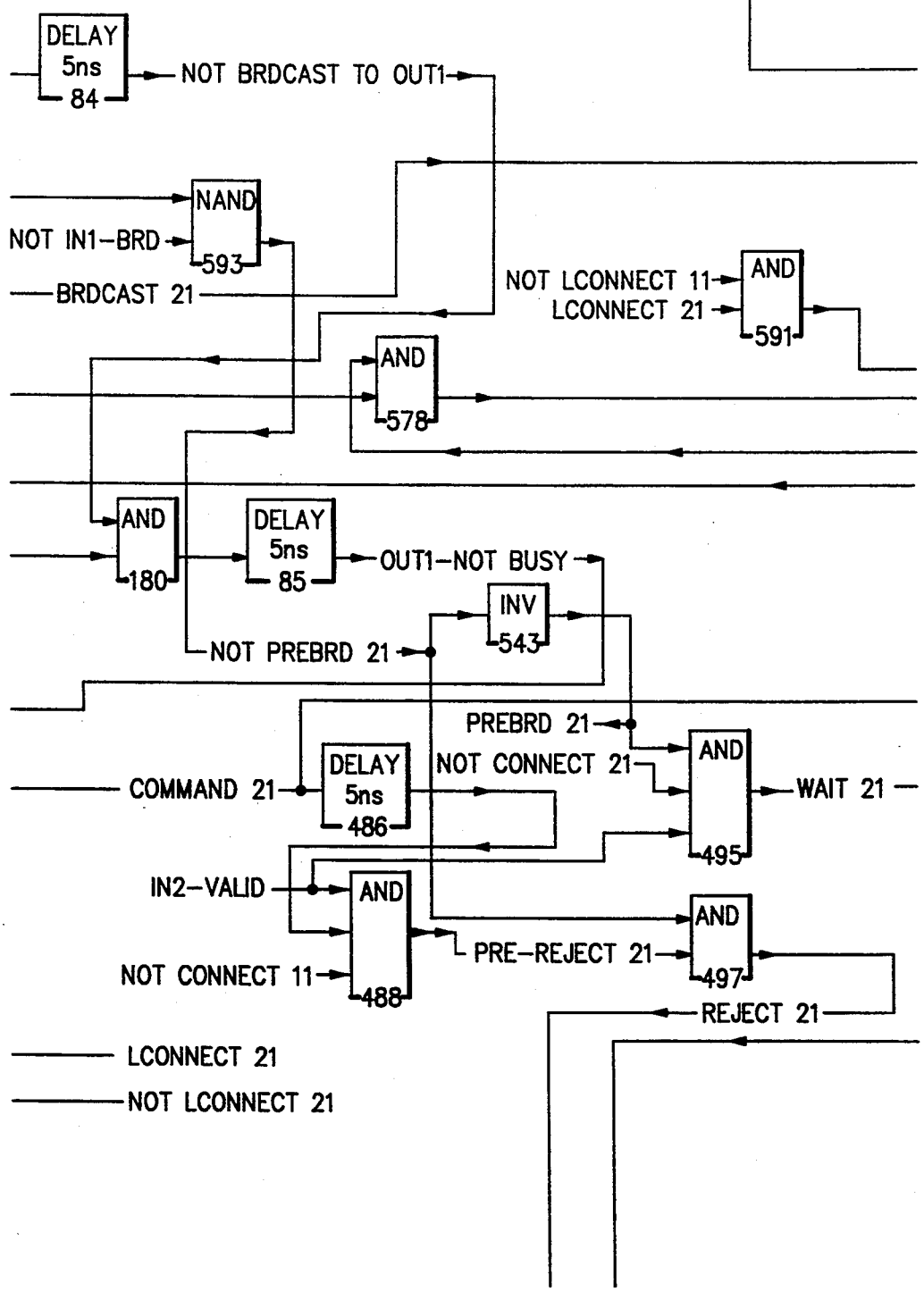
Figure 15C:
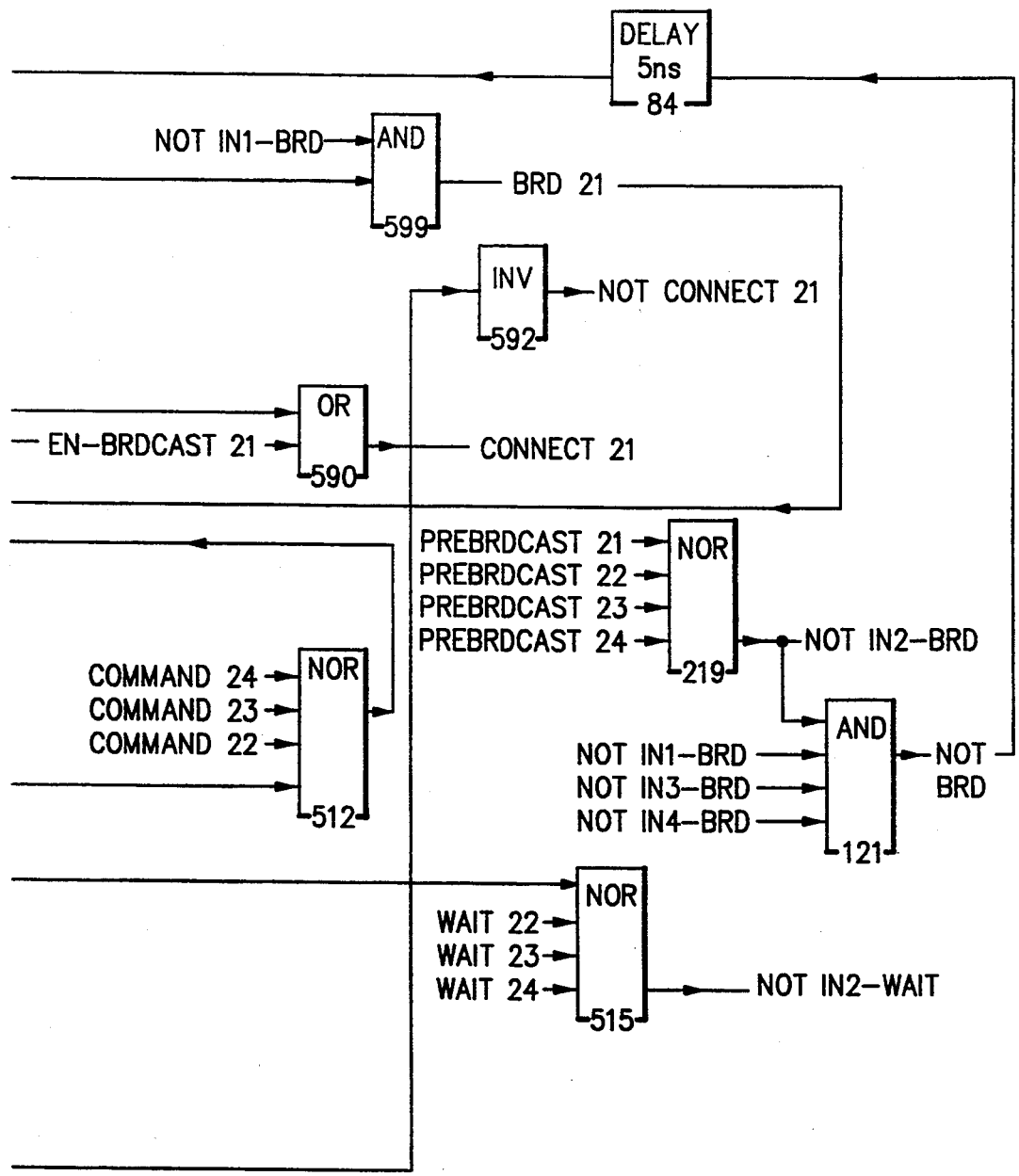
Figure 15D:
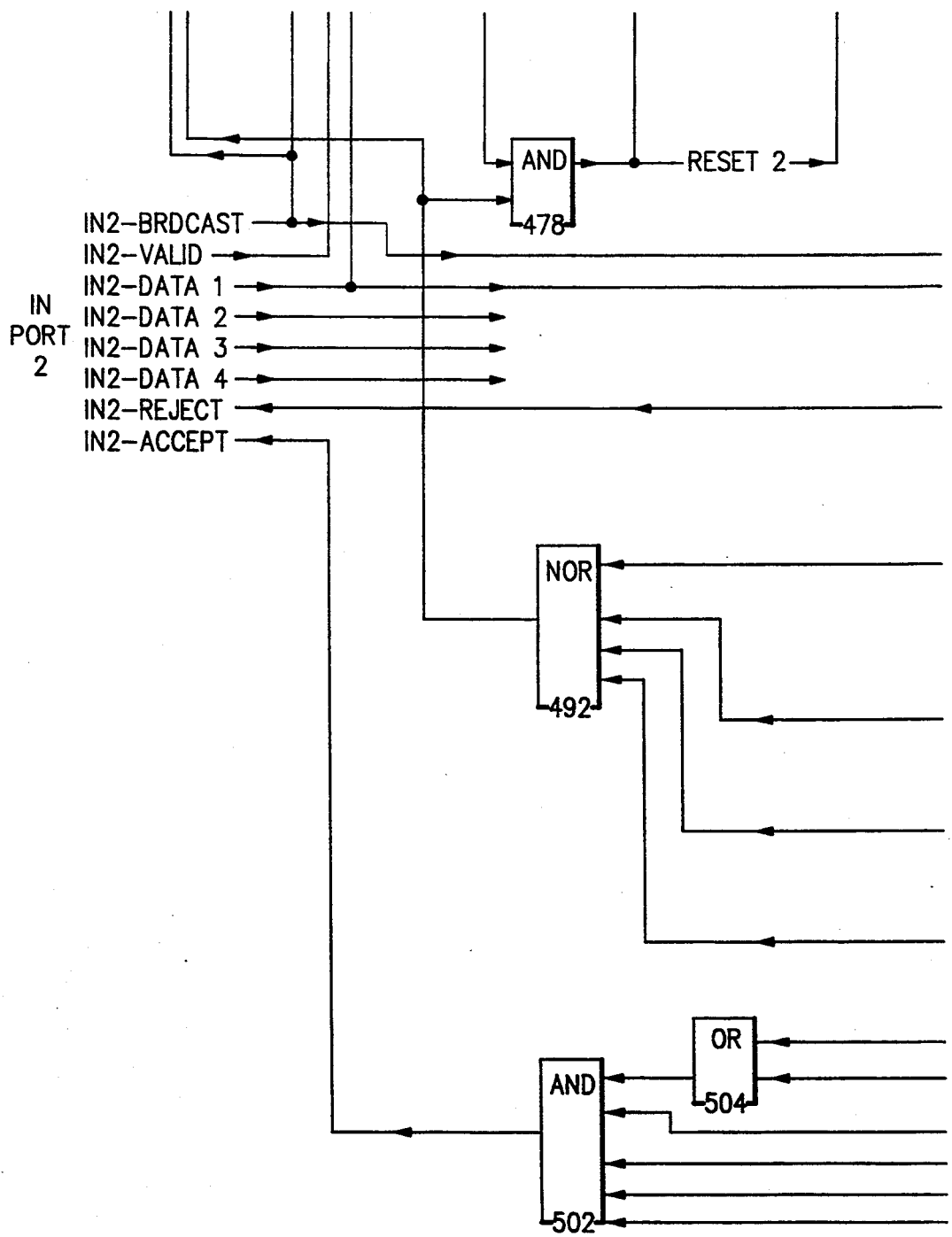
Figure 15E:
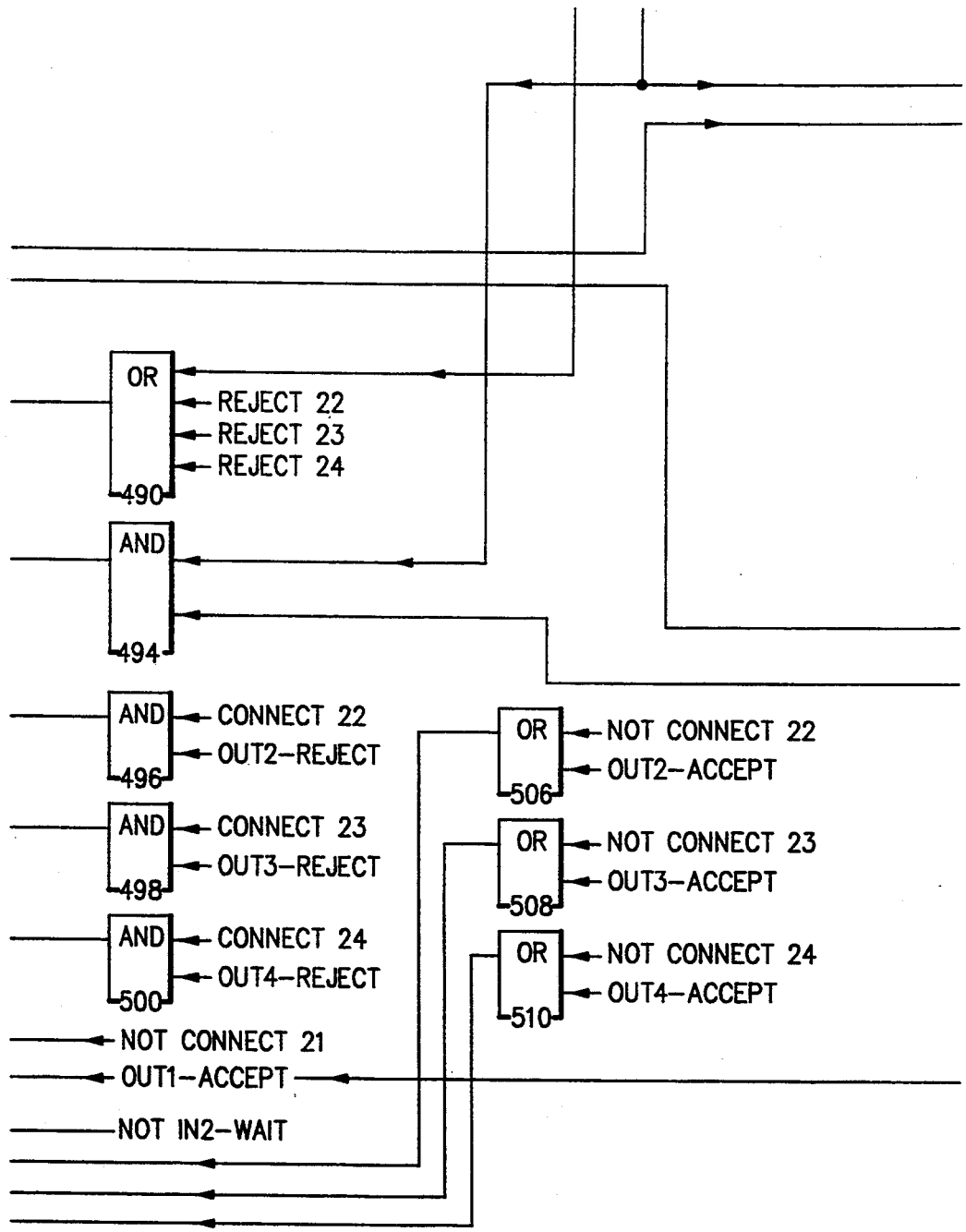
Figures 15, 15F:
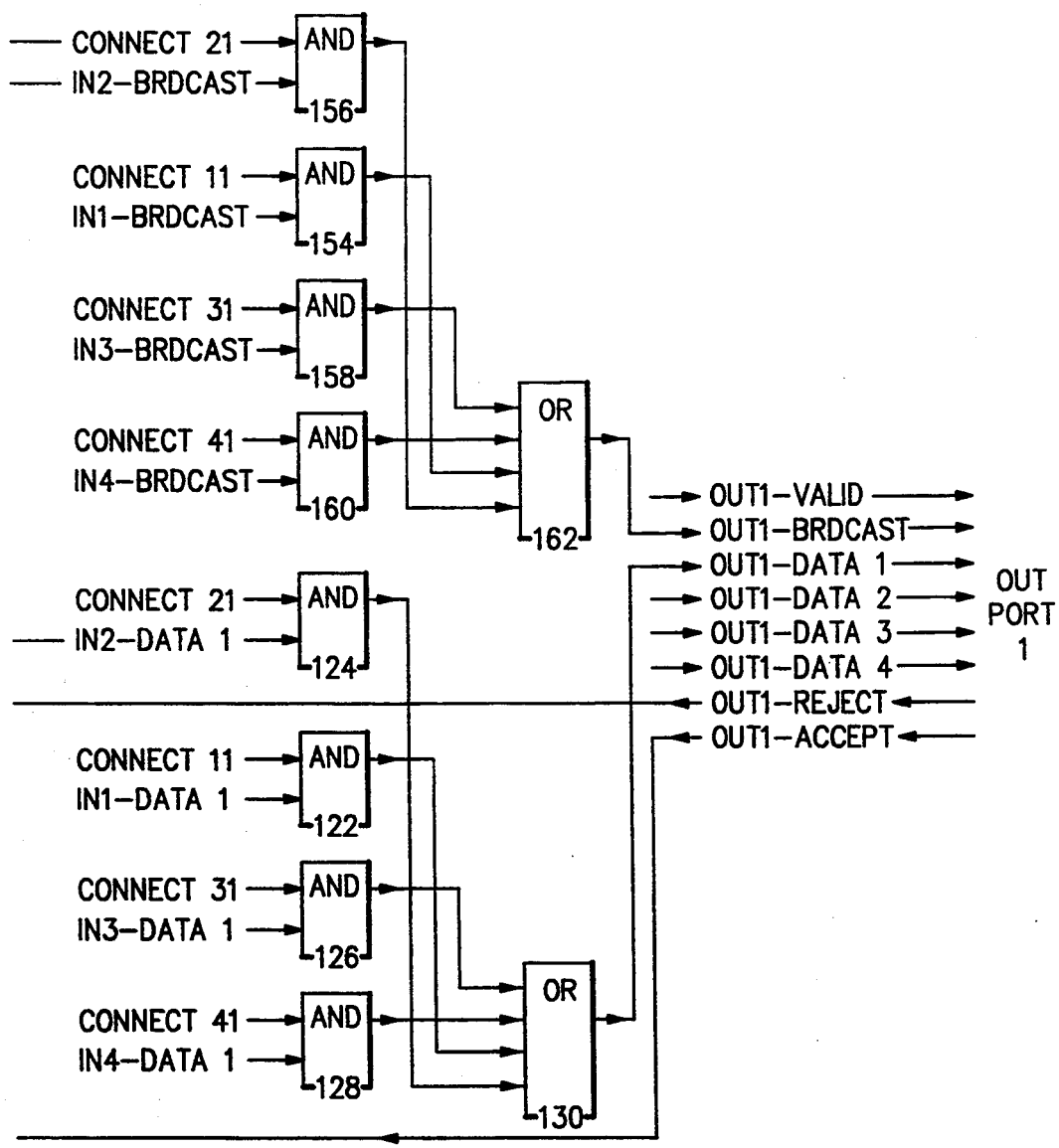
FIG. 15 is a key to reconstruction of FIGS. 15A–15F.
Figure 16A:
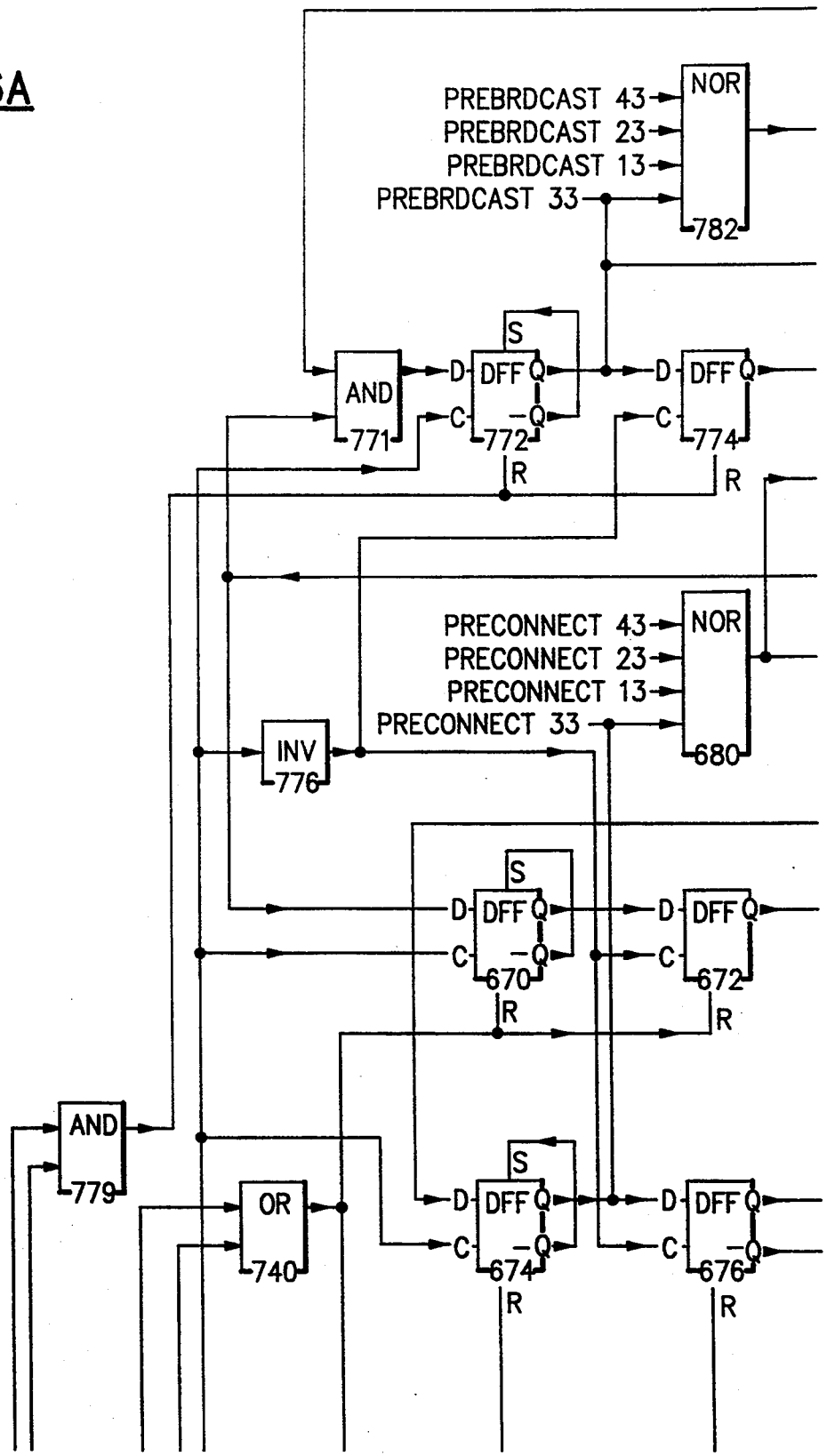
FIGS. 16A, 16B, 16C, 16D, 16E and 16F illustrate the detailed logic implementation for a portion of the invention broadcast/switching apparatus, the portion enabling the switch to establish a single data transfer, broadcast, or multi-cast connection between input port 3 and output port 3 of the preferred 4×4 broadcast/switching apparatus embodiment.
Figure 16B:
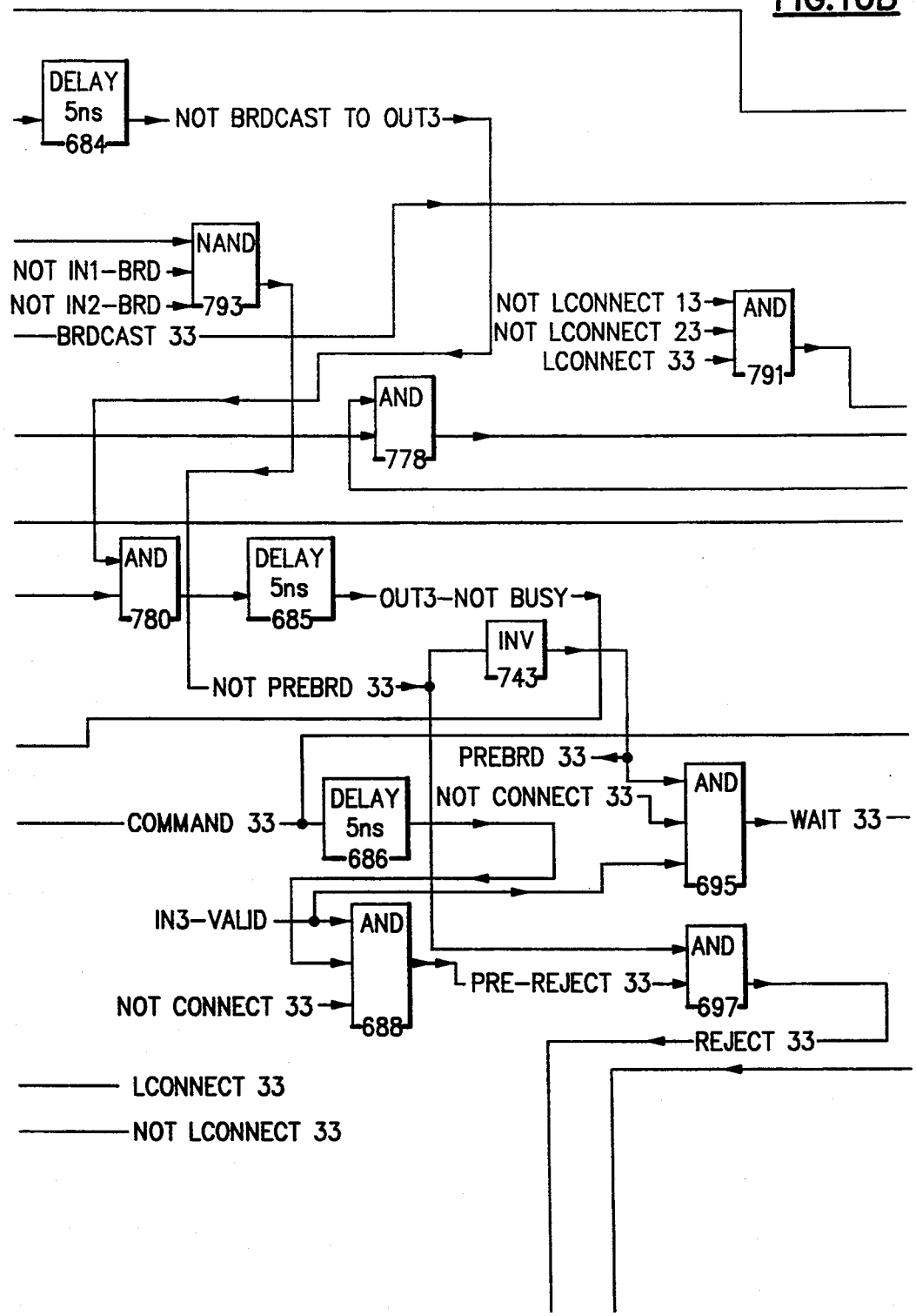
Figure 16C:
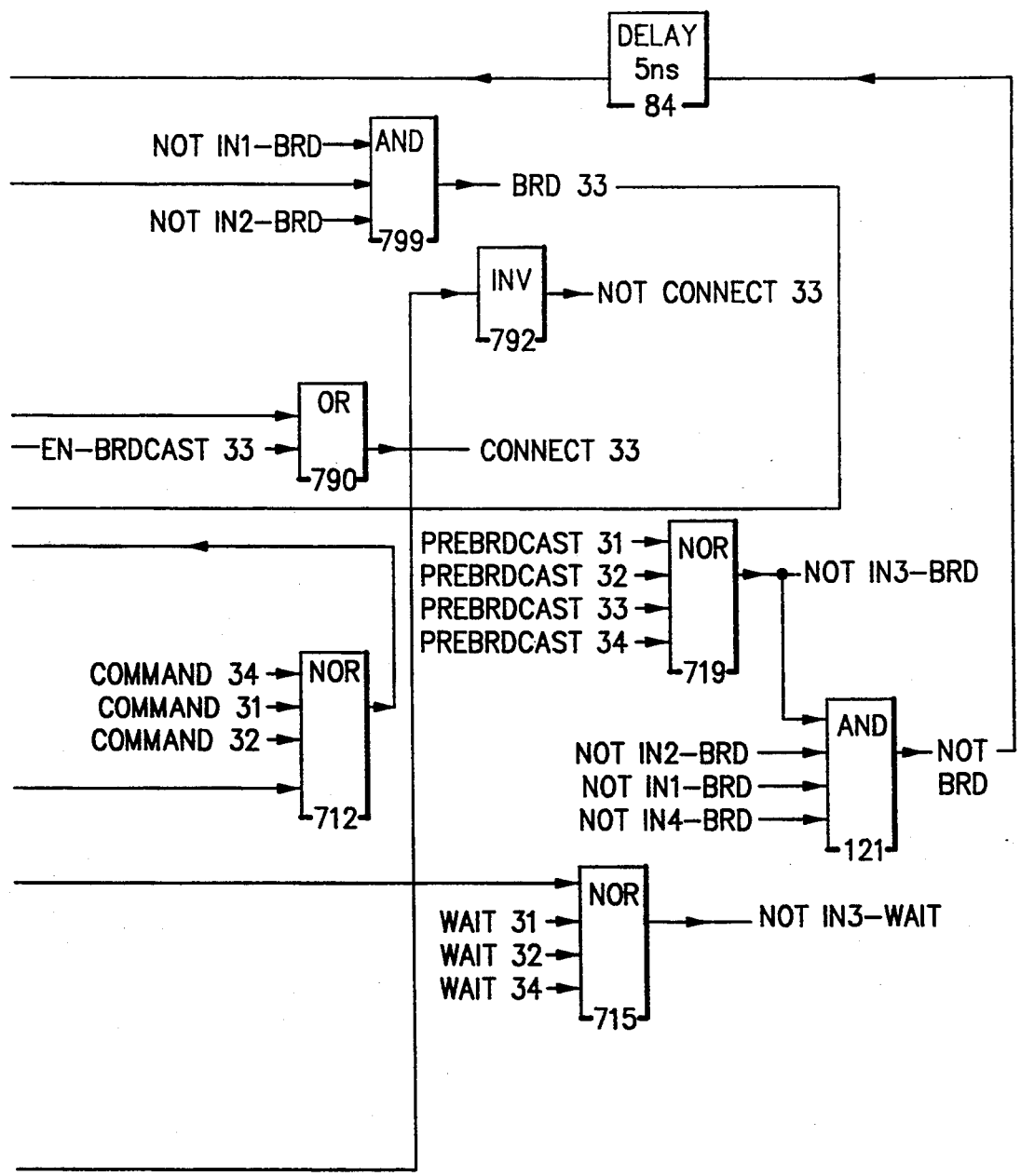
Figure 16D:
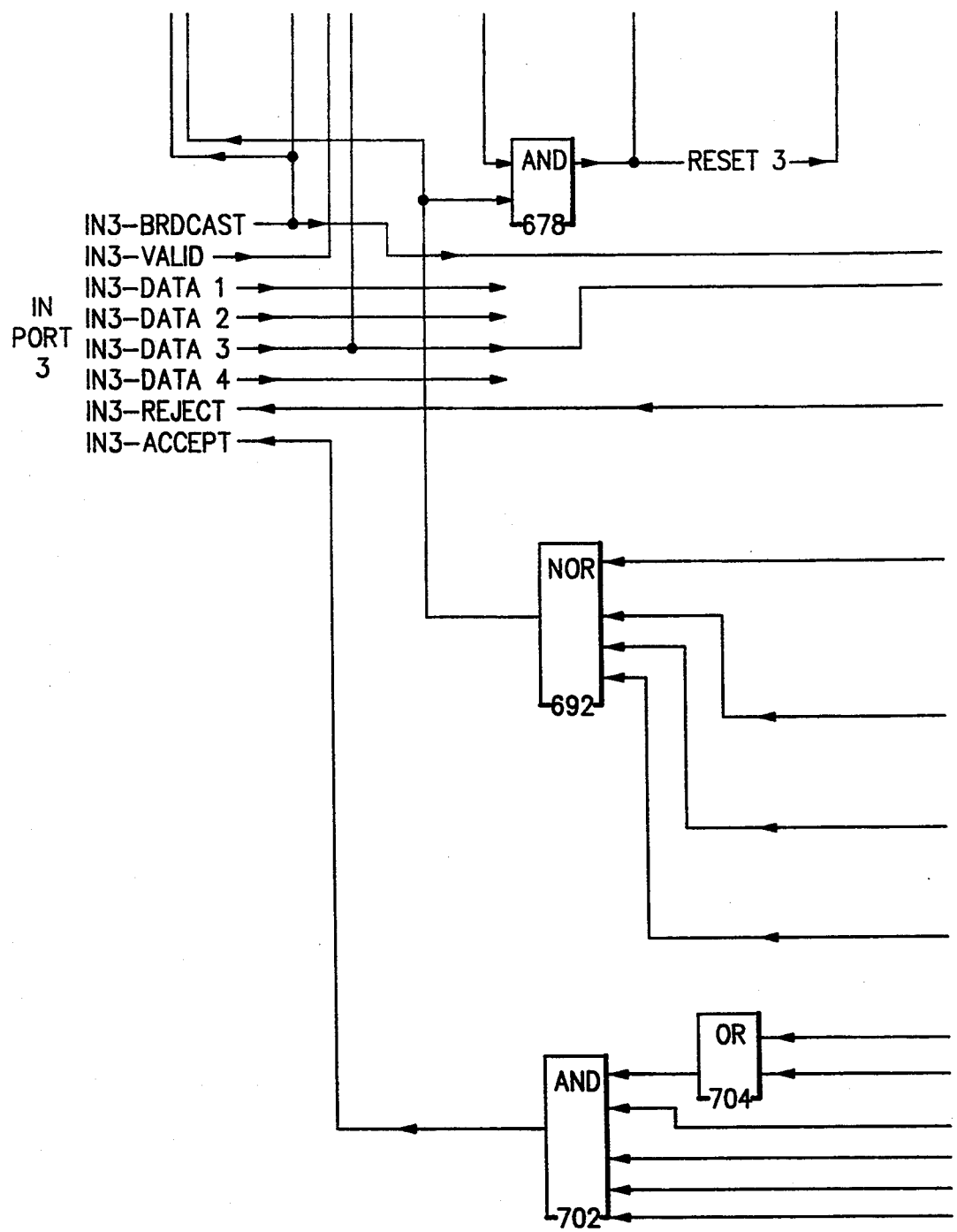
Figure 16E:
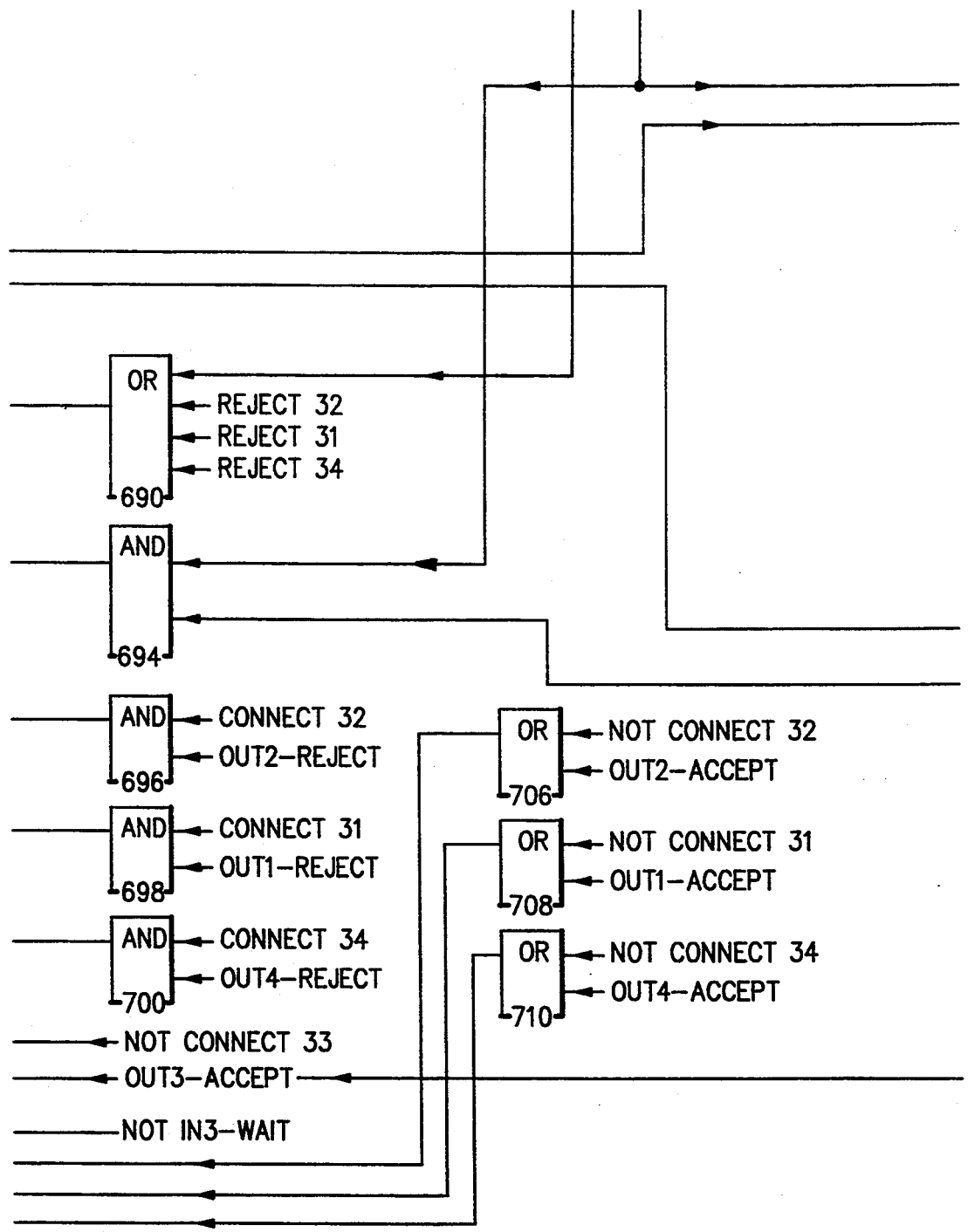
Figures 16, 16F:
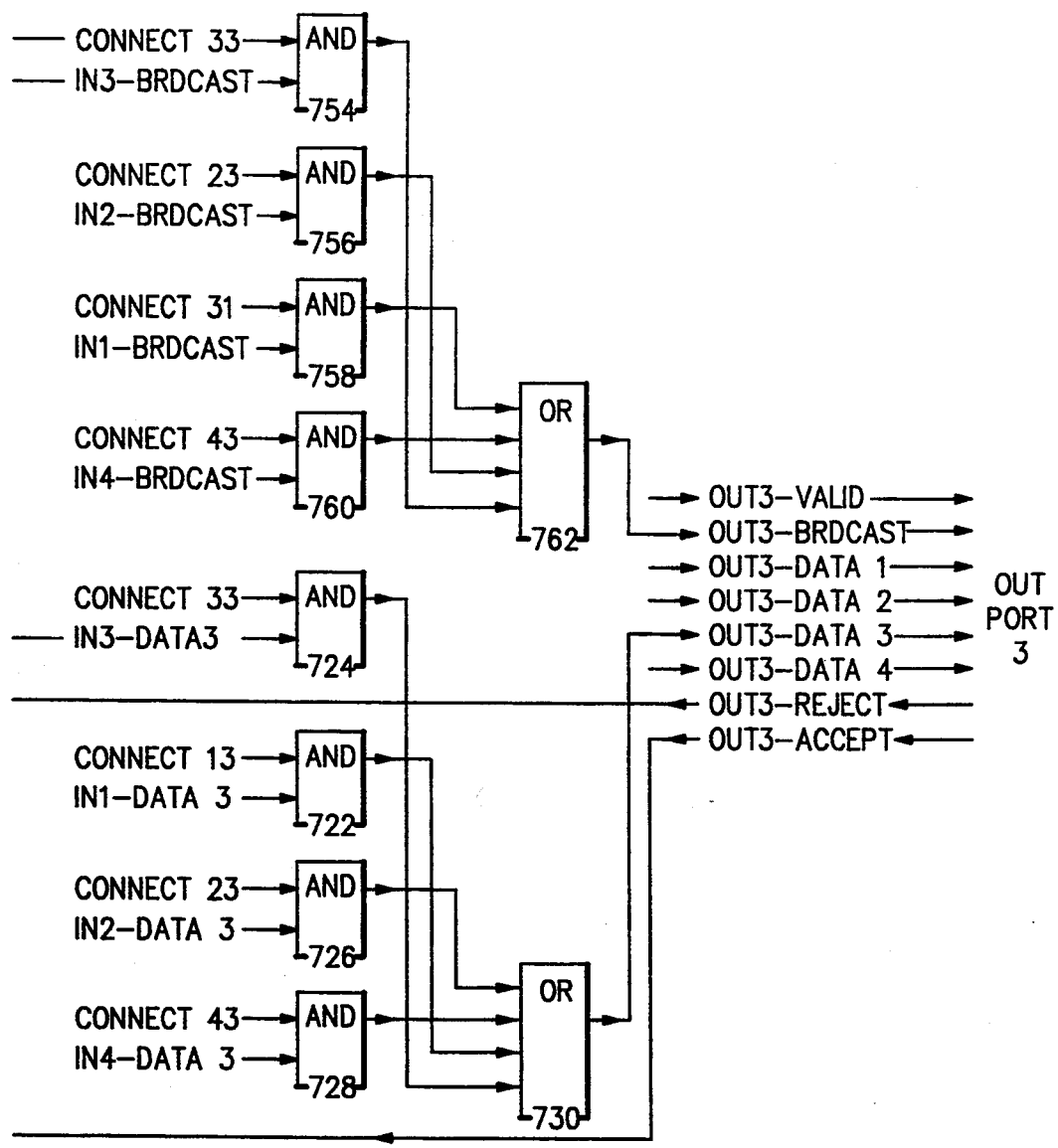
FIG. 16 is a key to reconstruction of FIGS. 16A–16F.

Referring to FIG. 15, similar logic to FIG. 13 is shown, but this logic controls the connection of input port 2 to output port 1. All the gates have exactly the same functions as they did in FIG. 13, except that they apply to input port 2 and output port 1, instead of input port 1 and output port 1. Once again, gates that can be reused from FIG. 13 without being duplicated retain the same numbers while unique blocks are assigned new numbers. The additional functions shown in FIG. 15 are gates 591, 593, and 599, which deal with the output port 1 CONTENTION conditions. Gate 591 provides the priority scheme for standard connections and gates 593 and 599 handle the broadcast priority scheme. As explained previously, these gates permit input port 2 to be connected to output port 1 (CONNECT 21) only if input port 1 is not contending at the same time for output port 1. If it is, input port 2 will lose and receive the IN2-REJECT signal.

Referring to FIG. 16, similar logic to FIG. 13 is shown, but this logic controls the connection of input port 3 to output port 3. All the gates have exactly the same functions as they did in FIG. 13 except that they apply to input port 3 and output port 3 instead of input port 1 and output port 1. The additional functions shown in FIG. 16 are gates 791, 793, and 799, which deal with the output port 3 CONTENTION conditions. Gate 791 provides the priority scheme for standard connections and gates 793 and 799 handle the broadcast priority scheme. As explained previously, these gates permit input port 3 to be connected to output port 3 (CONNECT 33) only if input ports 1 and 2 are not contending at the same time for output port 3. If either of them are, input port 3 will lose and receive the IN3-REJECT signal.

Figure 17A:
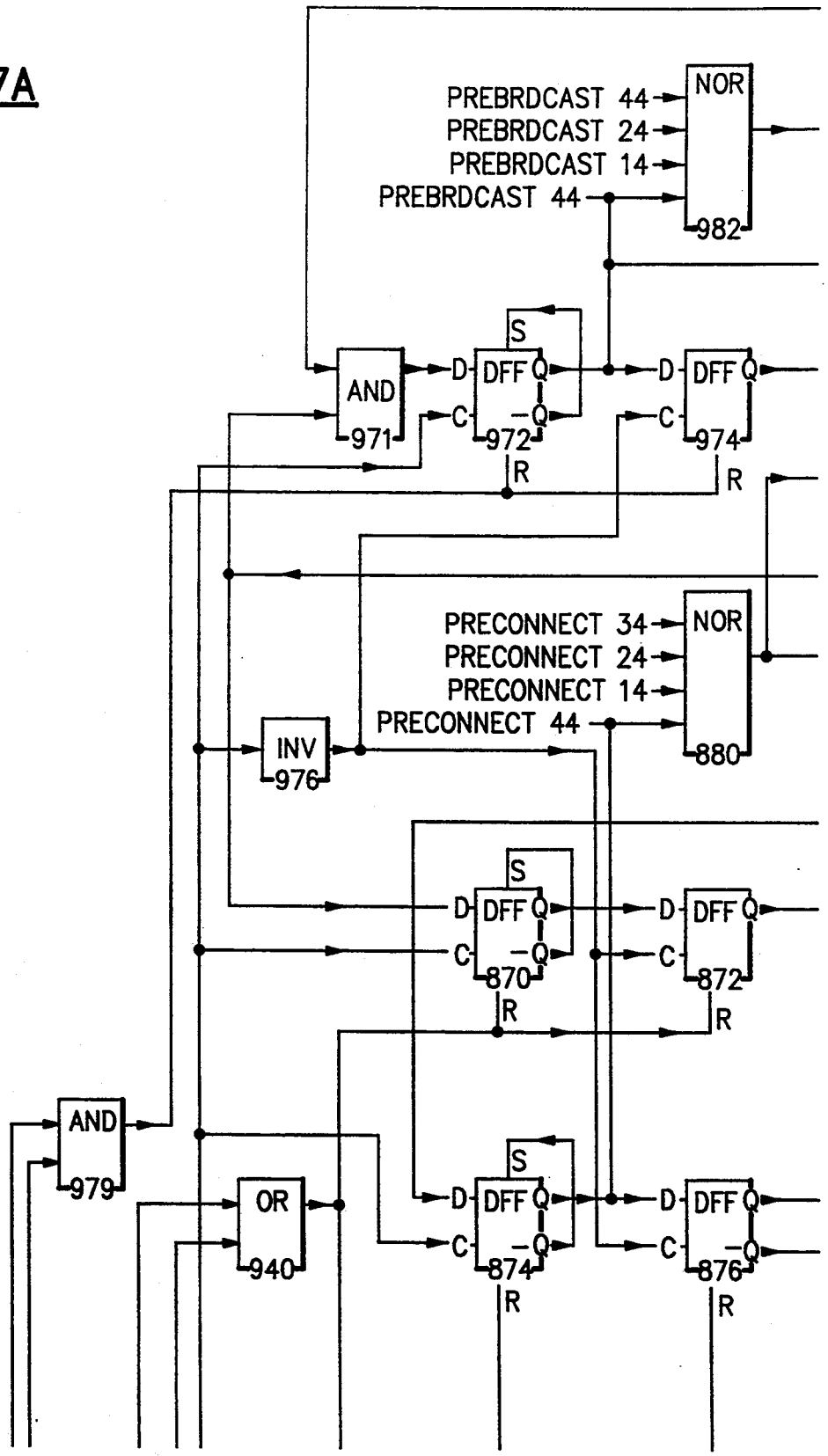
FIGS. 17A, 17B, 17C, 17D, 17E and 17F illustrate the detailed logic implementation for a portion of the invention broadcast/switching apparatus, the portion enabling the switch to establish a single data transfer, broadcast, or multi-cast connection between input port 4 and output port 4 of the preferred 4×4 broadcast/switching apparatus embodiment.
Figure 17B:
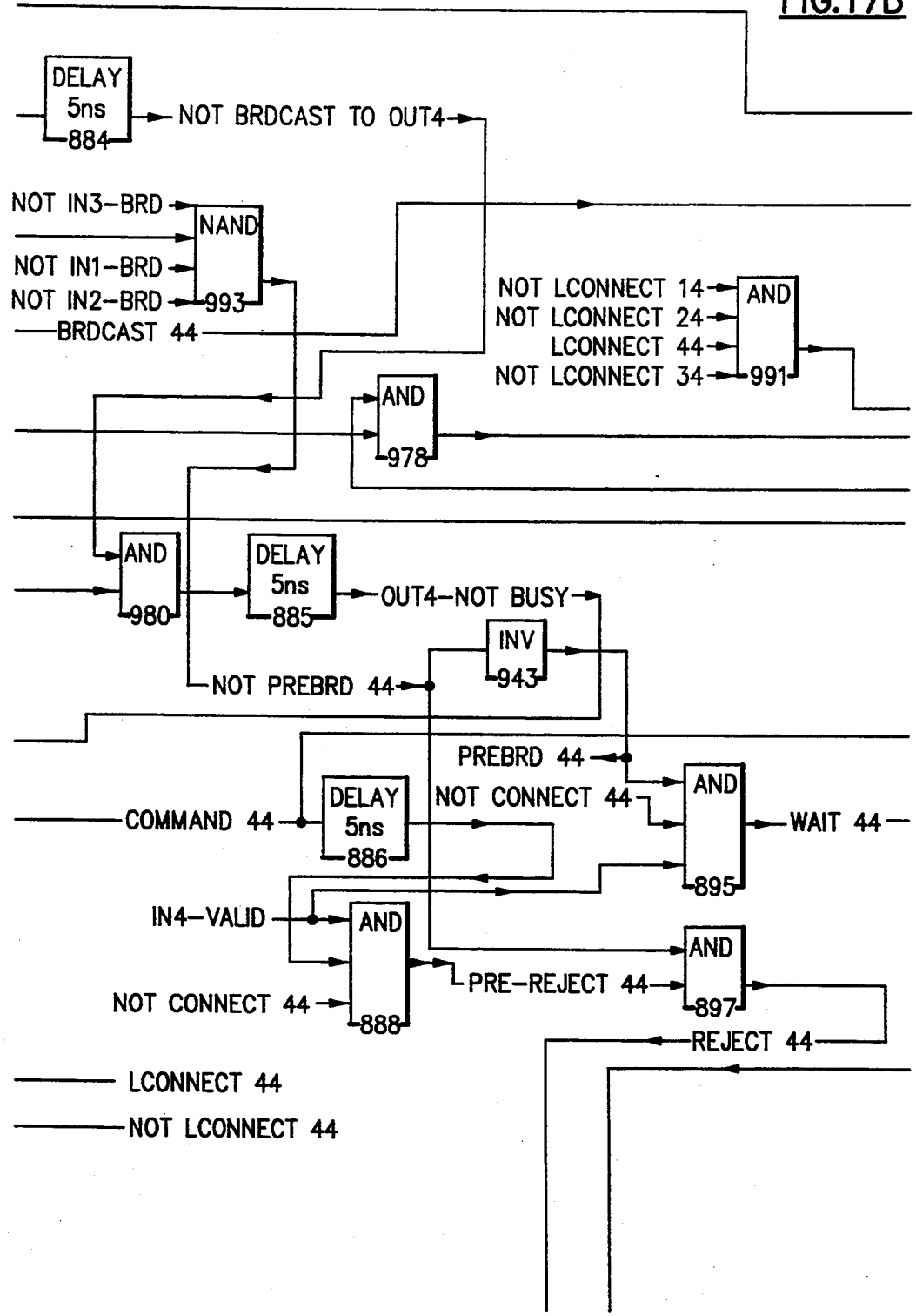
Figure 17C:
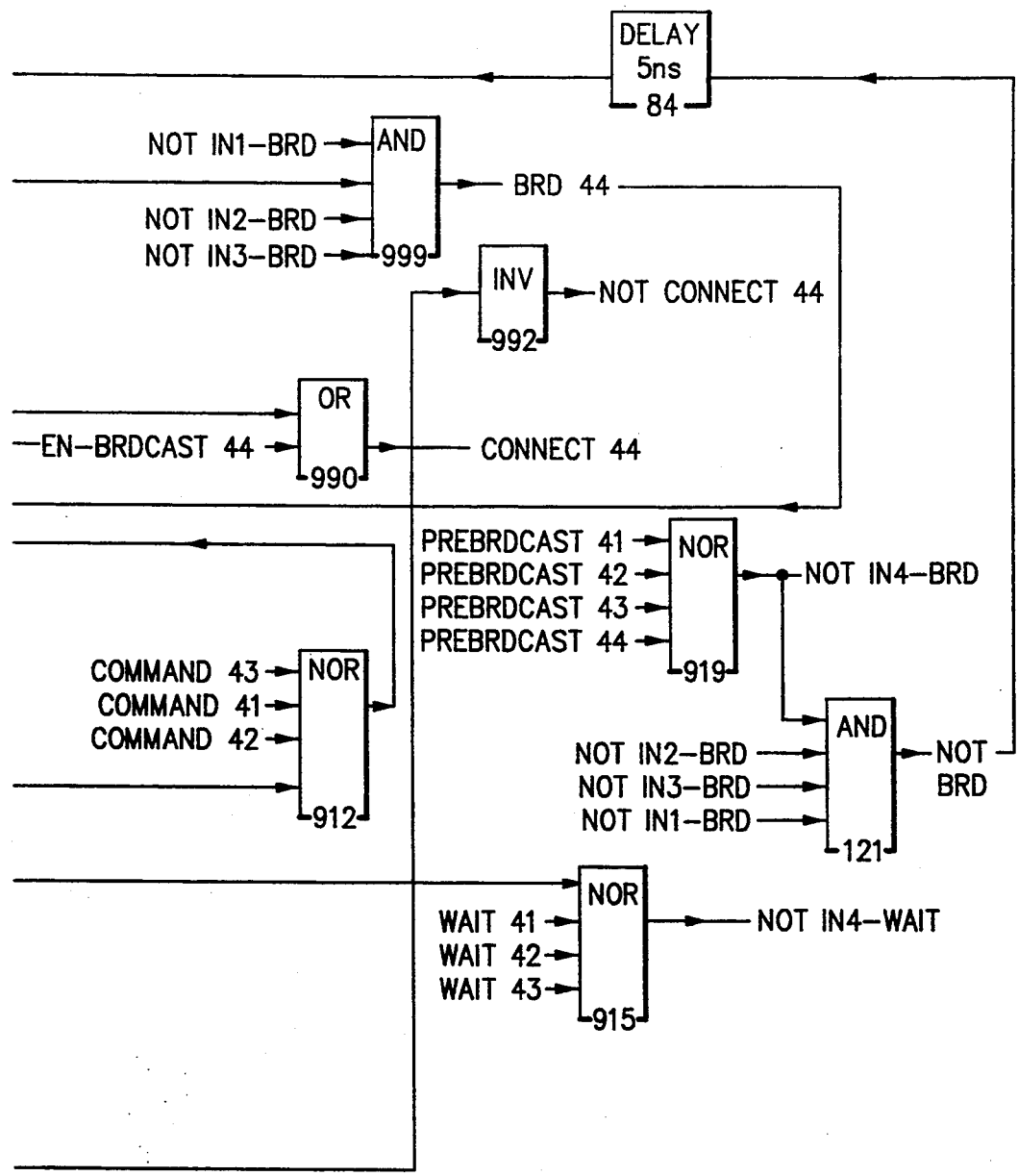
Figure 17D:
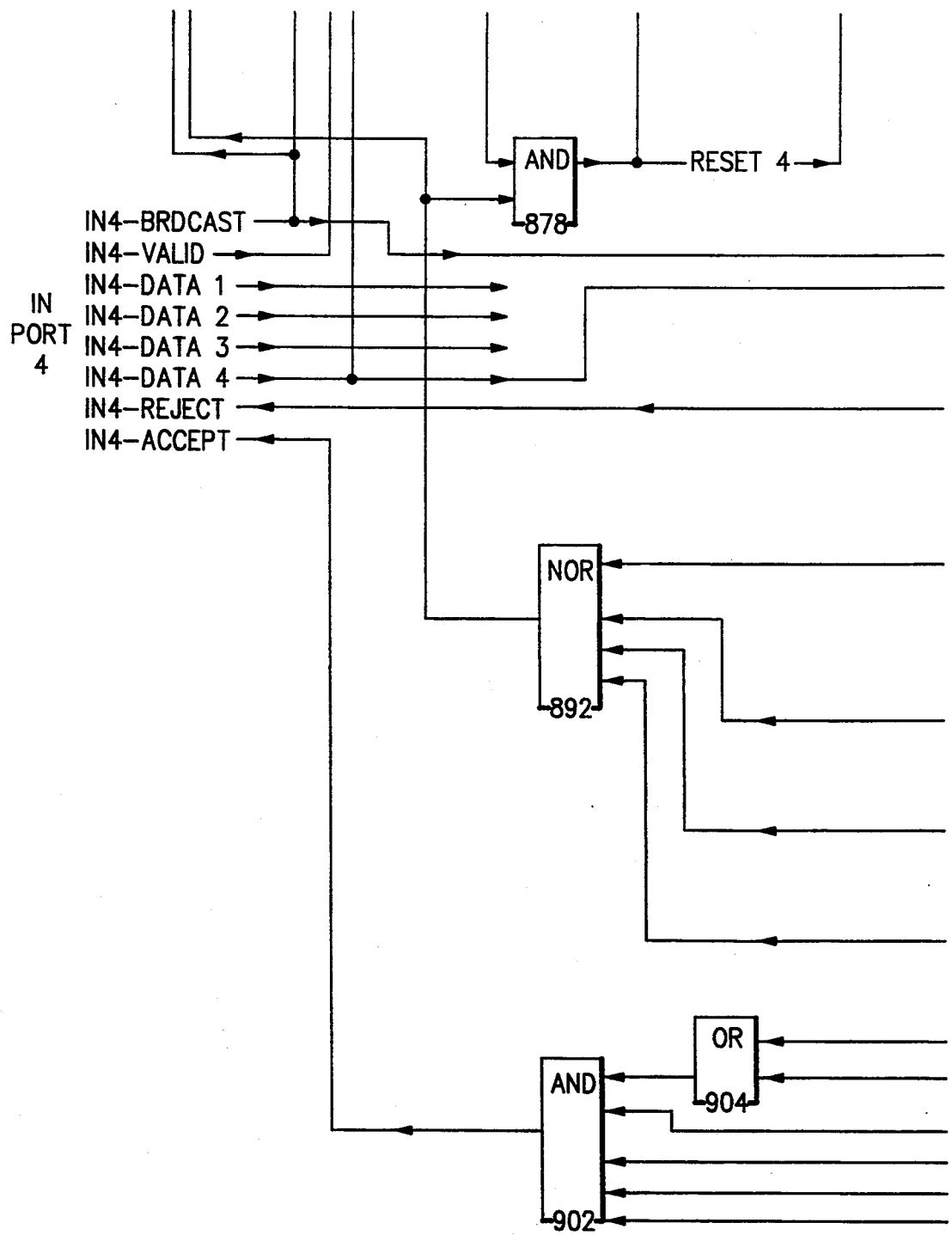
Figure 17E:
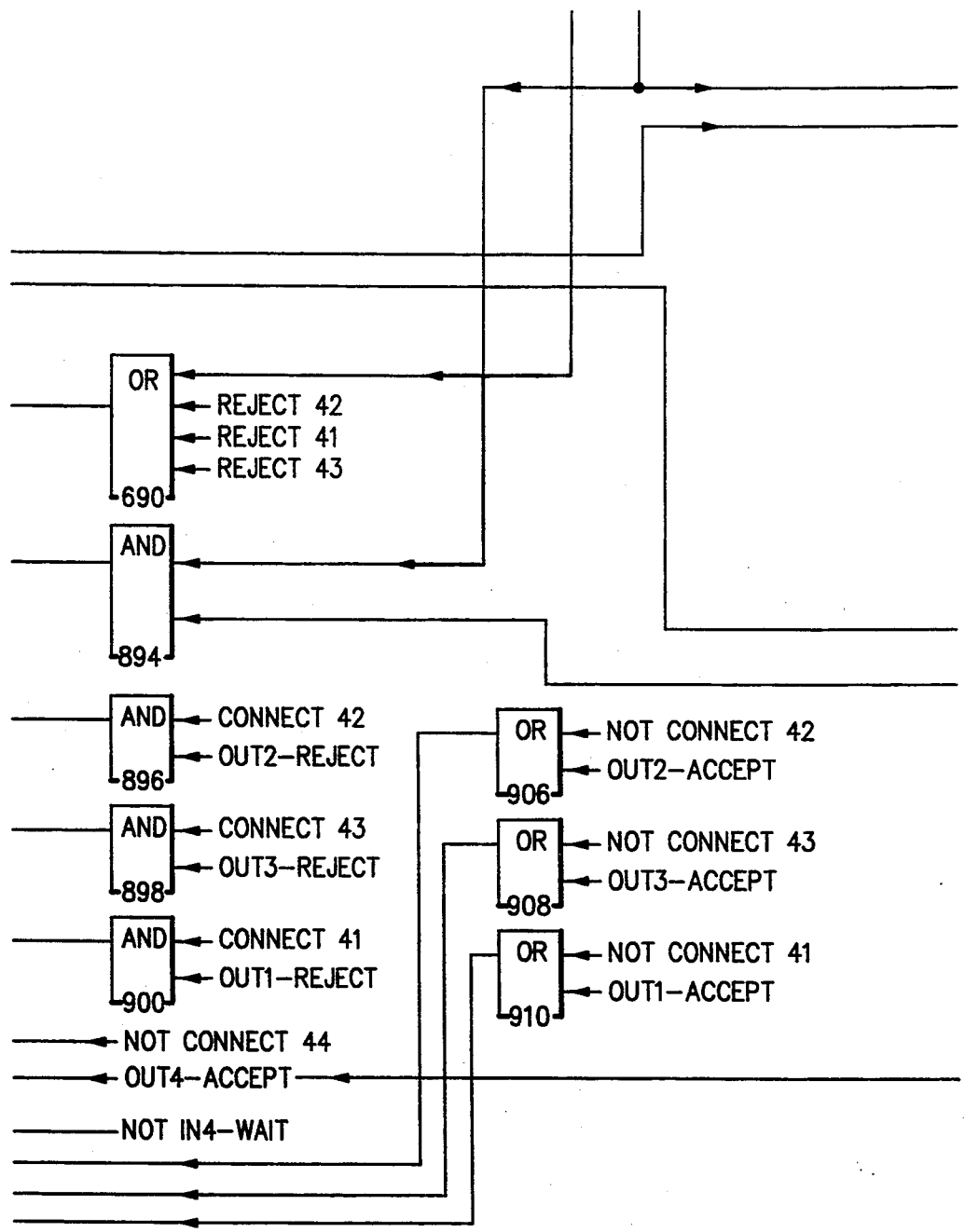
Figures 17, 17F:
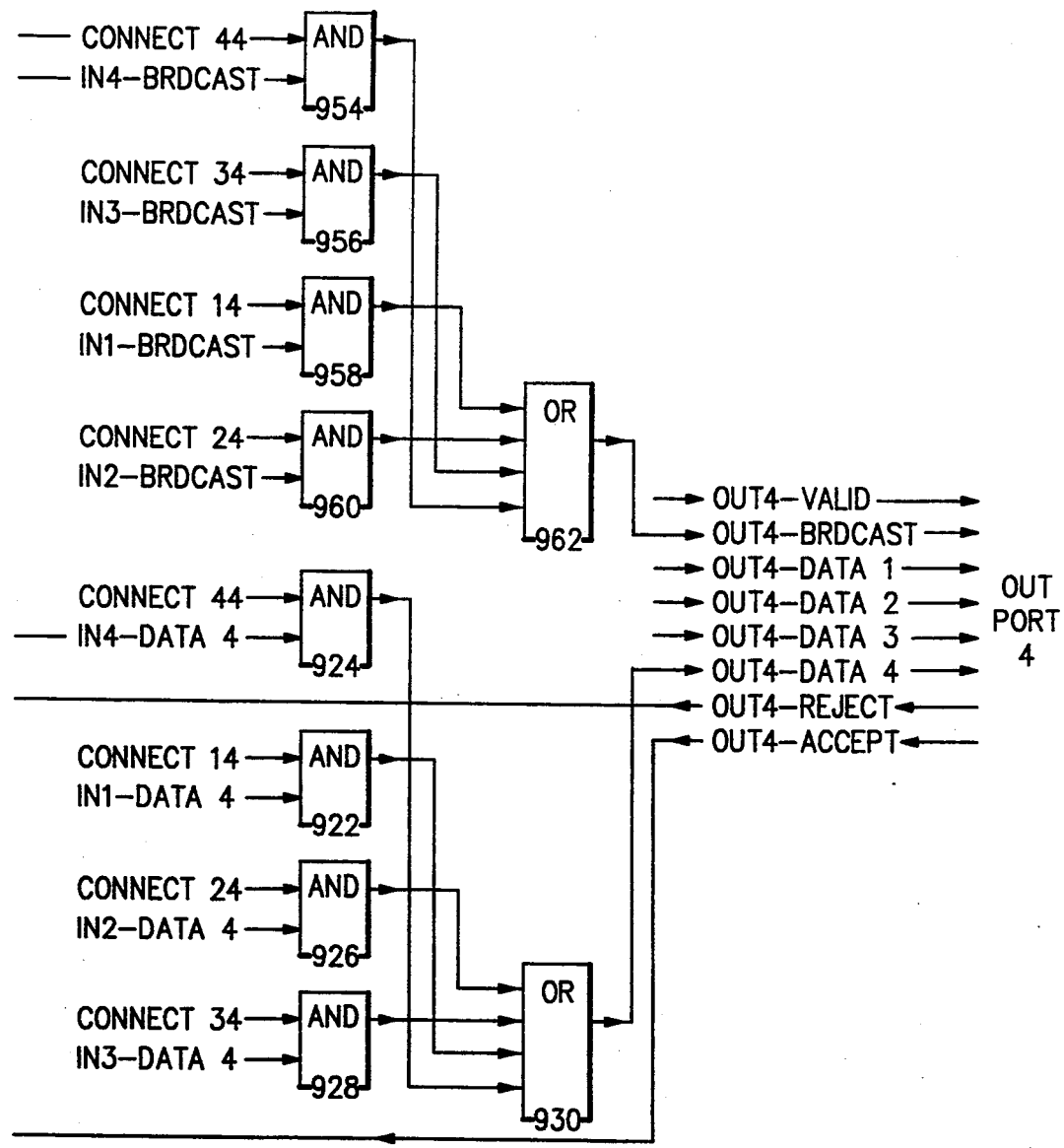
FIG. 17 is a key to reconstruction of FIGS. 17A–17F.

Referring to FIG. 17, similar logic to FIG. 13 is shown, but this logic controls the connection of input port 4 to output port 4. All the gates have exactly the same functions as they did in FIG. 13, except that they apply to input port 4 and output port 4, instead of input port 1 and output port 1. The additional functions shown in FIG. 17 are gates 991, 993, and 999, which deal with the output port 4 CONTENTION conditions. Gate 991 provides the priority scheme for standard connections and gates 993 and 999 handle the broadcast priority scheme..As explained previously, these gates permit input port 4 to be connected to output port 4 (CONNECT 44) only if no other input port is contending at the same time for output port 4. If any of them are, input port 4 will lose and receive the IN4-REJECT signal.

FIGS. 13 through 17 show all the unique circuit implementations required within broadcast/switch 10. Eleven further replications of the same functions as shown in FIG. 13 are required to totally define broadcast/switch 10, to provide connections from input port 1 to output port 3, input port 1 to output port 4, input port 2 to output port 2, and so on. However, these implementations are an obvious extension of FIGS. 13 through 17 and are not discussed here.

OTHER PREFERRED EMBODIMENTS

Other embodiments which we may prefer to use in certain instances are within the scope of our inventions and will be described, by way of example, as changes to the preferred embodiment which has been described herein with reference to the drawings.

For example, the broadcast/switching apparatus 10 can function adequately if the size of the DEAD FIELD is increased from one clock time to m clock times, where m=2 or more.

For example, the broadcast/switching apparatus 10 is not restricted to four input ports and four output ports, but could be any number of I input ports and Z output ports, where I and Z can be independent values ranging from 2 to any large number so long as the number of data lines per input port and output port are equal or greater than Z.

For example, the broadcast/switching apparatus 10 could additionally receive a REJECT indication by any receiving node wishing to reject the broadcast or multicast operation. In this case, the sending device will terminate the command or message prematurely, and none of the destination nodes will receive the command or message. One use of the REJECT would be to abort any operation for which the receiving node does not receive a proper source node indication as pad of the command or message. The source node number could be sent with each command or message, for the possibility of the receiving node having to send a message back to source node, if the command or message was not received properly (i.e. error-free) at the particular receiving node. In order to return such an error message, the receiving node would have to know how to address the source node over the network. Thus, if the receiving node does not receive the source node number accurately, it must REJECT the command or message immediately, because it would not know where to send any error reply message. One way of knowing that the source node address was received accurately at the receiving node would be to encode it twice in the command or message being sent—once with the real node number and the other with the inverse of the node number. These would be sent early in the command or message so that the receiving node could translate and compare the two address fields for accuracy. If the addresses did not check out properly, the receiving node could immediately REJECT the message, causing the sending node to terminate prematurely and to retry the broadcast or multi-cast operation. Also, parity, ECC, CRC, or some other form of error checking on the source node address would work equally well.

In general we have provided a broadcast/multi-cast arbitration switch for receiving data signals from a plurality of different sources in an asynchronous digital communication network and for transmitting those signals to a set of destinations, number being two or greater. The preferred broadcast/switch has a number of input ports, one for each of number of different sources, to receive the respective data signals from each of the different sources. The broadcast/switch has a broadcast/multi-cast arbitration circuit means coupled to all of respective input ports to receive the respective data signals and to select a set of data signals to be received for subsequent transmission to set of destinations. There can be a number of lock path circuits for each input port and responsive to the set of data signals to be received by the broadcast/multi-cast arbitration circuit to couple set of destinations to receive first set of data; and a set of output ports coupled to each of input ports and such that the broadcast/multi-cast arbitration circuit receives data signals from the input port selected by the broadcast/multi-cast arbitration circuit and for transmitting the signals to destinations. In such a circuit we provide a common line to transmit 1s and 0s on the same line for connecting multiple inputs to multiple outputs. The broadcast/switch is nonbuffered, and there is no need for queuing. We use a DEAD FIELD to provide the time for resolving contention. This is a continuous flow broadcast/switch where data flows through the broadcast/switch without handshaking in a single pass. There are no hold-offs or wait periods or any discontinuation or interruption of message transmittals once the data transfer has started.

The broadcast/switch uses parallel discrete selection bits for path selection among a plurality of broadcast/-switch inputs and outputs in a system having a plurality of nodes.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A broadcasting and multicasting switching network comprising:
    a plurality of bufferless switching apparatuses cascaded into a plurality of stages, said switching apparatuses each including a plurality of switch inputs and a plurality of switch outputs, each switch output of said switching apparatuses coupled to a different switch input of other said switching apparatuses, switch outputs of last stage switching apparatuses comprising network output ports and switch inputs of first stage switching apparatuses comprising network input ports; and
    a plurality of nodes each connected to one of the network output ports and to one of the network input ports, each of said nodes comprising means for receiving a data message from a connected network output port and means for sending a data message to a connected network input port, said data message to a connected network input port including a path connection request;
    said switching apparatuses each further including:
        multicast means for establishing a communication path from any one of the network input ports to a plurality of the network output ports, in response to a multicast path connection request received at said any one of the network input ports, for transmitting a data message received at said any one of the network input ports simultaneously to said plurality of the network output ports; and
        broadcast means for establishing a communication path from said any one of the network input ports to all the network output ports, in response to a broadcast path connection request received at said any one of the network input ports, for transmitting a data message received at said any one of the network input ports simultaneously to all the network output ports.

2. The switching network according to claim 1, wherein the path connection request comprises a plurality of discrete connection bits sent in parallel.

3. The switching network of claim 1, wherein said bufferless switching apparatuses each further include point-to-point means for establishing
    a point-to-point communication path from said any one of the network input ports to any one of the network output ports, in response to a point-to-point path connection request received at said any one of the network input ports, for transmitting a data message received at said any one of the network input ports to said any one of the network output ports, and for establishing
    a plurality of concurrent point-to-point communication paths from each of a plurality of network input ports to each of a plurality of network output ports, in response to a plurality of point-to-point path connection requests received at said each of a plurality of network input ports, for transmitting a data message received at said each of a plurality of network input ports concurrently to said each of a plurality of network output ports.

4. The switching network of claim 3, wherein each of the switch outputs of each said switching apparatus and each of the switch inputs of each said switching apparatus comprise a plurality of control lines, said plurality of control lines including a VALID control line for use by a sending node for: signalling an end of any data message transmission, enabling a transmission of a point-to-point data message, and terminating an in-progress transmission of said point-to-point data message.

5. The switching network of claim 4, wherein said plurality of control lines further include a BRDCAST control line for use by said sending node together with said VALID control line for enabling a transmission of a multicast or broadcast data message and for returning the switching network to an idle state after said multicast or broadcast data message transmission.

6. The switching network of claim 5, wherein said plurality of control lines further include a REJECT control line for use by said switching apparatuses and for use by receiving nodes for signalling back to said sending node a rejection of a data message.

7. The switching network of claim 6, wherein a rejection of a data message signalled by one of said switching apparatuses indicates that said one of said switching apparatuses is handling an in-progress data message transmission.

8. The switching network of claim 6, wherein a receiving node rejection signal during an in-progress data message transmission is for indicating to said sending node an erroneous data message reception of said in-progress data message by said one of said receiving nodes, and for a termination of said in-progress data message transmission by said sending node.

9. The switching network of claim 6, wherein said bufferless switching apparatuses each further include:
    contention means for resolving a plurality of simultaneously received data messages requesting a same switch output, wherein only one of the plurality of simultaneously received data messages is connected to said same switch output based on a priority of a switch input over which said one of the plurality of simultaneously received data messages is received, and wherein remaining ones of the plurality of simultaneously received data messages are rejected.

10. The switching network of claim 9, wherein the contention means further includes means for preventing logic race conditions.

11. The switching network of claim 5, wherein said plurality of control lines further include an ACCEPT control line for use by said switching apparatuses and for use by said receiving nodes for transmitting acceptance and non-acceptance signals back to said sending node.

12. The switching network of claim 11, wherein said sending node receives an acceptance signal transmitted by requested ones of said receiving nodes after sending said data message to said requested ones of said receiving nodes, indicating a successful reception by said requested ones of said receiving nodes of said data message.

13. The switching network of claim 11, wherein said sending node does not receive an acceptance signal after sending a broadcast or multicast data message, indicating an unsuccessful reception of said broadcast or multicast data message by one or more of said receiving nodes.

14. The switching network of claim 11, wherein an acceptance signal transmission by one or more of said switching apparatuses during an in-progress multicast or broadcast data message transmission indicates to said sending node that said one or more of said switching apparatuses has established requested multicast or broadcast path connections and that said sending node can continue with the in-progress multicast or broadcast data message transmission.

15. The switching network of claim 14, wherein a non-acceptance signal transmission by said one or more of said switching apparatuses during an in-progress multicast or broadcast data message transmission indicates to said sending node that a requested switch output of said one or more of said switching apparatuses is blocked by an in-progress point-to-point data message transmission,
and wherein said non-acceptance signal transmission triggers a switching network pending mode wherein all other switching network connections established for said in-progress multicast or broadcast data message transmission are maintained until said in-progress point-to-point data message transmission is complete, whereafter said one or more of said switching apparatuses establishes a requested connection through said requested switch output of said one or more of said switching apparatuses, and said one or more of said switching apparatuses transmit an acceptance signal back to said sending node.

16. The switching network of claim 5, wherein said each of the switch outputs of each said switching apparatus and said each of the switch inputs of each said switching apparatus further comprise a plurality of data lines, said plurality of data lines for transmitting data message bits in parallel.

17. The switching network of claim 16, wherein said plurality of data lines, said BRDCAST control line, and said VALID control line are used by said sending node for terminating an in-progress transmission of said multicast or broadcast data message.

18. A broadcasting and multicasting switching network comprising:
a bufferless switching apparatus including a plurality of switch inputs and a plurality of switch outputs; and
a plurality of nodes each connected to one of the switch outputs and to one of the switch inputs, each of said nodes comprising means for receiving a data message from a connected switch output and means for sending a data message to a connected switch input, said data message to a connected switch input including a connection request;
said bufferless switching apparatus further including:
multicast means for establishing a communication path form any one of the switch inputs to a plurality of the switch outputs, in response to a multicast connection request received at said any one of the switch inputs, for transmitting a data message received at said any one of the switch inputs simultaneously to said plurality of the switch outputs; and
broadcast means for establishing a communication path from said any one of the switch inputs to all of the switch outputs, in response to a broadcast connection request received at said any one of the switch inputs, for transmitting a data message received at said any one of the switch inputs simultaneously to all of the switch outputs.

19. A bufferless broadcasting and multicasting switching apparatus comprising:
a plurality of switch inputs and a plurality of switch outputs;
multicast means for establishing a direct circuit-switched connection between any one of the switch inputs and a plurality of the switch outputs, in response to a multicast connection request received at said any one of the switch inputs, for transmitting a data message received at said any one of the switch inputs simultaneously to said plurality of the switch outputs; and
broadcast means for establishing a direct circuit-switched connection between said any one of the switch inputs and all of the switch outputs, in response to a broadcast connection request received at said any one of the switch inputs, for transmitting a data message received at said any one of the switch inputs simultaneously to said all of the switch outputs.

* * * * *